(12) United States Patent
Williams

(10) Patent No.: US 10,477,784 B1
(45) Date of Patent: Nov. 19, 2019

(54) IRRIGATION SYSTEM

(71) Applicant: Christopher Guy Williams, Spokane, WA (US)

(72) Inventor: Christopher Guy Williams, Spokane, WA (US)

(*) Notice: Subject to any disclaimer, the term of this patent is extended or adjusted under 35 U.S.C. 154(b) by 478 days.

(21) Appl. No.: 15/086,570

(22) Filed: Mar. 31, 2016

Related U.S. Application Data

(63) Continuation-in-part of application No. 14/210,488, filed on Mar. 14, 2014, now Pat. No. 9,301,459.

(60) Provisional application No. 61/852,349, filed on Mar. 15, 2013.

(51) Int. Cl.
  *A01G 25/09* (2006.01)

(52) U.S. Cl.
  CPC .................. *A01G 25/092* (2013.01)

(58) Field of Classification Search
  CPC ...... A01G 25/092; A01G 25/90; A01G 25/97; B05B 3/18; B05B 3/12; B05B 17/00
  USPC ....... 239/100, 722, 723, 726, 728, 730, 731, 239/733, 739–741, 748–750; 180/385; 700/284
  See application file for complete search history.

(56) References Cited

U.S. PATENT DOCUMENTS

| | | | |
|---|---|---|---|
| 2,750,228 A | 6/1956 | Engel | |
| 3,255,969 A | 6/1966 | Stafford | |
| 3,281,893 A | 10/1966 | Hogg | |
| 3,381,893 A | 5/1968 | Smith | |
| 3,444,941 A | 5/1969 | Purtel | |
| 3,463,175 A | 8/1969 | Rogers | |
| 3,831,692 A * | 8/1974 | Fry | A01G 25/092 239/728 |
| 4,036,436 A | 7/1977 | Nobel | |
| 4,295,607 A | 10/1981 | Nobel | |
| 4,330,085 A * | 5/1982 | Siekmeier | A01G 25/097 137/899.1 |
| 4,405,085 A * | 9/1983 | Meyer | A01G 25/092 239/169 |
| 4,877,189 A | 10/1989 | Williams | |
| 4,899,934 A * | 2/1990 | Krisle | A01G 25/092 239/1 |
| 5,246,164 A | 9/1993 | McCann | |
| 6,431,475 B1 | 8/2002 | Williams | |
| 6,726,132 B2 * | 4/2004 | Malsam | A01G 25/092 239/69 |
| 8,561,925 B2 * | 10/2013 | Korus | A01G 25/097 239/729 |
| 9,301,459 B1 * | 4/2016 | Williams | A01G 25/092 |

(Continued)

*Primary Examiner* — Justin M Jonaitis

(57) ABSTRACT

A land irrigation system to irrigate farmland. The system includes a water delivery pipe assembly having a plurality of drive motors mounted thereto. The water delivery pipe assembly is configured for one or the other or both of linear-move irrigator travel and center pivot irrigator travel. The water delivery pipe assembly is further configured to stagger the operation of select ones of the drive motors wherein when one or more of the selected drive motors are in operation one or more of the selected drive motors are not in operation. Staggering the operation of select ones of the drive motors can serve to reduce the carbon footprint as well as size footprint of the power supply that powers the drive motors whether that supply be a diesel generator or a water motor driven generator or an inverted battery power supply or a fuel cell or other.

17 Claims, 42 Drawing Sheets

(56) References Cited

U.S. PATENT DOCUMENTS

| | | | |
|---|---|---|---|
| 9,386,753 B1* | 7/2016 | Charipar | A01G 25/092 |
| 2003/0066913 A1* | 4/2003 | Reinke | A01G 25/092 239/735 |

* cited by examiner

IRRIGATION SYSTEM

CROSS REFERENCE TO RELATED APPLICATION

This is a continuation-in-part of U.S. patent application Ser. No. 14/210,488 titled Irrigation System issued as U.S. Pat. No. 9,301,459 on Apr. 5, 2016 which is hereby incorporated by reference in its entirety. This application claims priority to U.S. Provisional Application Ser. No. 61/852,349 filed Mar. 15, 2013 and titled Irrigation System which is hereby incorporated by reference in its entirety.

BACKGROUND

U.S. Pat. No. 6,431,475 issued to Williams discloses improved affordable and reliable automated connector forwarding for traveling linear-move sprinkler irrigation (a.k.a. lateral-move irrigation). For valve coupling and de-coupling as disclosed in U.S. Pat. No. 6,431,475, transport wheels are configured to raise and lower respectively relative to a swing arm. Raising the transport wheels lowers the swing arm and a coupler body providing for the coupler body to couple to an access valve. U.S. Pat. No. 6,431,475 to Williams also discloses a jointed swing pipe for conveying water from the coupler body to the swing arm. U.S. Pat. No. 6,431,475 to Williams also discloses a downward slanted pivoting valve detector plank.

BRIEF DESCRIPTION OF THE DRAWINGS

A form of the invention is illustrated in the accompanying drawings in which:

FIG. 28b is a side elevation view of the apparatus illustrated in FIG. 28a.

DETAILED DESCRIPTION

Embodiments of the present invention accomplishes coupler body coupling to and de-coupling from an access valve by lowering and raising (respectively) the valve coupler instead of the transport wheels. The transport wheels are fixed in position. The benefits include a simpler, lighter and more affordable automated coupler and further include increased ground clearance underneath the swing arm.

One embodiment of the present invention accomplishes water conveyance from the coupler body to the swing arm employing a directed flexible conduit. In another embodiment, the present invention accomplishes water conveyance from the coupler body to the swing arm employing a flexible conduit with pivoting conduit. The benefits of these embodiments include energy efficiency and also improved reliability and affordability.

In one embodiment, the present invention accomplishes valve detection employing an upwardly slanted parallel raise and lower plank. The upwardly slanted parallel raise and lower plank provides to hold an access valve in place prior to connection to that valve, provides for improved clearance between valve and plank, provides for an elongated plank and provides for increased clearance between plank and crop. In another embodiment, the present invention accomplishes valve detection employing an upwardly slanted pivoting plank. The upwardly slanted pivoting plank provides for improved clearance between valve and plank, provides for an elongated plank and provides for increased clearance between plank and crop.

In one embodiment, the present invention provides to raise and lower a coupler body to couple to an access valve, said raise and lower relative to a swing arm, said raise and lower employing a vertical coupler and rails travel. In another embodiment, the present invention provides to raise and lower a coupler body to couple to an access valve, said raise and lower relative to a swing arm, said raise and lower employing a vertical coupler travel.

Figure 16:
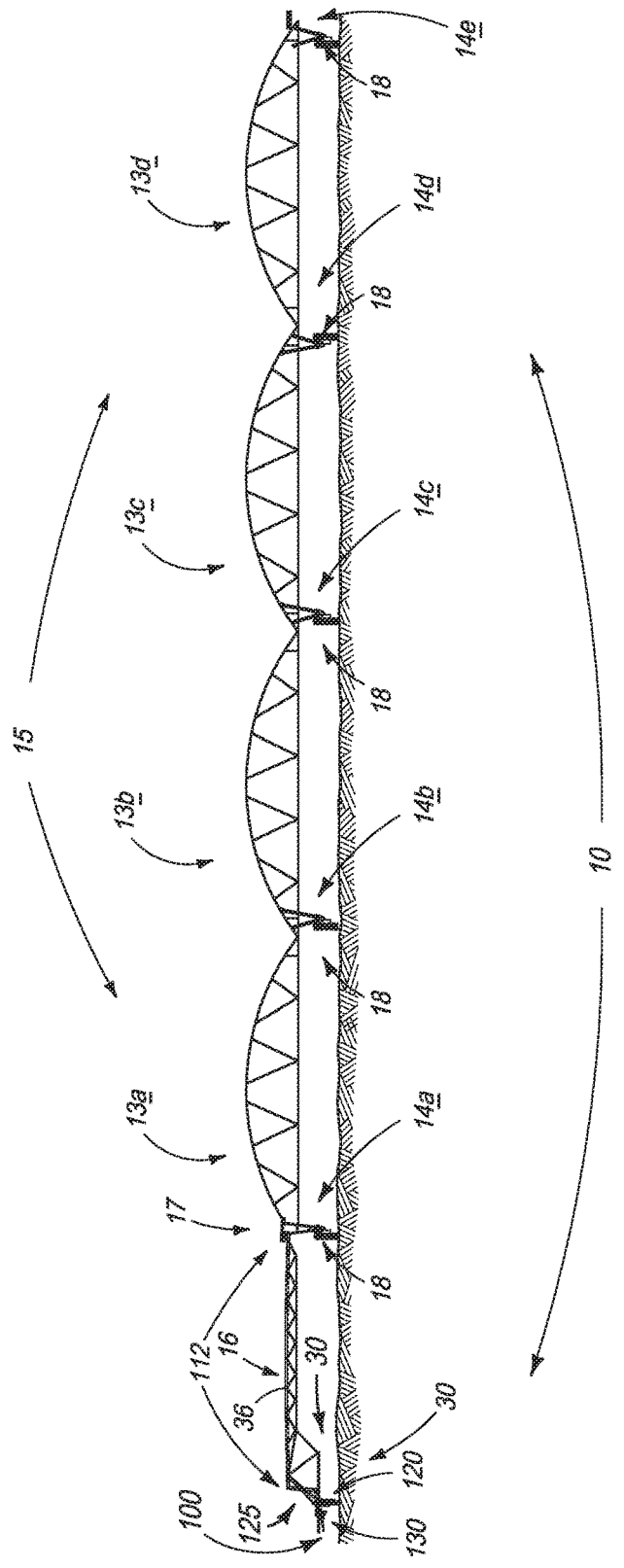
FIG. 16 is a side elevation view of single coupler automated connector pivotably mounted at one end to a linear-move water delivery pipe assembly.
Figure 17:
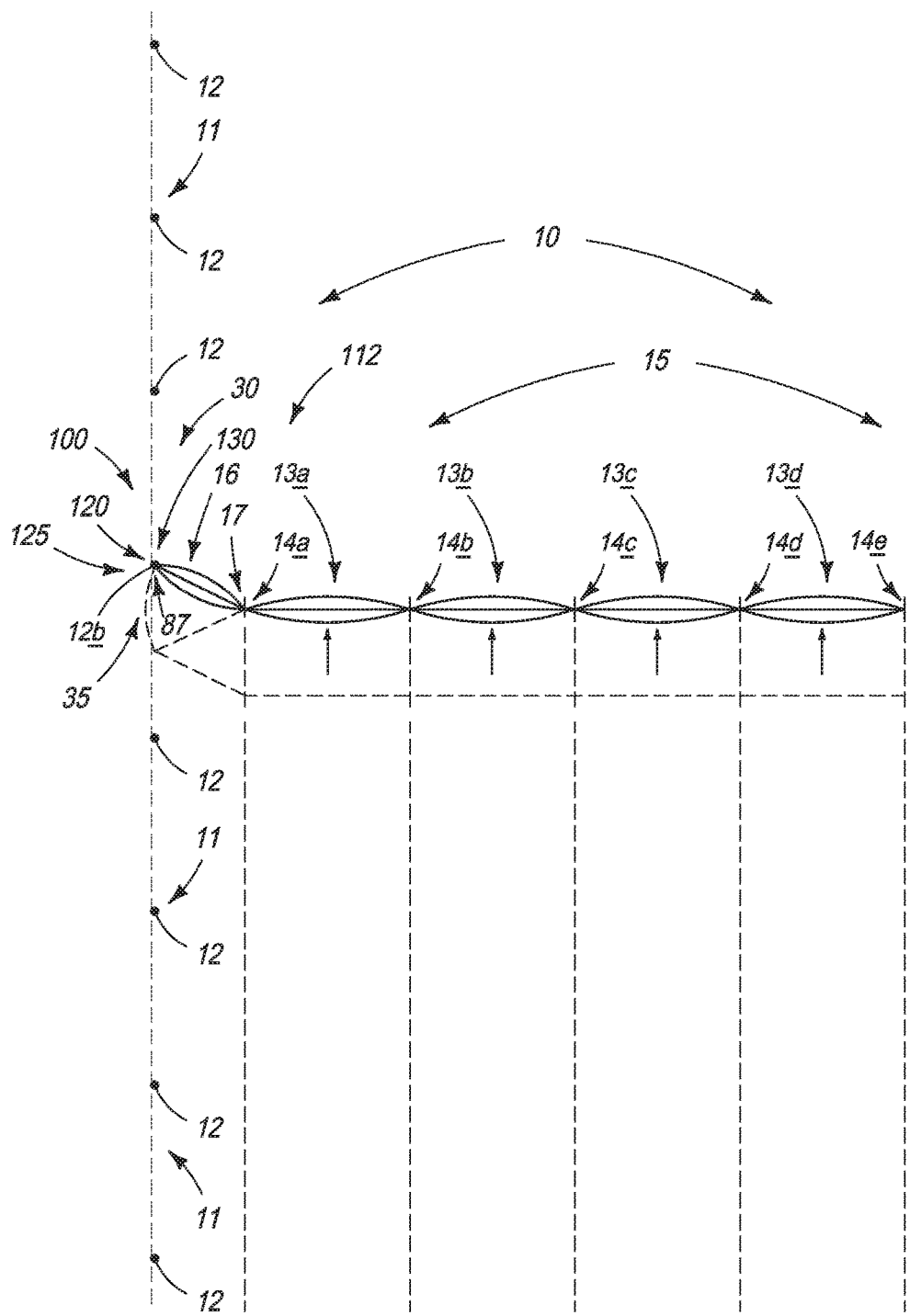
FIG. 17 is a diagrammatic top plan view depicting the single coupler automated connector forwarding connection from one access valve to a next access valve, the automated connector pivotably mounted at one end to a linear-move water delivery pipe assembly.

The present invention generally relates to linear-move irrigators. Examples of the present invention, referred to herein as a linear-move irrigation system 10 can employ a linear-move water delivery pipe assembly 15 and a connector 25 as best illustrated in FIGS. 16 and 17. Linear-move delivery pipe assembly 15 functions to deliver irrigation water to cropland. A side elevation view of an example of delivery pipe assembly 15 is illustrated in FIG. 16. The exemplary pipe assembly 15 comprises one or more lengths of trussed delivery pipe 13 mounted atop movable carts 14 forming a linear series of trussed water delivery pipes as illustrated. A drive 18 on each cart 14 maintains linear alignment of the water delivery pipes 13 while powering each cart 14 to travel in a direction perpendicular to the lengths of water delivery pipe 13. A water applicator such as rotator sprinklers or spray nozzles or any other applicator type is connected along the lengths of water delivery pipe 13 for selectively applying water supplied by the trussed water delivery pipes 13 on to the field surface.

Figure 1:
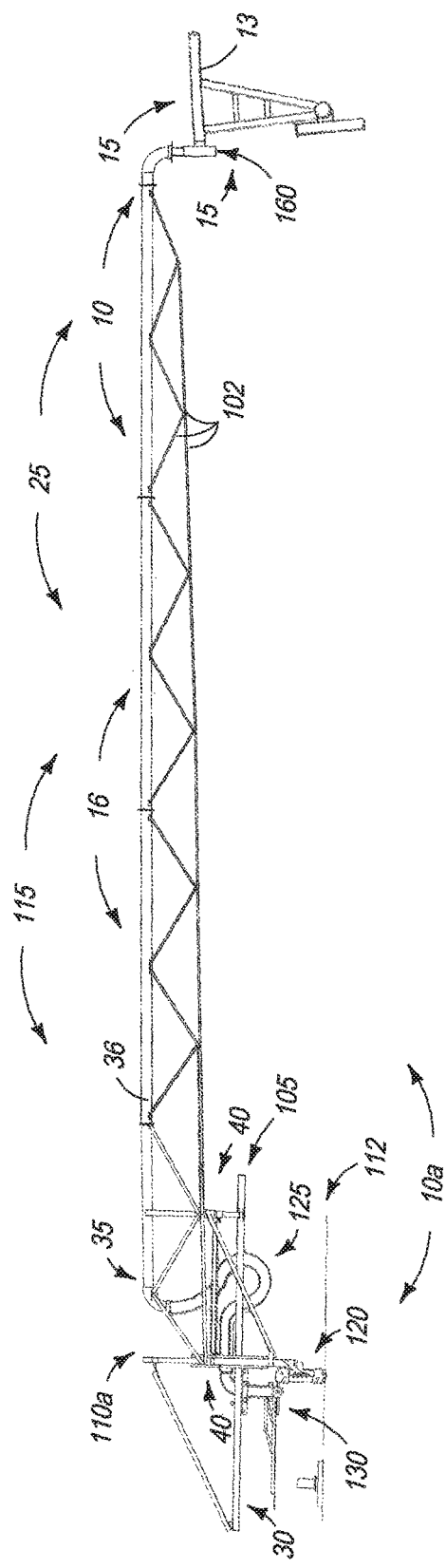
FIG. 1 is a side elevation view of a first embodiment of an automated connector of the present invention.

Connector 25 functions to hydraulically connect a linear-move water delivery pipe to a water supply. Connector 25 can comprise an automated connector 115 (FIG. 1). Connector 25 can be a manual connector for example, a hose manually moved along and manually connected to a series of access valves such as the connector employed on today's hose-pull linear-move irrigators. Connector 25 can comprise a connector that sucks water from a ditch such as employed on today's ditch-fed linear-move irrigators. Connector 25 can comprise any connector that supplies water to a linear-move irrigator.

Automated connector 115 functions to automatically supply water to a linear-move irrigator. Connector 115 can comprise a dual coupler automated connector. As an example of a dual coupler automated connector, two couplers are employed and water flow from a water main is maintained through at least one of the two being connected to the water main at any one time thus accomplishing continuous flow from main to irrigator.

Automated connector 115 can comprise a single coupler automated connector 112. As an example of a single coupler automated connector 112, one coupler is forwarded along a water main to deliver water from the main to a traveling linear-move irrigator, when said one coupler is being moved between access valves, flow to the irrigator is temporarily interrupted. Embodiments of irrigation system 10 herein disclosed comprise automated mainline connector 115 comprising a single coupler automated connector 112.

Single coupler automated connector 112 can comprise one or more of: a swing arm 16, a transporter 120, a valve coupler 130, a swing arm length adjuster 30, a pivoting ground support 100 and a water conveyance 125.

Figure 2:
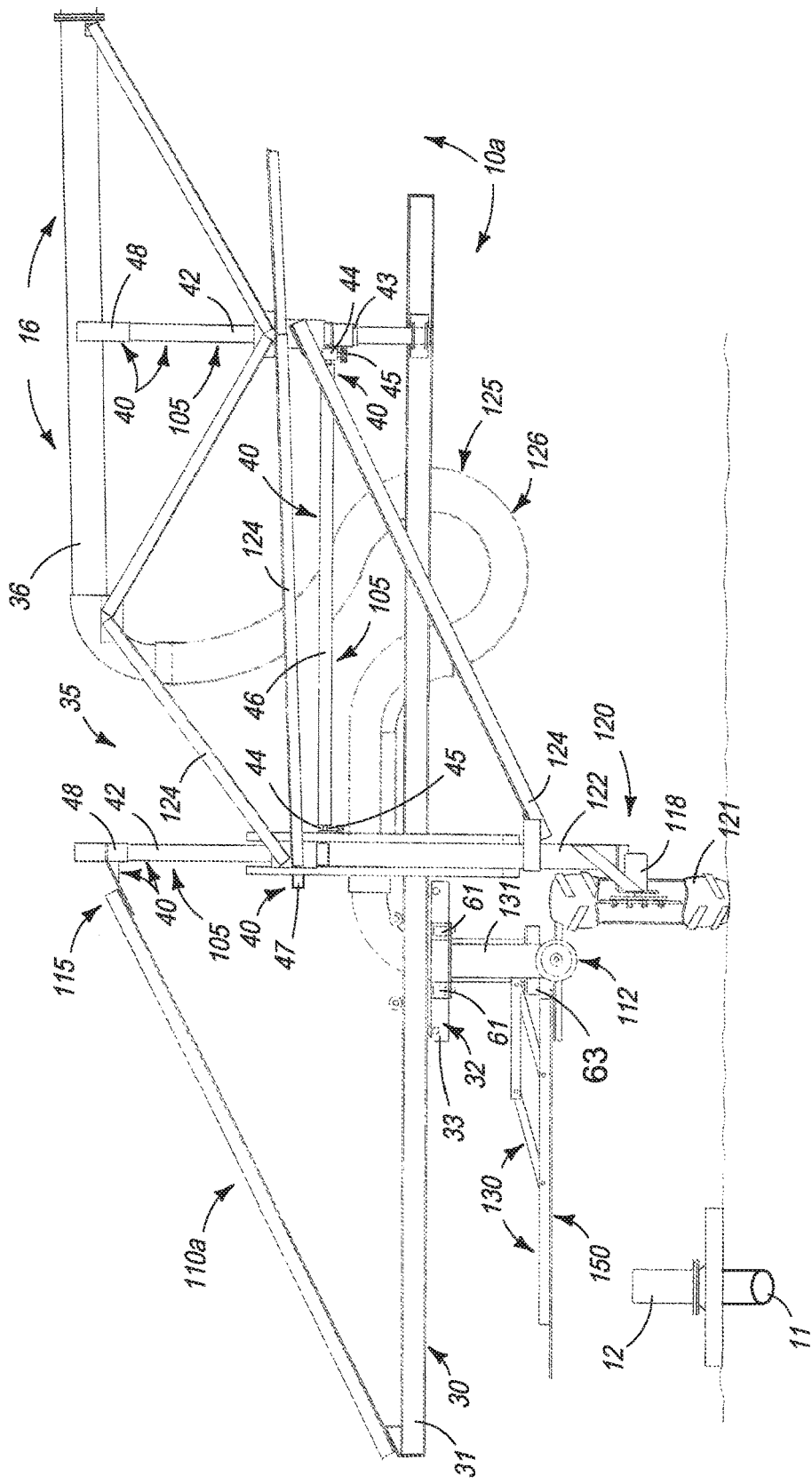
FIG. 2 is a side elevation enlarged view of the automated connector of FIG. 1 showing an outer end of a swing arm sporting a transporter, a valve coupler having a coupler body, a swing arm length adjuster and a water conveyance. The valve coupler including a vertical coupler with rails travel.
Figure 3:
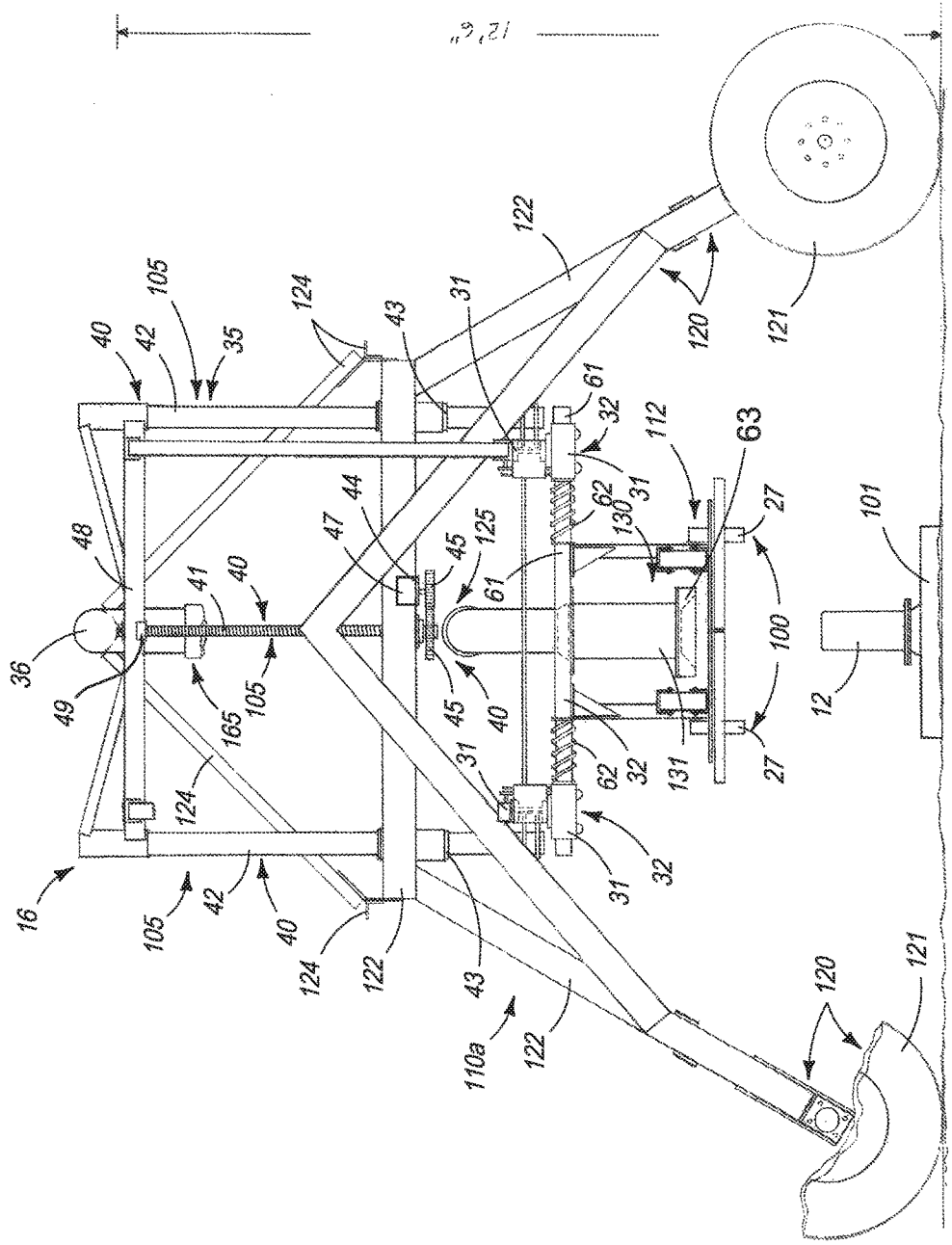
FIG. 3 is an end elevation view of the apparatus illustrated in FIG. 2.

Swing arm 16 functions to pivotably forward the water main connection. One example of swing arm 16 is illustrated in FIGS. 1 through 3. The exemplary swing arm 16 is coupled at one end to a water turbine 160 (see FIG. 1) such that arm 16 is enabled to pivot vertically and especially horizontally relative to the turbine 160 (and thus relative to the delivery pipe assembly 15) to facilitate transport of valve coupler 130 from one access valve to the next, said transport illustrated in FIG. 17 and described later on. Turbine 160 is attached to a delivery pipe 13 of delivery pipe assembly 15. (Swing arm 16 attached via a pivot 17, pivot 17 in place of turbine 160, to a delivery pipe 13a of delivery pipe assembly 15 is illustrated in FIG. 16.) The other end of swing arm 16 (opposite the end coupled to turbine 160) sports transporter 120, valve coupler 130, swing arm length adjuster 30 and water conveyance 125 (said end sporting transporter 120 etc. is hereafter referred to as swing arm outer end 35). Further, the exemplary swing arm 16 includes a supply pipe 36 for flowing water and a trussing 102 as illustrated. (Swing arm 16 can be substantially as described in U.S. Pat. No. 6,431,475 and can be mounted to a water delivery pipe assembly 15 as illustrated in U.S. Pat. No. 6,431,475, or can be other. U.S. Pat. No. 6,431,475 is hereby incorporated by reference in its entirety.)

Transporter 120 functions to transport between access valves. An example of transporter 120 is illustrated in FIGS. 2 and 3. The exemplary transporter 120 transports valve coupler 130 from one of an access valve 12 to a next successive access valve 12 (illustrated in FIG. 17, described further later). (Access valve 12 can be a poppet style valve and can be as described for access valve 12 in U.S. Pat. No. 6,431,475 and can be oriented in a farm field as described in FIGS. 16a through 16d and 17a through 17d in said patent.) The exemplary transporter 120 includes two of a transport wheel 121, a leg frame 122, two of a wheel motor 118 and six of a support strut 124. Leg frame 122 mounts to supply pipe 36 of swing arm 16 via support struts 124 as illustrated. Each motor 118 mounts between a bottom end of one of two legs of leg frame 122 and one of the two of wheel 121 as illustrated such that each wheel 121 can function to ground support outer end 35. When each wheel 121 is ground supporting outer end 35, each of the two of motor 118 can then be employed to propel the associated wheel 121 to thus transport the swing arm outer end 35.

Figure 25:
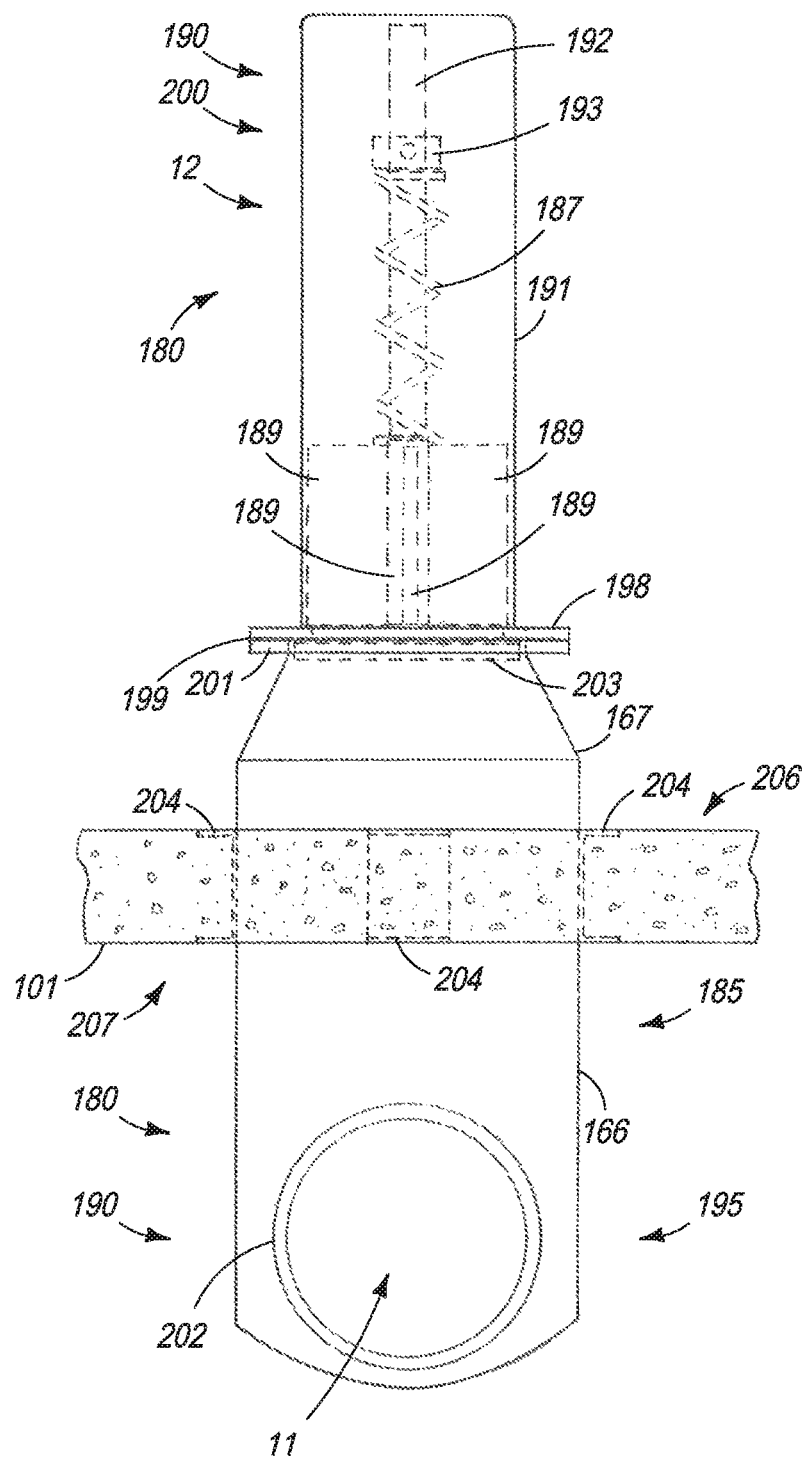
FIG. 25 is a side elevation enlarged view of a specialized valve assembly.

Valve coupler 130 functions to connect to and disconnect from a water main. An example of coupler 130 is illustrated in FIGS. 2 and 3. The exemplary coupler 130 opens valve 12 employing the available weight at swing arm outer end 35 and can accomplish opening (and closing) said valve, including detection of and alignment with said valve, as described in U.S. Pat. No. 6,431,475. The exemplary coupler 130 includes a coupler body 131, two of a horizontal tube 61, four of an adjuster spring 62, an alignment cone 63 and a V-catcher 158. Coupler 130 is configured to selectively connect and disconnect coupler body 131 to and from (respectively) an access valve 12 consequently connecting to and disconnecting from (respectively) a water main 11 (main 11 illustrated in FIG. 2). When connected to an access valve 12, body 131 is thus enabled to receive water from main 11 via the access valve 12. (An example of an access valve assembly 180 is illustrated in FIG. 25 and discussed later on. Assembly 180 comprises access valve 12 with valve 12 attached to a riser body 185. Body 185 is coupled to main 11. Coupler 130 can comprise a bladder valve 239. Valve 139 can function to open and close water flow to delivery pipe assembly 15.)

Each of the two of horizontal tubes 61 is affixed at opposite sides of coupler body 131 (the tubes extend generally horizontally and generally parallel to each other with the coupler body affixed at the middle of their length and between them). Each of the two of tube 61 is mounted at each end to one of the two of a trolley roller assembly 33 (assembly 33 described below). Each assembly 33 is configured to allow the respective end of each of tube 61 to slide generally horizontally and perpendicular to the travel of each assembly 33 along the respective rail 31.) Each adjuster spring 62 is mounted to reside inward of a respective assembly 33 and outward of body 31 positioning body 131 centered between the two assemblies 33. Springs 62 of valve coupler 130 maintain body 131 centered between the two trolley assemblies 33 prior to contact with valve 12 thus reserving sufficient travel of horizontal travel of tubes 61 (relative to assemblies 33) to enable alignment when downward travel of alignment cone 63 engages the valve 12, said alignment along the axis essentially perpendicular to rails 31. (Said reserved travel is also employed when V-catcher 158 is pushed against the valve 12 to align cone 63 to the valve 12 prior to said downward travel. Cone 63 is attached at the bottom of coupler body 131. V-catcher 158 is attached to support structure of ground support 100 and resides below cone 63, support 100 described below.) Assemblies 33 are allowed to free float along rails 31 to enable alignment with valve 12 via alignment cone 63 (as well as via V-catcher 158) along the axis parallel to rails 31.

Swing arm length adjuster 30 functions to accommodate the varying distance between a stationary water supply and a traveling linear-move irrigator. An example of swing arm length adjuster 30 is illustrated in FIGS. 2 and 3. The exemplary length adjuster 30 includes two of a rail 31 and a trolley 32. Each rail 31 is positioned parallel to the other rail 31 (and parallel to supply pipe 36). Trolley 32 is configured to travel along the length of rails 31. Trolley 32 includes two of a trolley roller assembly 33. One assembly 33 is movably mounted to one of rails 31 and the other assembly 33 is movably mounted to the other rail 31 such that each assembly is enabled to travel along the length of the respective rail. Coupler body 131 of valve coupler 130 is attached to trolley 32 via horizontal tubes 61 and springs 62 as described above. Travel of trolley 32 along rails 31 thus provides for coupler body 131 to translate between an end of rails 31 closest to pipe assembly 15 and an end of rails 31 farthest from pipe assembly 15. Said translation provides to compensate for the variable distance between body 131 and pipe assembly 15 when pipe assembly 15 travels across a field in a substantially straight line. (Swing arm length adjuster can be substantially as described in U.S. Pat. No. 6,431,475.)

Figure 4:
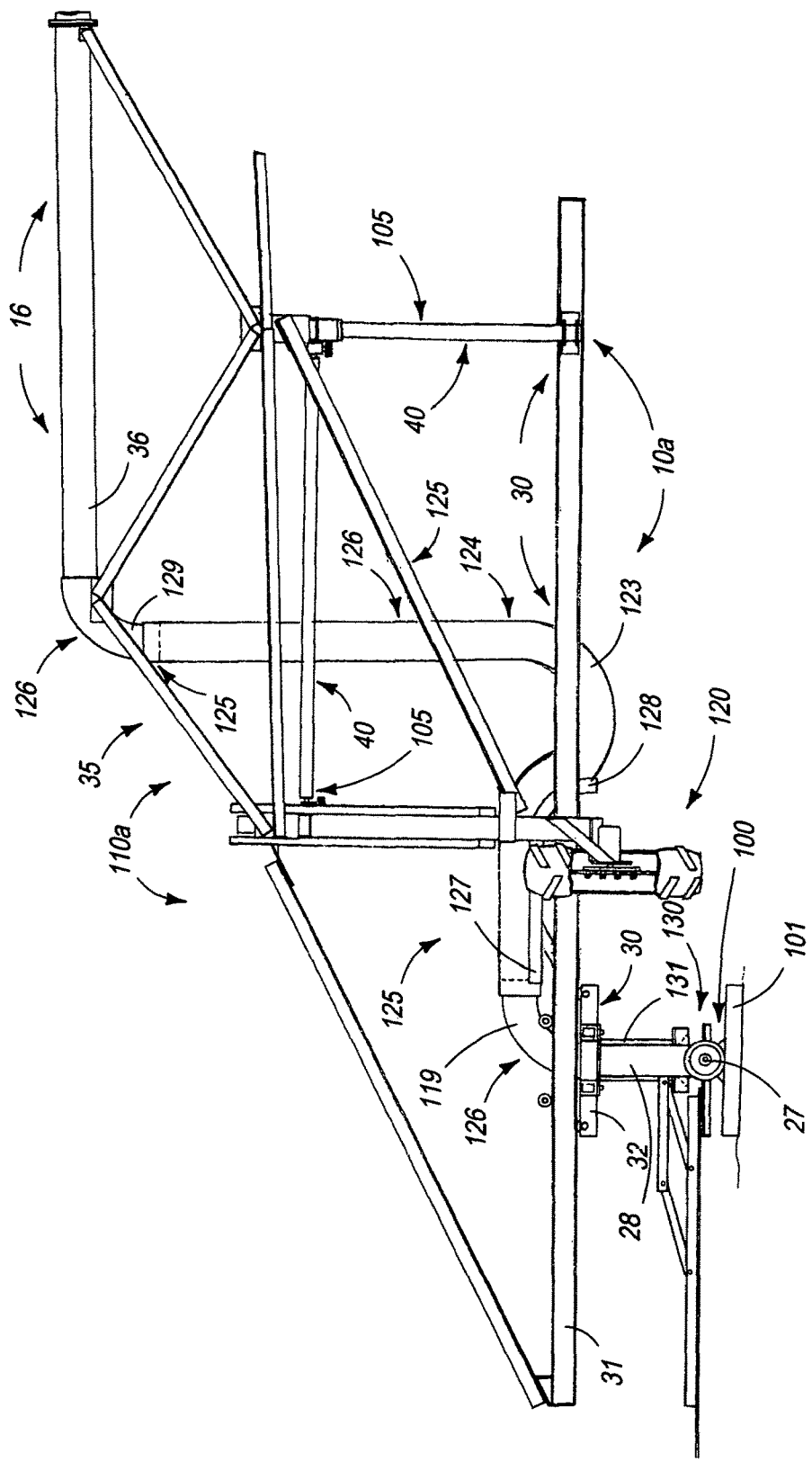
FIG. 4 is a view of the apparatus illustrated in FIG. 2 wherein the coupler body of the valve coupler has been lowered onto an access valve.

Pivoting ground support 100 functions to provide ground support of the swing arm outer end and to enable pivoting of the swing arm outer end. An example of support 100 is best illustrated in FIG. 4. The exemplary support 100 includes two of a ground support wheel 27. Each of the two of wheel 27 mounts an axle welded to a support 28. Each support 28 is attached to and extends downward from trolley 32 as shown. Upon valve coupler 30 fully lowering coupler body 131 onto an access valve 12 (thus opening the poppet style valve) the two of wheel 27 contact a concrete pivot pad 101 poured around said access valve 12. Due to said contact with pad 101, further lowering motion by coupler 30 results not in body 131 lowering but rather causes outer end 35 to raise and each of the two of transport wheel 121 to raise off the ground. (With wheels 121 off the ground, trolley 32 is free to travel along rails 31 unimpeded by ground contact of wheels 121.) Travel of pipe assembly 15 (irrigation travel) causes swing arm 16 to rotate substantially horizontally causing coupler body 131 and each wheel 121 to rotate about access valve 12 (travel of pipe assembly 15 also causes trolley 32 to translate along rails 31). (Pivoting ground support 100 can be substantially as described in U.S. Pat. No. 6,431,475. Support 100 can be an apparatus that provides ground support in combination with a separate apparatus that enables pivoting of outer end 35.)

Figure 5:
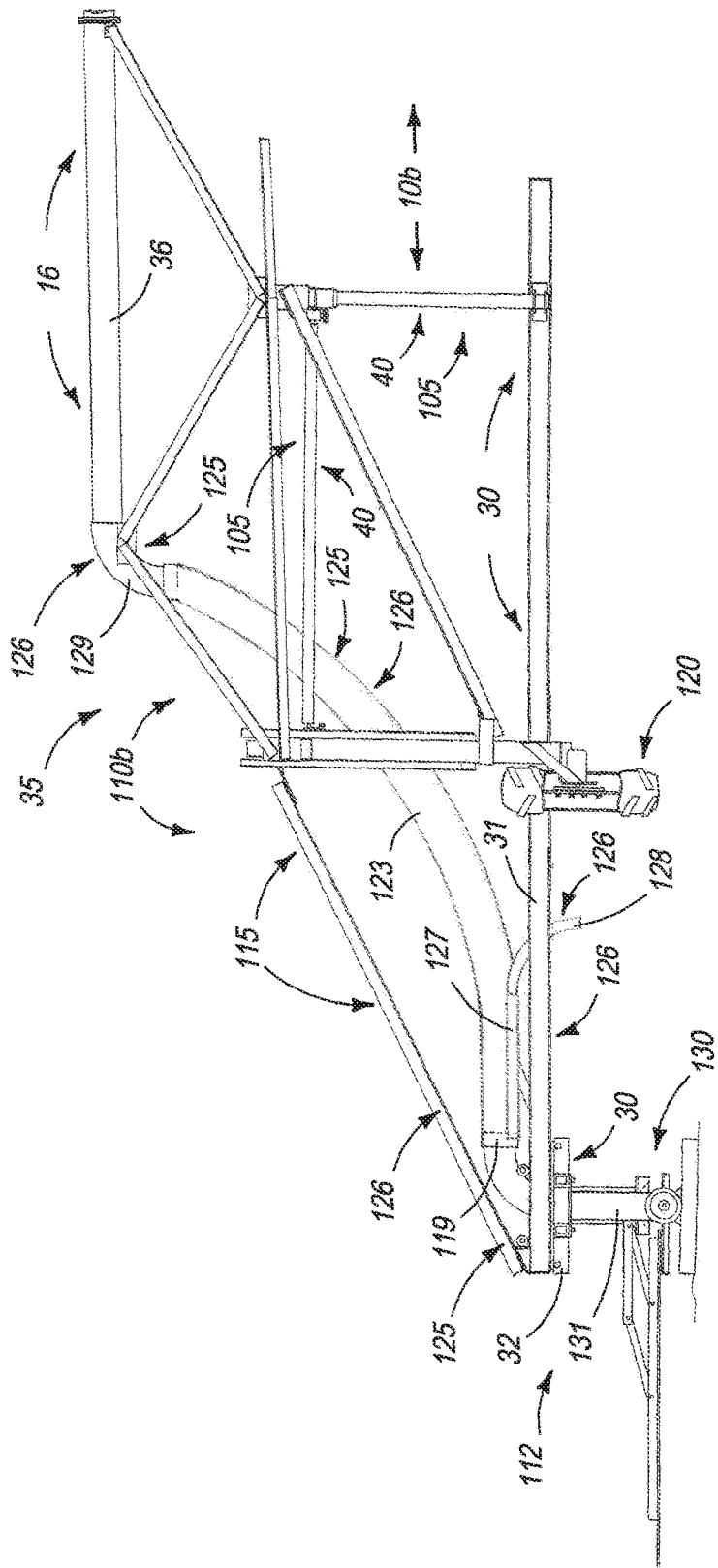
FIG. 5 is a view of the apparatus illustrated in FIG. 4 wherein the coupler body has been positioned outermost along the swing arm length adjuster to illustrate the orientation of a bendable hose of the water conveyance.
Figure 6:
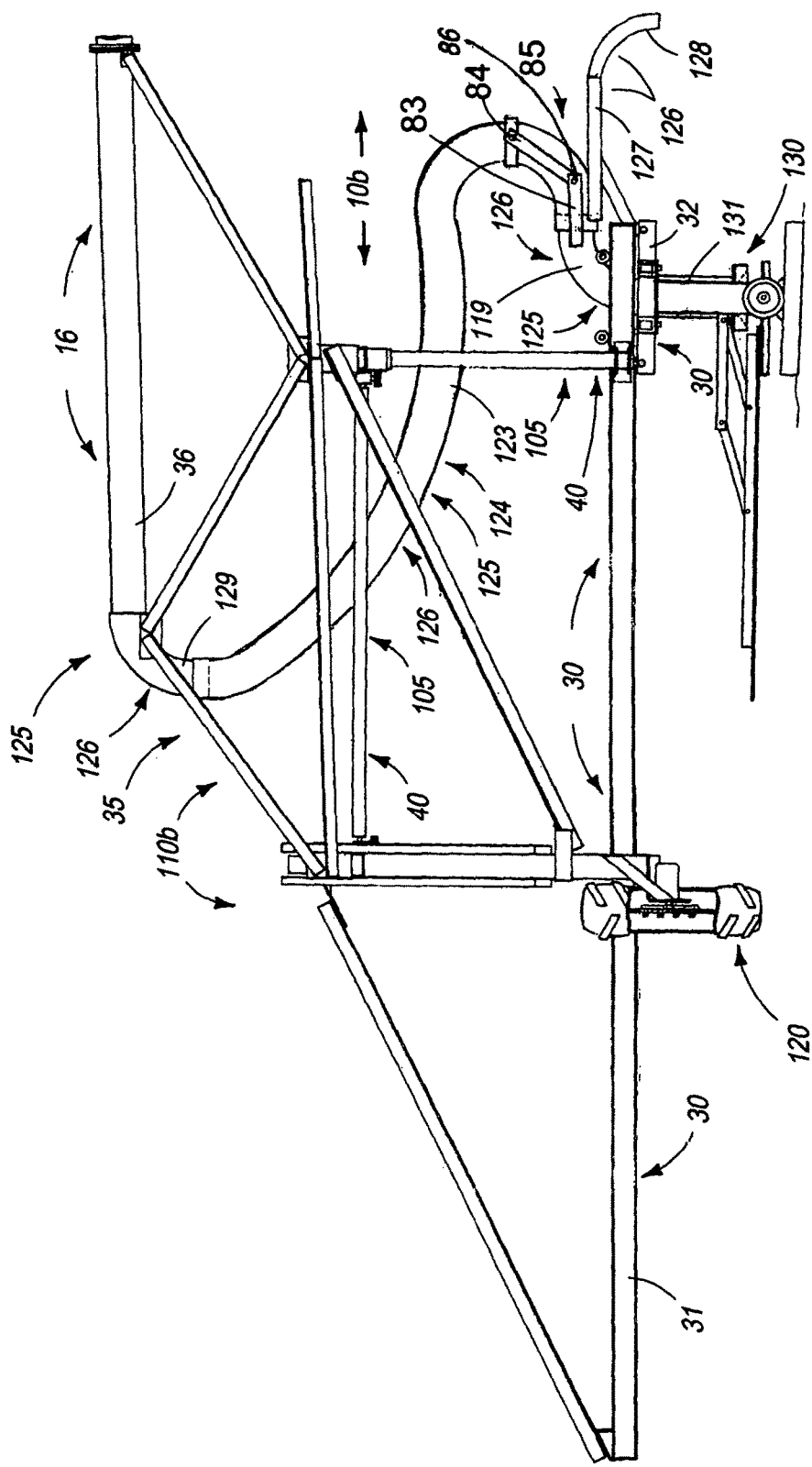
FIG. 6 is a view of the apparatus illustrated in FIG. 5 wherein the coupler body has been positioned innermost along the swing arm length adjuster to illustrate the orientation of the bendable hose.
Figure 7:
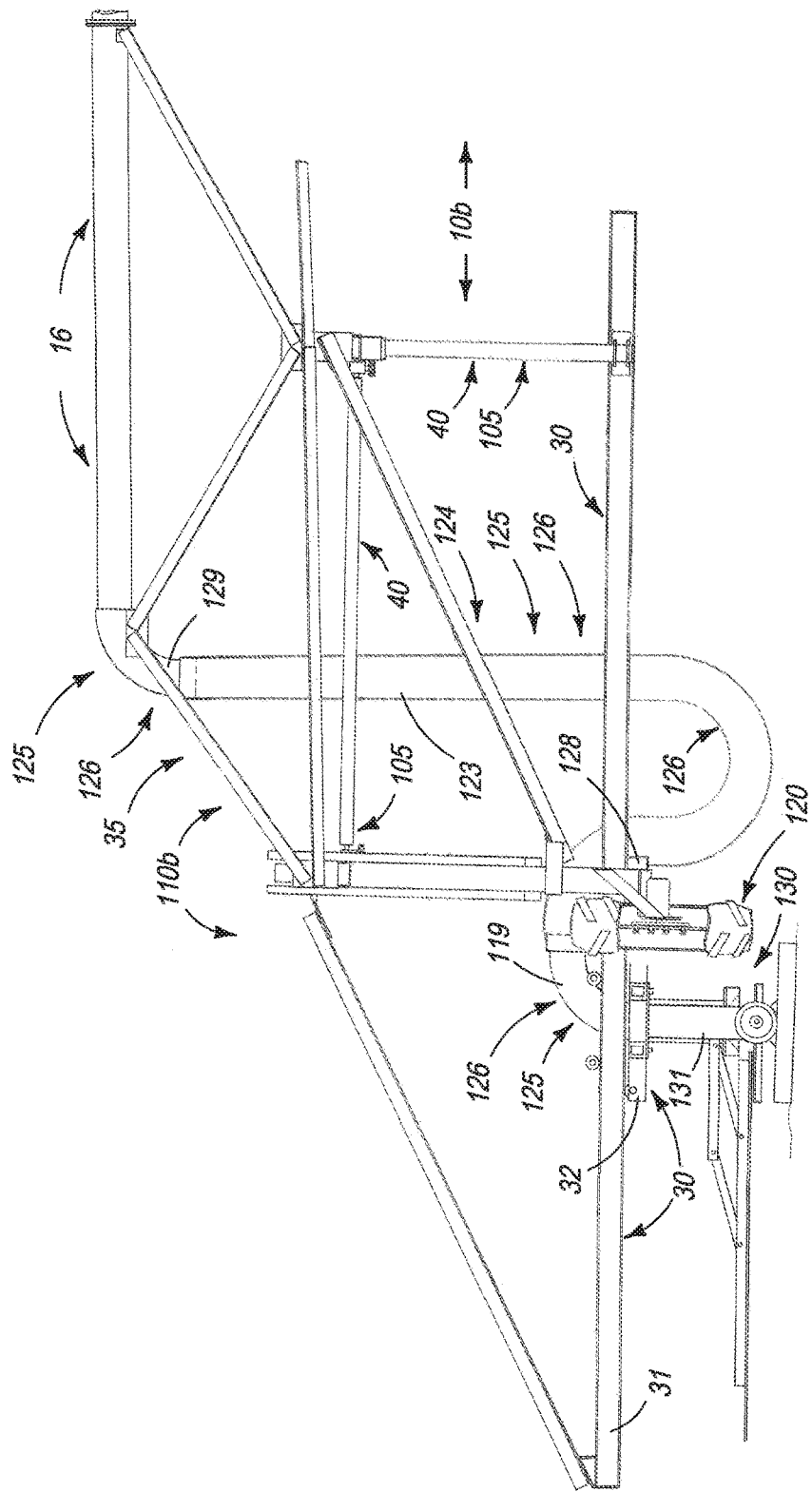
FIG. 7 is a view similar to that of the apparatus illustrated in FIG. 4 showing water conveyance including a bendable hose absent a horizontal support.
Figure 8:
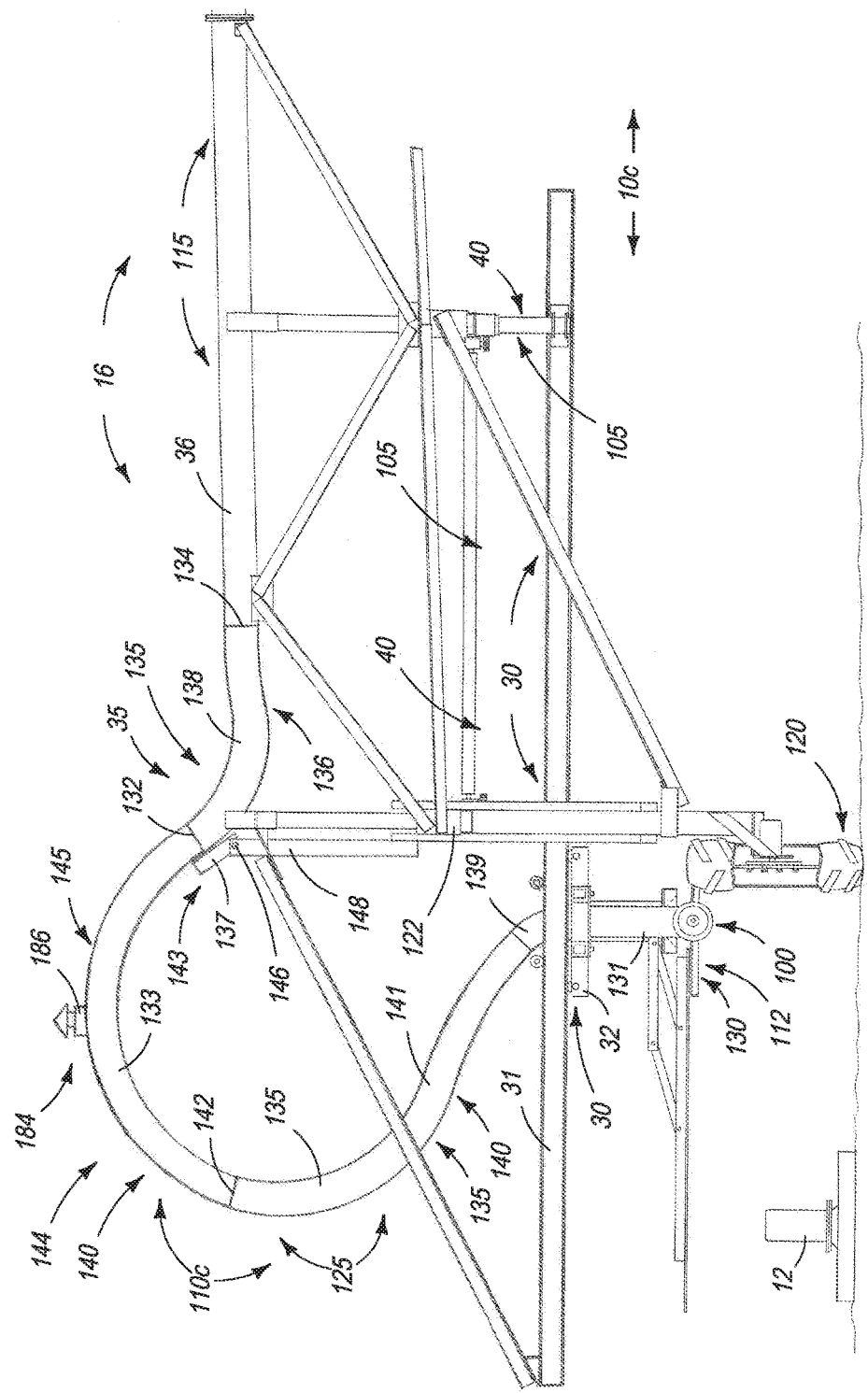
FIG. 8 is a view of the apparatus illustrated in FIG. 2 with the exception that the water conveyance includes a pivoting pipe.
Figure 9:
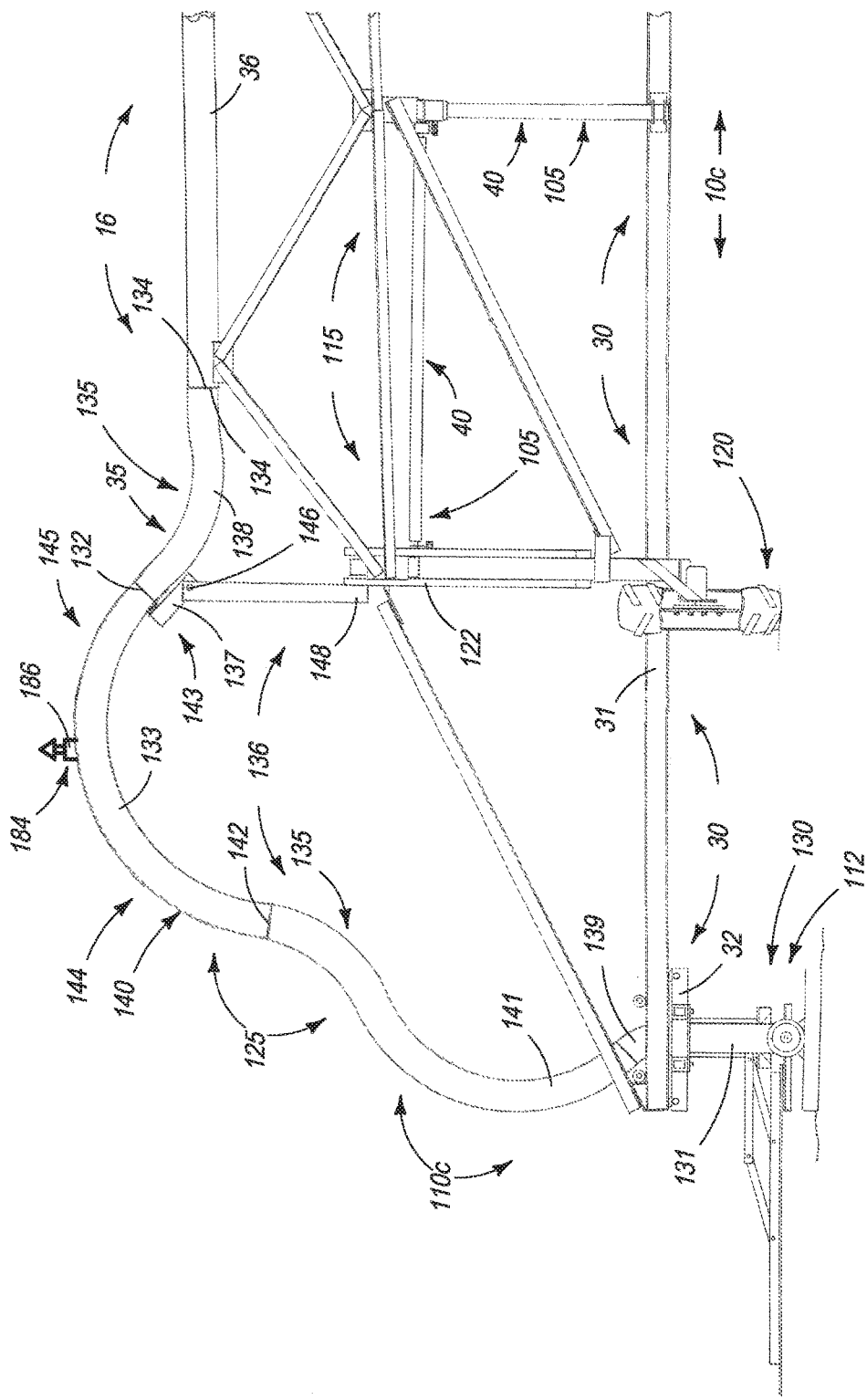
FIG. 9 is a view of the apparatus as oriented in FIG. 5 with the exception that water conveyance 125 includes flexible conduit with pivoting conduit.
Figure 10:
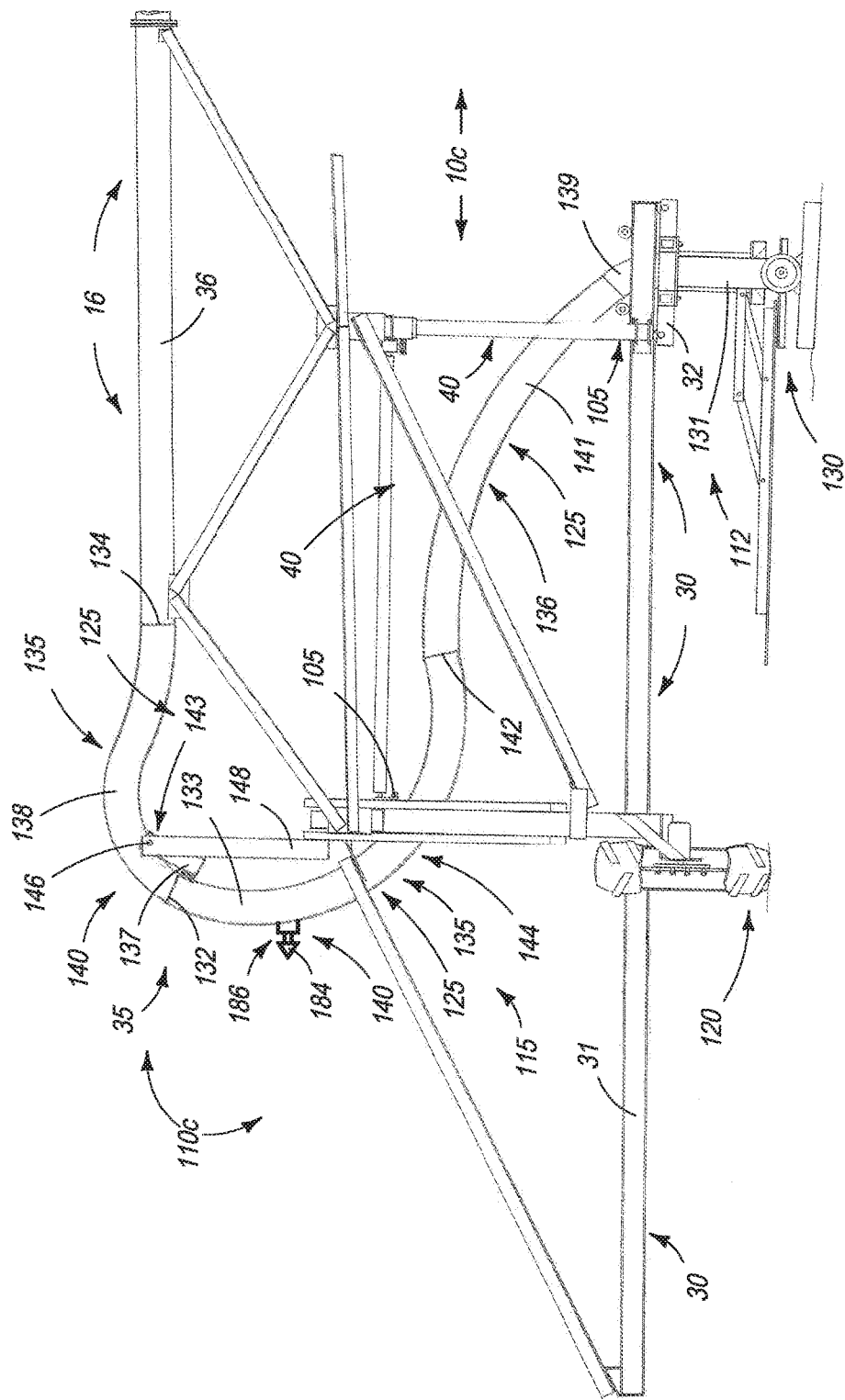
FIG. 10 is a view of the apparatus as oriented in FIG. 6 with the exception that water conveyance 125 includes flexible conduit with pivoting conduit.

Water conveyance 125 functions to operably flow water between a movable valve coupler and a swing arm. One example of conveyance 125, a directed flexible conduit 126 is illustrated in FIGS. 5 through 7. Another example of conveyance 125, a flexible conduit with pivoting conduit 140 is illustrated in FIGS. 8 through 10. Water conveyance 125 can be any means to operably flow water between coupler body 131 and swing arm 16. (Conveyance 125 can be the described swing pipe disclosed in U.S. Pat. No. 6,431,475, or can be some other contrivance.)

An example of operation of linear-move irrigation system 10 where system 10 comprises single coupler automated connector 112 and connector 112 comprises swing arm 16, transporter 120, valve coupler 130, swing arm length adjuster 30, pivoting ground support 100 and water conveyance 125 will now be given (illustrated diagrammatically in FIG. 17). Delivery pipe assembly 15 is situated somewhere between ends of the field as shown. Delivery pipe assembly 15 has previously been applying water while traveling forward along water main 11 with coupler body 131 of valve coupler 130 connected to access valve 12*a*, said travel of assembly 15 indicated by the dashed lines parallel to main 11. During said travel, pivoting ground support 100 has been providing ground support of the swing arm outer end 35 and enabling pivoting of the swing arm outer end 35. Travel of pipe assembly 15 has caused trolley 32 to transit along rails 31 as facilitated by swing arm length regulating means 30 to and outer end of rails 31 (see FIG. 2). Detection of said outer end positioning has instructed valve coupler 130 to disconnect from valve 12*a*. Transporter 120 has then transported valve coupler 130 from access valve 12*a* to access valve 12*b*, said transport guided by swing arm 16 as indicated by arced line 87. Valve coupler 130 has then connected to access valve 12*b*. Subsequently, pipe assembly 15 now resides as shown and resumes forward travel while applying water with pivoting ground support 100 providing ground support of the swing arm outer end 35 and enabling pivoting of the swing arm outer end 35. Upon connection of body 131 to an access valve 12, water conveyance 125 provides to flow water between coupler body 131 of valve coupler 130 to swing arm 16 and ultimately to delivery pipe assembly 15 and onto the ground surface.

System 10 comprising linear-move delivery pipe assembly 15 and single coupler automated coupler 112 can be configured to irrigate in any manner as described in U.S. Pat. No. 6,431,475 (or can be configured otherwise). For example, system 10 can be configured as back and forth travel, mainline 11 with valves 12 being positioned along the edge of a field. Mainline 11 with valves 12 can be positioned down the center of a field and pipe assembly 15 is employed to irrigate along one side of mainline 11. Assembly 15 is then dry rotated to a position along the opposite side of mainline 11 where pipe assembly 15 subsequently irrigates along this side of line 11. The rotation capability, for example using an access valve as an anchor, enables pipe assembly 15 to be employed as a center-pivot irrigator, i.e. irrigating a circular area, for example in addition to being employed to linear-move irrigate.

Single coupler automated connector 112 can comprise an independent vertical coupler connector 110. Independent vertical coupler connector 110 functions to forward a coupler along a water main employing independent vertical coupler travel. Examples of an independent vertical coupler connector 110 are illustrated in FIGS. 1 through 4 and FIGS. 11 and 12. The exemplary independent vertical coupler connector 110 comprises valve coupler 130 and wherein coupler 130 comprises an independent vertical coupler travel 105.

Independent vertical coupler travel 105 functions to provide independent vertical valve coupler travel. Examples of travel 105 are illustrated in FIGS. 1 through 12. As one example, travel 105 can comprise the example of vertical coupler and rails travel 40 illustrated in FIGS. 1 through 10. As another example, travel 105 can comprise the example of vertical coupler travel 80 illustrated in FIGS. 11 and 12. The exemplary travel 40 and travel 80 provide to accomplish vertical travel of coupler body 131 independent from vertical travel of swing arm outer end 35. The exemplary travel 40 and travel 80 also provide to accomplish vertical travel of coupler body 131 independent from vertical travel of transport wheels 121. The exemplary travel 40 and travel 80 also provide to accomplish vertical travel of body 131 and ground support wheels 27 independent from vertical travel of swing arm outer end 35. The exemplary travel 40 and travel 80 also provide to accomplish vertical travel of body 131 and support wheels 27 independent from vertical travel of transport wheels 121.

A first embodiment of linear-move irrigation system 10 is illustrated in FIGS. 1 through 12. This first embodiment comprises linear-move water delivery pipe assembly 15 and single coupler automated connector 112 and wherein connector 112 comprises independent vertical coupler connector 110. For this first embodiment, connector 110 comprises swing arm 16, transporter 120, valve coupler 130, swing arm length adjuster 30, pivoting ground support 100 and water conveyance 125 and wherein coupler 130 comprises independent vertical coupler travel 105.

A first example of this first embodiment of linear-move irrigation system 10, system 10*a*, is illustrated in FIGS. 1 through 4. This first example comprises independent vertical coupler connector 110*a*. Connector 110*a* comprises swing arm 16, transporter 120, valve coupler 130, swing arm length adjuster 30, pivoting ground support 100 and water conveyance 125. For this first example, valve coupler 130 comprises independent vertical coupler travel 105 and coupler travel 105 comprises a vertical coupler and rails travel 40. For this first example, water conveyance 125 can be any means to operably flow water between coupler body 131 and swing arm 16. (Conveyance 125 in FIGS. 1-4 is shown employing a directed flexible conduit 126, described later.)

Vertical coupler and rails travel 40 functions to provide essentially vertical travel of a valve coupler. An example of travel 40 is illustrated in FIGS. 1 through 4. The exemplary travel 40 includes four of a linear travel pipe 42, four of a linear bearing 43, two of a lead screw 41, two of a right angle gear box 44, four of a gear 45, a drive-line 46, a hydraulic motor 47, two of a top beam 48 and two of a lead screw nut 49.

As illustrated, each travel pipe 42 is attached at a bottom end to one of the two rails 31. Each travel pipe 42 is attached at a top end to top beam 48. Each travel pipe 42 is supported to prevent horizontal travel by, and slides inside of, an associated linear bearing 43. Two of the four of bearing 43 are mounted to transport frame 122 and the other two of the four of bearing 43 are mounted to swing arm 16. Each gearbox 44 drives one of the two of lead screw 41 via a set of two of the four of gear 45 as illustrated. Hydraulic motor 47 is coupled to an input shaft of one of the two of gearbox 44 as illustrated. One end of drive-line 46 is coupled to a through shaft end of the input shaft of one of the two of gear box 44, the other end of the input shaft coupled to motor 47. The other end of drive-line 46 is coupled to an input shaft of the other of the two of gear box 44 as illustrated. Each one of the two of lead screw nut 49 is secured to the associated one of the two of top beam 48 and travels along the respective lead screw 41 when the lead screw 41 is turned. The bottom end of one of the two of lead screw 41 is bearing mounted to transport frame 122 as illustrated. The bottom end of the other one of the two of lead screw 41 is bearing mounted to swing arm 16 as illustrated.

An example of operation of vertical coupler and rails travel 40 will now be given. Hydraulic motor 47 is powered to turn in the appropriate direction to result in the lowering of coupler body 131. Turning motor 47 turns the coupled-to input shaft of the one of the two of gearbox 44. The through shaft end of the turning input shaft turns drive-line 46. Drive-line 46 thus turns the input shaft of the other one of the two of gearbox 44. The resultant turning input shaft of each of gearbox 44 turns the associated output shaft of each of box 44 thus turning the associated set of two of gear 45. Each turning set of two of gear 45 turns the associated attached lead screw 41. Each turning screw 41 turns inside the associated nut 49 causing each nut 49 to travel lower meaning each associated beam 48 lowers. The lowering of each beam 48 effects to force the attached travel pipes 42 lower and, thus, effects to lower the attached two rails 31. The lowering of each rail 31 effects to lower trolley 32 movably mounted thereon meaning coupler body 131 is lowered as well. The lowering of coupler body 131 thus enables body 131 to mate with and couple to an access valve 12. (Springs 62 of valve coupler 130 maintain body 131 centered between the two trolley assemblies 33 prior to contact with valve 12 thus reserving sufficient travel of horizontal travel of tubes 61 (relative to assemblies 33) to enable alignment with the valve 12 along the axis perpendicular to rails 31. Assemblies 33 are allowed to free float along rails 31 to enable alignment with valve 12 along the axis parallel to rails 31.) The further lowering of each rail 31 and thus body 131 results in each ground support wheel 27 of pivotal ground support 100 contacting pivot pad 101. Said contact with pad 101 halts downward travel of body 131 (and rails 31) and the further simultaneous travel of each rail 31 affects to instead raise swing arm outer end 35 and thus to raise transport wheels 121 off of contact with the ground.

A second example of this first embodiment, system 10*b*, is illustrated in FIGS. 5 through 7. This second example comprises linear-move water delivery pipe assembly 15 and single coupler automated connector 112 and wherein connector 112 comprises independent vertical coupler connector 110*b*. Connector 110*b* comprises swing arm 16, transporter 120, valve coupler 130, swing arm length adjuster 30, pivoting ground support 100 and water conveyance 125. Water conveyance 125 comprises a directed flexible conduit 126. For this second example, coupler 130 is described comprising independent vertical coupler travel 105 with coupler travel 105 comprising vertical coupler and rails travel 40. However, for this second example, coupler 130 can comprise other than travel 105 and travel 105 can comprise other than travel 40. As one example, travel 105 can comprise a vertical coupler travel 80 described later on.

Directed flexible conduit 126 functions to operably flow water between a coupler and a swing arm, the coupler movable relative to the swing arm. An example of directed flexible conduit 126 is illustrated in FIGS. 5 through 7. The exemplary conduit 126 includes a hose 124, a top pipe union 129 and a coupler body union 119 and can include a horizontal support 127 and can include a bending radius support 128.

Hose 124 comprises a flexible hose capable of carrying water. Hose 124 can comprise a reinforced hose 123. Reinforced hose 123 can comprise a suction hose and/or can comprise a helical reinforcement to prevent the forming of one or more kinks when the hose is bent. Hose 123 can comprise some other reinforced hose.

Top pipe union 129 comprises a coupling of a hose to a pipe. Union 129 can comprise a king nipple and a clamp. Union 129 comprises a near 90-degree elbow attached to the essentially horizontal swing arm supply pipe 36 thus union 129 affects to groundwardly face the connection to hose 124. (Union 129 can be other than a 90-degree elbow.) The downward facing union 129 provides that hose 124 and water weight from the directional swings of hose 124 are symmetrically loaded onto hose 124 to reduce wear on hose 124 and to help prevent hose 124 from developing a kink Top pipe union 129 is horizontally located near half way along the length of rails 31 providing to minimize the length of hose 124 and, thus, to substantially minimize kink and to substantially maximize ground clearance of hose 124

Coupler body union 119 comprises a coupling of a hose to a pipe. Union 119 can comprise a king nipple and a clamp. Union 119 comprises a 90 degree elbow. (Union 119 can be other than a 90-degree elbow.) The inward facing (facing towards pipe assembly 15) and horizontally facing elbow positions the thereto coupled hose 124 to accommodate the varying positions of hose 124 resultant from coupler body 131 travel from the travel of swing arm length adjuster 30 and coupler body 131 travel from the travel of vertical coupler and rails travel 40.

Horizontal support 127 comprises a one-third pipe-section attached to trolley 32 (can comprise other). The pipe section provides elevation support of hose 124 thus increasing ground clearance for hose 124.

Bending radius support 128 comprises a longitudinally rolled one-third pipe section attached to trolley 32 (can comprise other). The pipe section provides radial support to hose 124 to reduce wear to hose 124 when bent downward.

An example of operation of this second example of this first embodiment will now be given. Connector 110*b* can operate as described for the example of operation of the first example of this first embodiment (FIGS. 1 through 4). Said operation results in the positioning extremes of the trolley 32 (and thus coupler body 131) along rails 11 illustrated in FIGS. 2 and 4 through 6. Said positioning extremes present generally corresponding force extremes subjected to directed flexible conduit 126. FIG. 2 illustrates movable coupler body 131 positioned for coupling to an access valve 12 and, thus, the corresponding positioning of conduit 126. FIG. 4 illustrates movable coupler body 131 coupled to an access valve 12 and, thus, the corresponding positioning of directed flexible conduit 126. FIG. 5 illustrates movable coupler body 131 positioned at the outward end of rails 31 and, thus, the corresponding positioning of directed flexible conduit 126. FIG. 6 illustrates movable coupler body 131 positioned at the inward end of rails 31 and, thus, the corresponding positioning of conduit 126.

Embodiments of single coupler automated connector 112, including embodiments employing directed flexible conduit 126, can employ a hose brace 85. Brace 85 functions to maintain vertical position during bending. An example of hose brace 85 is illustrated in FIG. 6. The exemplary brace 85 provides to maintain hose 123 residing substantially in a vertical plane, in this example, above coupler body 131. In other words, the exemplary brace keeps hose 123 from flopping to one side or the other when bent (rolled) upward. Brace 85 is attached at one end to union 119 and at the other end to hose 123. Brace 85 comprises a union half 83, a hose half 84 and a brace joint 86. Union half 83 is welded to union 119. Hose half 84 is attached to hose 123. Joint 86 is a hinge mounted between half 83 and half 84. Joint 86 allows rotation in a substantially vertical plane and maintains rigidity from movement outside of said vertical plane.

FIG. 7 is a view similar to that of the apparatus illustrated in FIG. 4 showing water conveyance 125 comprising directed flexible conduit 126 where conduit 126 is configured without horizontal support 127. FIG. 7 serves to illustrate the reduction in ground clearance without support 127.

A third example of this first embodiment, system 10c, is illustrated in FIGS. 8 through 10. This third example comprises linear-move water delivery pipe assembly 15 and single coupler automated connector 112 and wherein connector 112 comprises independent vertical coupler connector 110c. Connector 110c comprises swing arm 16, transporter 120, valve coupler 130, swing arm length adjuster 30, pivoting ground support 100 and water conveyance 125. Water conveyance 125 comprises a flexible conduit with pivoting conduit 140. For this third example, valve coupler 130 comprises independent vertical coupler travel 105 with coupler travel 105 comprising vertical coupler and rails travel 40. However, for this third example, coupler 130 can comprise other than travel 105 and travel 105 can comprise other than travel 40. For example, travel 105 can comprise a vertical coupler travel 80 described later on.

Flexible conduit with pivoting conduit 140 functions to operably flow water between a coupler and a swing arm, the coupler movable relative to the swing arm. One example of flexible conduit with pivoting conduit 140 is illustrated in FIGS. 8 through 10 (also illustrated in FIGS. 11 and 12). The exemplary flexible conduit with pivoting conduit 140 includes at least one flexible conduit 135 and at least one pivoting conduit 145. Flexible conduit with pivoting conduit 140 can include a drain vent 184.

Figure 11:
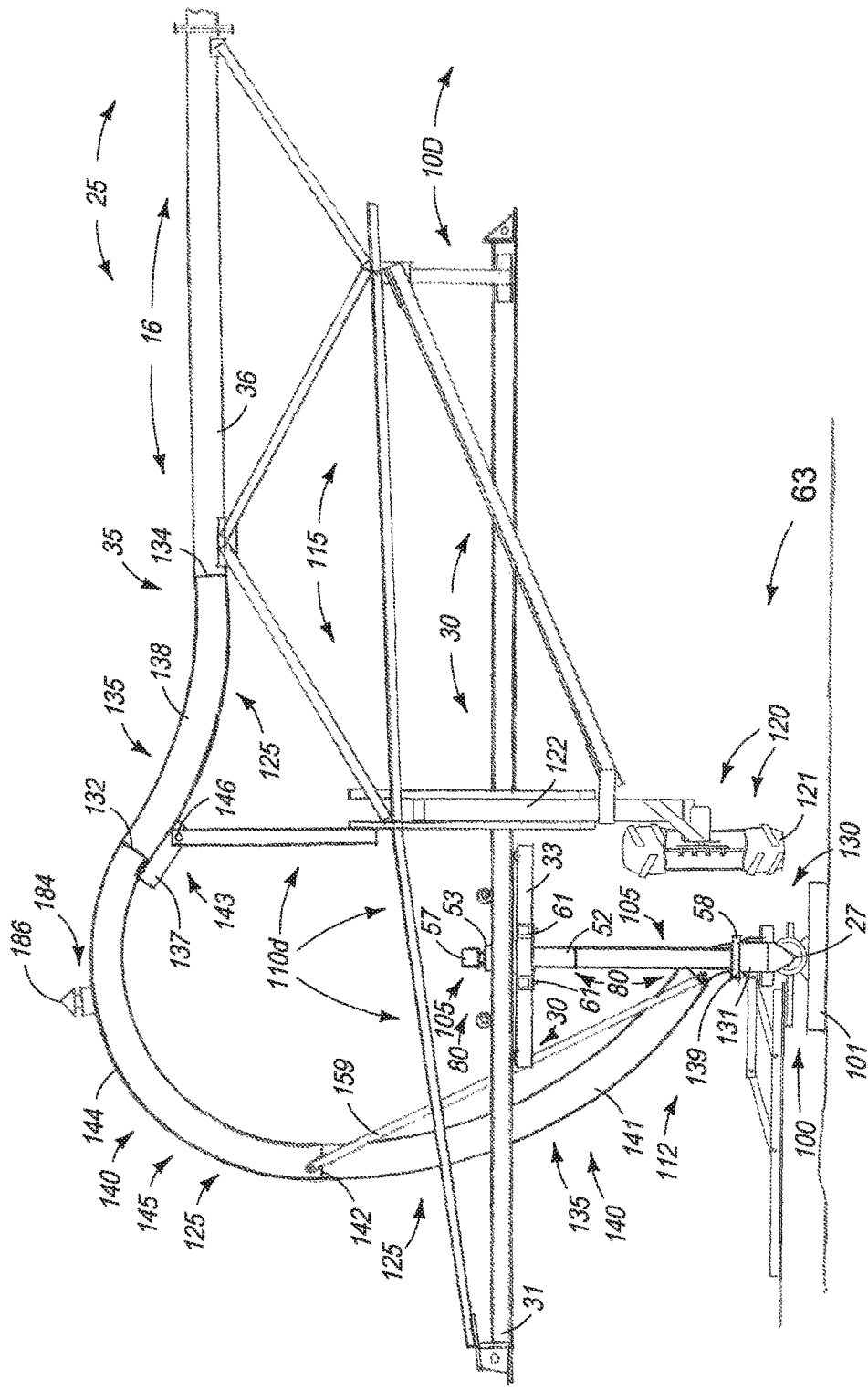
FIG. 11 is a side elevation view of an outer end of a swing arm of an automated connector of the present invention sporting a transporter, a valve coupler, a swing arm length adjuster and a water conveyance and wherein the valve coupler includes a vertical coupler travel.
Figure 12:
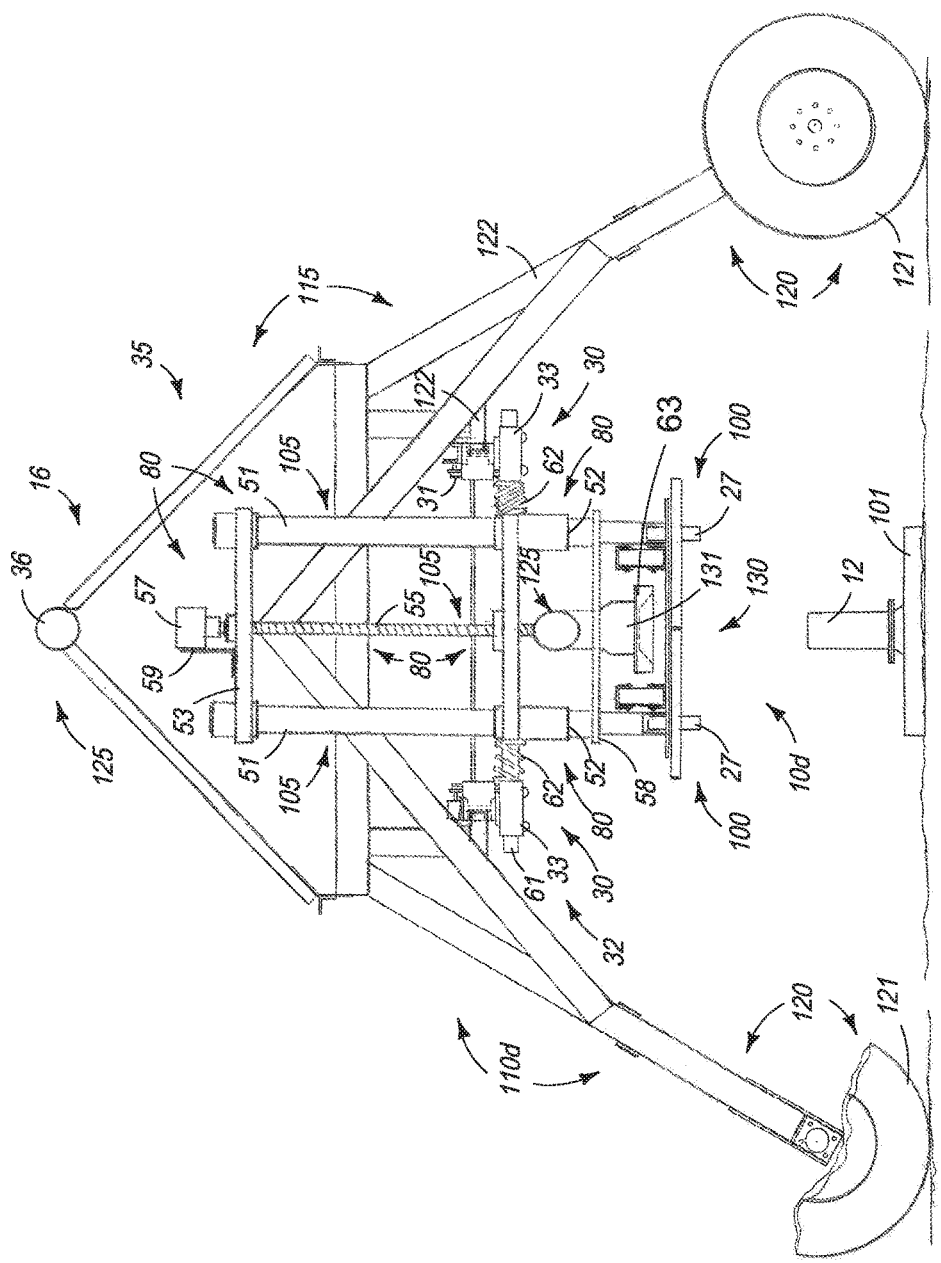
FIG. 12 is an end elevation view of the apparatus illustrated in FIG. 11.

One example of flexible conduit 135 is illustrated in FIGS. 8 through 10 (also illustrated in FIGS. 11 and 12). The exemplary flexible conduit 135 comprises a top hose 138 and a bottom hose 141.

Top hose 138 comprises a bendable hose capable of carrying water. Hose 141 can comprise the prior described reinforced hose 123 or can be some other hose. Top hose 138 can comprise swing arm pipe union 134 and can comprise rolled pipe upper union 132. Swing arm pipe union 134 comprises a coupling of a hose to a pipe. Union 134 can comprise a king nipple and a clamp. Said nipple can be welded to the end of swing arm top pipe 36. The outward-facing union 134 (nipple, facing away from pipe assembly 15) provides to orient top hose 138 to accommodate essentially all orientations from the pivoting of rolled pipe 133 (pipe 133 of pivoting conduit 145 described below). Rolled pipe upper union 132 comprises a coupling of a hose to a pipe. Union 132 can comprise a king nipple and a clamp. Said nipple can be welded to an upper end of rolled pipe 133 (of pivoting conduit 145 described below). Said nipple can be essentially linearly aligned with the direction of the longitudinal axis of pipe 133 at the welded-to end of pipe 133 to thus substantially increase flow efficiency.

Bottom hose 141 comprises a bendable hose capable of carrying water. Hose 141 can comprise the prior described reinforced hose 123 or can be some other hose. Bottom hose 141 can comprise rolled pipe lower union 142 and can comprise coupler body union 139. Rolled pipe lower union 142 comprises a coupling of a hose to a pipe. Union 142 can comprise a king nipple and a clamp. Said nipple can be welded to a lower end of rolled pipe 133 (pipe 133 of pivoting conduit 145 described below). Said nipple can be essentially linearly aligned with the direction of the longitudinal axis of rolled pipe 133 at the welded-to end of rolled pipe 133 to thus substantially increase flow efficiency. Coupler body union 139 comprises a coupling of a hose to a pipe. Coupler body union 139 can comprise a king nipple and a clamp. Union 139 can comprise a 45-degree elbow as illustrated. The outward (away from pipe assembly 15) and upward facing elbow provides to orient bottom hose 141 generally upward and outward to accommodate essentially all movement of coupler body 131 in combination with accommodating all orientations from the pivoting of rolled pipe 133, said pivoting resultant from said movement of coupler body 131.

Pivoting conduit 145 functions to pivotably enable water flow. An example of pivoting conduit 145 is illustrated in FIGS. 8 through 10 (also illustrated in FIGS. 11 and 12). The exemplary pivoting conduit 145 comprises a length of conduit 144 and a pivoting mount 143.

Length of conduit 144 comprises a conduit capable of water flow. An example of length of conduit 144 is illustrated in FIGS. 8 through 10. The exemplary length of conduit 144 comprises a rolled pipe 133. Pipe 133 can be a light gauge aluminum round tube (or light gauge steel tube/pipe) machine shop rolled into a segment of the circumference of a circle, for example a circumference have a ten foot diameter. The segment can be, for example, 120 degrees of the 360 degrees in a circle. (As another example, length of conduit 144 can be a straight length of round tube/pipe capable of water flow.)

Pivoting mount 143 comprises a pivot for pivoting length of conduit 144. An example of pivoting mount 143 is illustrated in FIGS. 8 through 10. The exemplary pivoting mount 143 comprises an axle with bearing 146, a mount 147, a strut 148 and a support 137. Strut 148 is welded at a bottom end to transport frame 122. Axle with bearing 146 is mounted at a top end of strut 148. The axle component of axle with bearing 146 is welded to support 137. Support 137 is welded to an upper end of rolled pipe 133. The bearing enables the axle to rotate thus allowing support 137, and thus rolled pipe 133, to rotate in a substantially vertical plane. (The vertical plane is substantially longitudinally aligned with the longitudinal axis of swing arm supply pipe 36.)

An example of operation of this third example of this first embodiment will now be given. Connector 110c can operate as described for the example of operation of the first example of this first embodiment. Said operation results in the positioning extremes of the trolley 32 (and thus coupler body 131) along rails 31 illustrated in FIGS. 8 through 10. Said positioning extremes present the essentially corresponding force extremes subjected to flexible conduit with pivoting conduit 140. FIG. 8 illustrates movable coupler body 131 positioned for coupling to an access valve 12 and, thus, the corresponding positioning of flexible conduit with pivoting conduit 140. FIG. 9 illustrates coupler body 131 coupled to an access valve 12 and positioned at the outward end of rails 31 and, thus, the corresponding positioning of flexible conduit with pivoting conduit 140. FIG. 10 illustrates coupler body 131 coupled to an access valve 12 and positioned at the inward end of rails 31 and, thus, the corresponding positioning of flexible conduit with pivoting conduit 140.

The exemplary flexible conduit with pivoting conduit 140 can include a pivotable link 159 illustrated in FIG. 11. Link 159 is shown mounted to extend between rolled pipe lower union 142 and coupler body union 139. One end of the link 159 is pivotably mounted to lower union 142 and at the other end of the link 159 is pivotably mounted to body union 139. Wherever trolley 32 is positioned along rails 31 and when trolley 32 translates along rails 31, link 159 serves to provide support for bottom hose 141.

Pivoting conduit 140 can include a drain vent 184. An example of drain vent 184 is illustrated in FIGS. 8 through 11. The exemplary vent 184 includes a vent 186. Vent 186 can be coupled to a top side of rolled pipe 133 as shown. Vent 186 allows air to enter pipe 133 when coupler body 131 is not coupled to an access valve 12. Vent 186 provides to close and thus not allow air to enter pipe 133 or water to escape from pipe 133 when body 131 is coupled to a valve 12 and, thus, when water pressure exists in pipe 133. By enabling air to enter conveyance 125, drain vent can provide for the water located in conveyance 125 to drain out of body 131, for example, to lighten conveyance 125 during transport between access valves 12.

A fourth example of this first embodiment of linear-move irrigation system 10, system 10d, is illustrated in FIGS. 11 and 12. This fourth example comprises independent vertical coupler connector 110d. Connector 110d comprises swing arm 16, transporter 120, valve coupler 130, swing arm length adjuster 30, pivoting ground support 100 and water conveyance 125. For this fourth example, valve coupler 130 comprises independent vertical coupler travel 105 and coupler travel 105 comprises a vertical coupler travel 80. For this fourth example, water conveyance 125 can comprise any means to operably flow water between coupler body 131 and swing arm 16. (Conveyance 125 is shown employing flexible conduit with pivoting conduit 140. Conveyance 125 can be directed flexible conduit 126 or can be or comprise the described swing pipe disclosed in U.S. Pat. No. 6,431,475, or can be some other contrivance.)

Vertical coupler travel 80 functions to provide essentially vertical travel of a valve coupler. An example of vertical coupler travel 80 is illustrated in FIGS. 11 and 12. The exemplary travel 80 includes two of a stabilizer pipe 51, two of a nylon linear bearing 52, a top beam 53, a bearing block 54, a lead screw 55, a screw nut 56 and a hydraulic motor 57, a horizontal support 58 and a motor mount 59.

Each stabilizer pipe 51 extends substantially vertically and is affixed at a bottom end to one of the two ends of horizontal support 58. Coupler body 131 is affixed to support 58 substantially in the center of support 58 (between said two ends). Each linear bearing 52 is fitted inside a pipe with said pipe affixed to the two horizontal tubes 61, said pipe substantially centered between the two tubes 61 (tubes 61 of coupler 32), each linear bearing 52 positioned between lead screw 55 and the springs 62 adjacent to one of the roller assemblies 31. Each bearing 52 provides support and thus stability to the respective stabilizer pipe 51. Each end of top beam 53 is secured to the top end of the respective stabilizer pipe 51. Bearing block 54 is mounted at the center of the length of top beam 53. A top end of lead screw 55 is affixed to bearing block 54 enabling screw 55 to rotate while restricting screw 55 from vertical travel. Screw nut 56 is affixed to the two horizontal tubes 61 substantially centered between the two tubes 61. Rotation of screw 55 causes nut 56 to travel/run along screw 55. Motor mount 59 is affixed to top beam 53 with hydraulic motor 57 bolted to mount 59 such that motor 59 substantially resides at the center of the length of beam 53. Hydraulic motor 57 is coupled to the top end of lead screw 55 such that operation of motor 57 rotates screw 55. (In contrast to the example of vertical coupler and rails travel 40, the exemplary coupler travel 80 is not configured to cause rails 31 of length adjuster 30 to travel vertically along with coupler body 31. Instead, rails 31 are fixed in position. Each rail 16 is attached near one end to swing arm 16 and attached toward the other end to transport leg frame 122 as shown in FIGS. 11 and 12.)

An example of operation of vertical coupler travel 80 will now be given. Hydraulic motor 57 is powered to turn in the appropriate direction to result in the lowering of coupler body 131. Turning motor 57 turns the coupled-to lead screw 55. The turning screw 55 turns inside screw nut 56 forcing top beam 53 to travel toward horizontal tubes 61 and, thus, to travel downward meaning stabilizer pipes 51 are also forced to travel downward. Each stabilizer pipe 51 travels downward guided by the respective linear bearing 52. Downward travel of stabilizer pipes 51 correlates to downward travel of body 131 (body 131 being attached to pipes 51 via support 58). Downward body 131 enables mating with and coupling to an access valve 12. (Springs 62 of valve coupler 130 maintain body 131 centered between the two trolley assemblies 33 prior to contact with valve 12 thus reserving sufficient horizontal travel of tubes 61 relative to assemblies 33 to enable alignment with the valve 12 along the axis essentially perpendicular to rails 31. Assemblies 33 are allowed to free float along rails 31 to enable alignment with valve 12 essentially along the axis parallel to rails 31.) Further downward travel subsequently results in wheels 27 of support 100 contacting pad 101 (FIG. 11). Said contact causes a halt to the downward travel of body 131 and, instead, upward travel of swing arm outer end 35 correlating to upward travel of transport wheels 121 subsequently raising wheels 121 off of the ground. (Powering motor 57 to turn in the direction opposite the above-said appropriate direction results in the raising of coupler body 131.)

Figure 13:
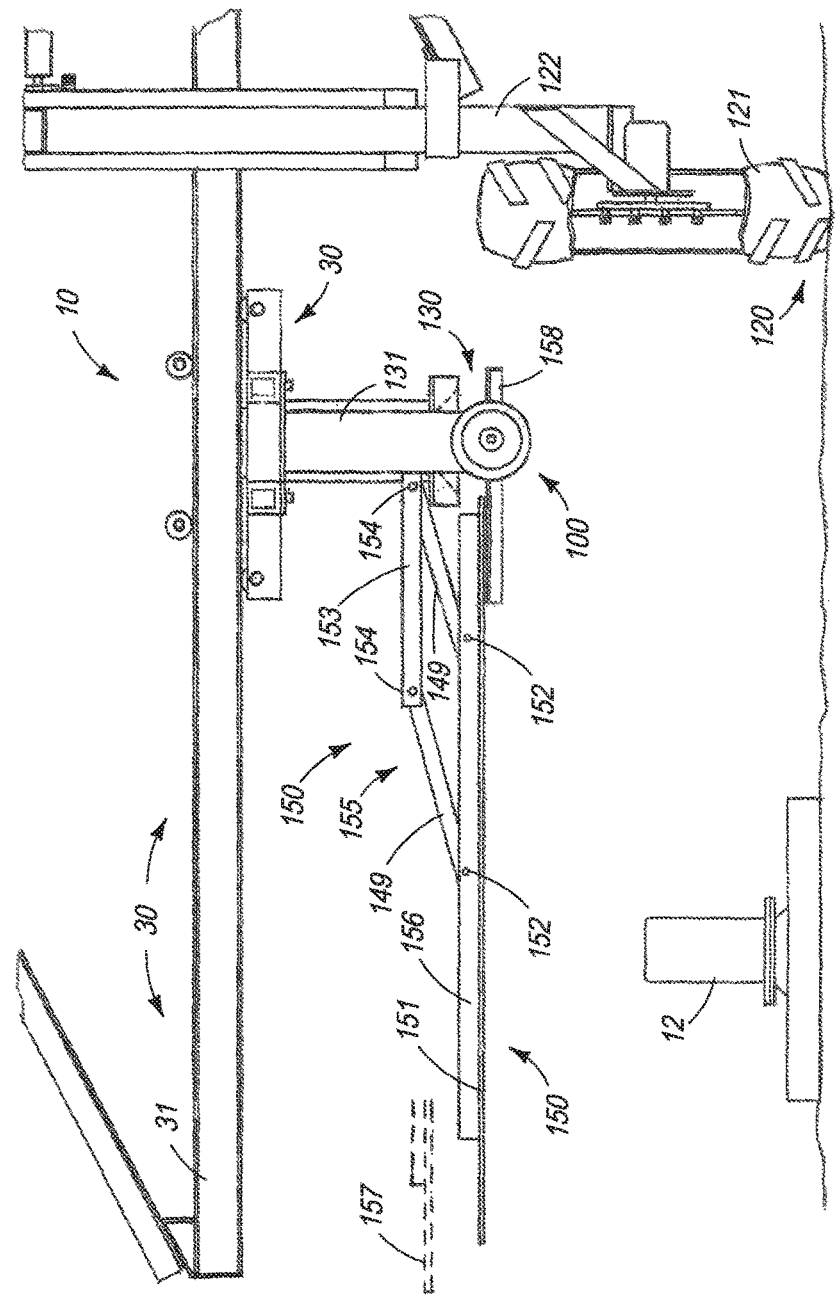
FIG. 13 is a side elevation enlarged view of a parallel raise and lower plank illustrated in FIG. 2.

Automated connector 115, single coupler automated connector 112 and independent vertical coupler connector 110 can each be enhanced by employment of a parallel raise and lower plank 150. Parallel raise and lower plank 150 functions to maintain a valve detector plank essentially horizontal during valve detection. An exemplary parallel raise and lower plank 150 is illustrated generally in FIG. 2 with an enlarged view in FIG. 13. The exemplary plank 150 provides to improve clearance above crop and/or valve. The exemplary plank 150 (FIG. 13) includes a detector plank 151, a plank channel 156, a plank pivot 152, a plank mount 153, a plank mount pivot 154 and pivoting links 155.

In one example, detector plank 151 comprises a four-foot wide by six-foot long by one-half inch thick board made of UHMW (ultra-high molecular weight plastic).

Plank channel 156 comprises two channels which can be fabricated from aluminum or the like. Each of two of channel 156 mount essentially longitudinally to the UHMW board open end up, parallel to each other and extending essentially longitudinally parallel to the longitudinal axis of swing arm supply pipe 36.

Plank pivot 152 comprises two sets of two holes formed into each of the two channels of plank channel 156, each set formed along the axis essentially perpendicular to the length of the channel such as to enable a bolt or other securing device to slide through both legs of the channel (one channel illustrated).

Plank mount 153 comprises two channels mounted to trolley 32 open end down, parallel to each other and extending essentially longitudinally parallel to the longitudinal axis of swing arm supply pipe 36.

Plank mount pivot 154 comprises two sets of two holes formed into each of the two channels of plank mount 153, each set formed along the axis essentially perpendicular to the length of the channel such as to enable a bolt or the like to slide entirely through both legs of the channel as illustrated (only one channel illustrated).

Pivoting link 155 comprises four bars 149 which can be for example, two-inch thick by four-inch wide by four feet long UHMW solid bars with each bar 149 having one hole formed through the four-inch width at each end, said hole of similar size to that formed in pivot 152 and pivot 154. In the example, link 155 includes eight bolts. Each bolt runs through one of the sets of holes in either pivot 152 or pivot 154 and through one of the holes in one of the ends of one of the bars 149 of link 155. Each bar 149 acts as pivoting link between channel 156 and mount 153. Upward movement of plank 151 causes each bar 149 of link 155 to pivot about each of the two bolts extending there through. Each bar 149 rotates essentially vertically and upward providing that plank 151 travels upward while maintaining the length of plank 151 substantially horizontal.

An example of operation of parallel raise and lower plank 150 will now be given. Coupler body 131 is lowered to the point where detector plank 151 mates against access valve 12. Continued lowering of coupler body 131 forces plank 151 upward causing each of the four links of pivoting link 155 to simultaneously swing upward. The simultaneous swinging of links 155 holds plank 151 substantially parallel as plank 151 moves upward. (A detected limit switch can be used to halt the lowering of body 131 and, thus, halt the upward movement of plank 151. The position of the end of plank upon conclusion to upward travel is illustrated in dashed lines 157). Trolley 32 is then operated to travel outward (away from pipe assembly 15) until a limit switch or the like indicates that valve 12 has contacted a V-shaped catcher 158. When valve 12 nears V-catcher 158, the top of valve 12 slides off the inner end (end toward pipe assembly 15) of plank 151 causing plank 151 to lower until resuming the fully lowered position illustrated. Valve 12 now resides such that the inner end of plank 151 holds valve 12 so that trolley 32 can not migrating any significant distance outwardly from V-catcher 158. Subsequently, body 131 is lowered onto valve 12.

Figure 14:
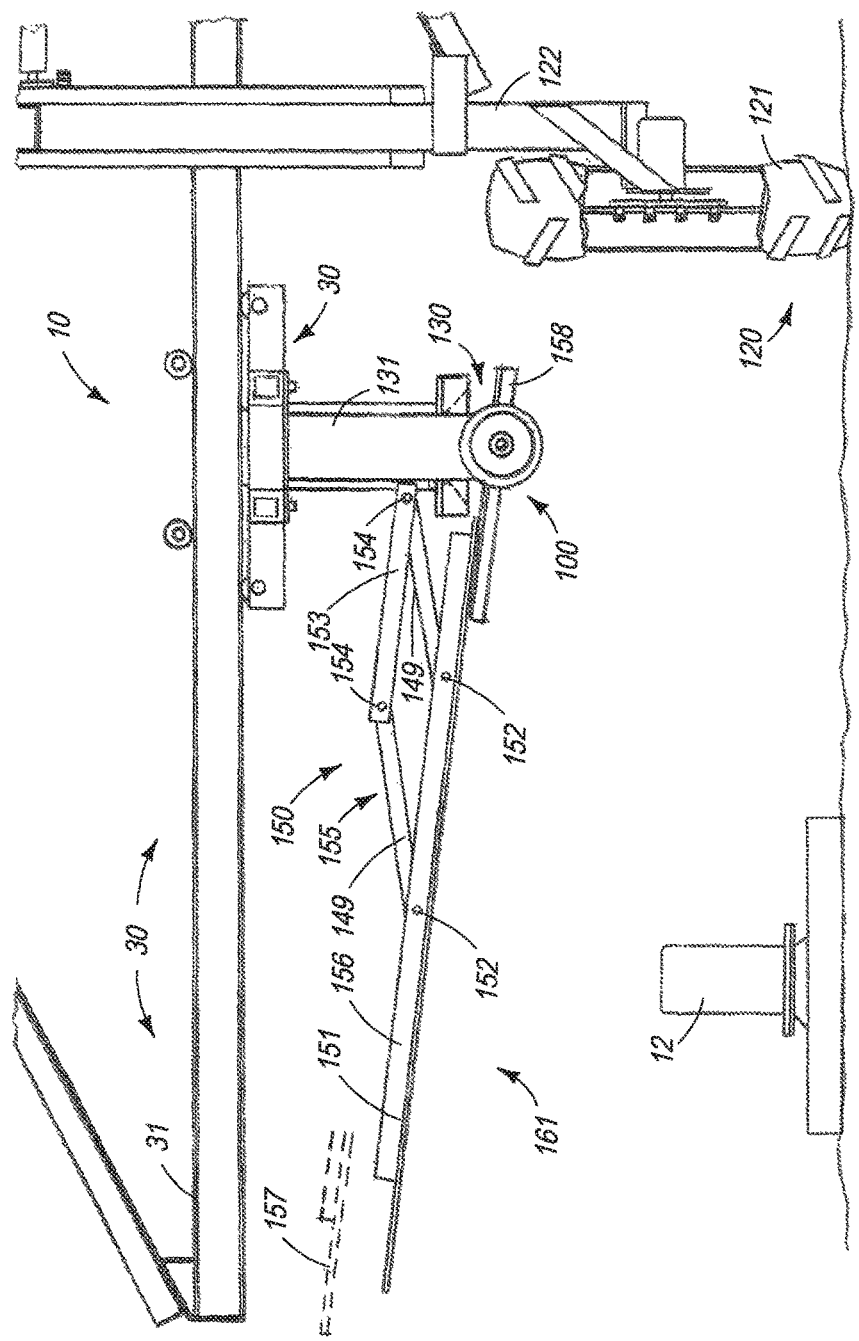
FIG. 14 is a view of the parallel raise and lower plank illustrated in FIG. 13 with the apparatus rotated providing an upward slant.

Automated connector 115, single coupler automated connector 112 and independent vertical coupler connector 110 can each be enhanced by employment of an upward slanted parallel raise and lower plank 161. Upward slanted parallel raise and lower plank 161 functions to employ an upward slant with a parallel raise and lower plank to detect a valve. An example of upward slanted parallel raise and lower plank 161 is illustrated in FIG. 14. The exemplary upward slanted parallel raise and lower plank 161 provides to improve clearance above crop and/or valve. The exemplary upward slanted parallel raise and lower plank 161 comprises the above-described parallel raise and lower plank 150 with the apparatus rotated such that plank 151 is oriented inclined slanting upward in the direction away from pipe assembly 15. Said upward slant provides additional clearance above an access valve 12 for when the plank 151 traverses over said valve just prior to coupler body 131 being lowered onto said access valve. The upward slant also provides extra clearance above crop when body 131 is fully engaged to valve 12 and wheels 27 are residing on pad 101.

An example of operation of upward slanted parallel raise and lower plank 161 will now be given. Coupler body 131 is lowered to the point where detector plank 151 mates against access valve 12. Continued lowering of coupler body 131 forces plank 151 upward causing each of the four links of pivoting link 155 to simultaneously swing upward. A detected limit switch halts the lowering of body 131 and, thus, halts the upward movement of plank 151. (The position of the end of plank upon conclusion to upward travel is illustrated in dashed lines 157). Body 151 is then raised until the limit switch turns off. Trolley 32 is then operated to travel outward (away from pipe assembly 15). Said outward travel results in valve 12 again contacting plank 151 again forcing plank 151 upward until the limit switch again trips. Again body 131 is raised until turning off. This process is repeated until a limit switch indicates that valve 12 has contacted V-shaped catcher 158. Subsequently, body 131 is lowered onto valve 12.

Figure 15:
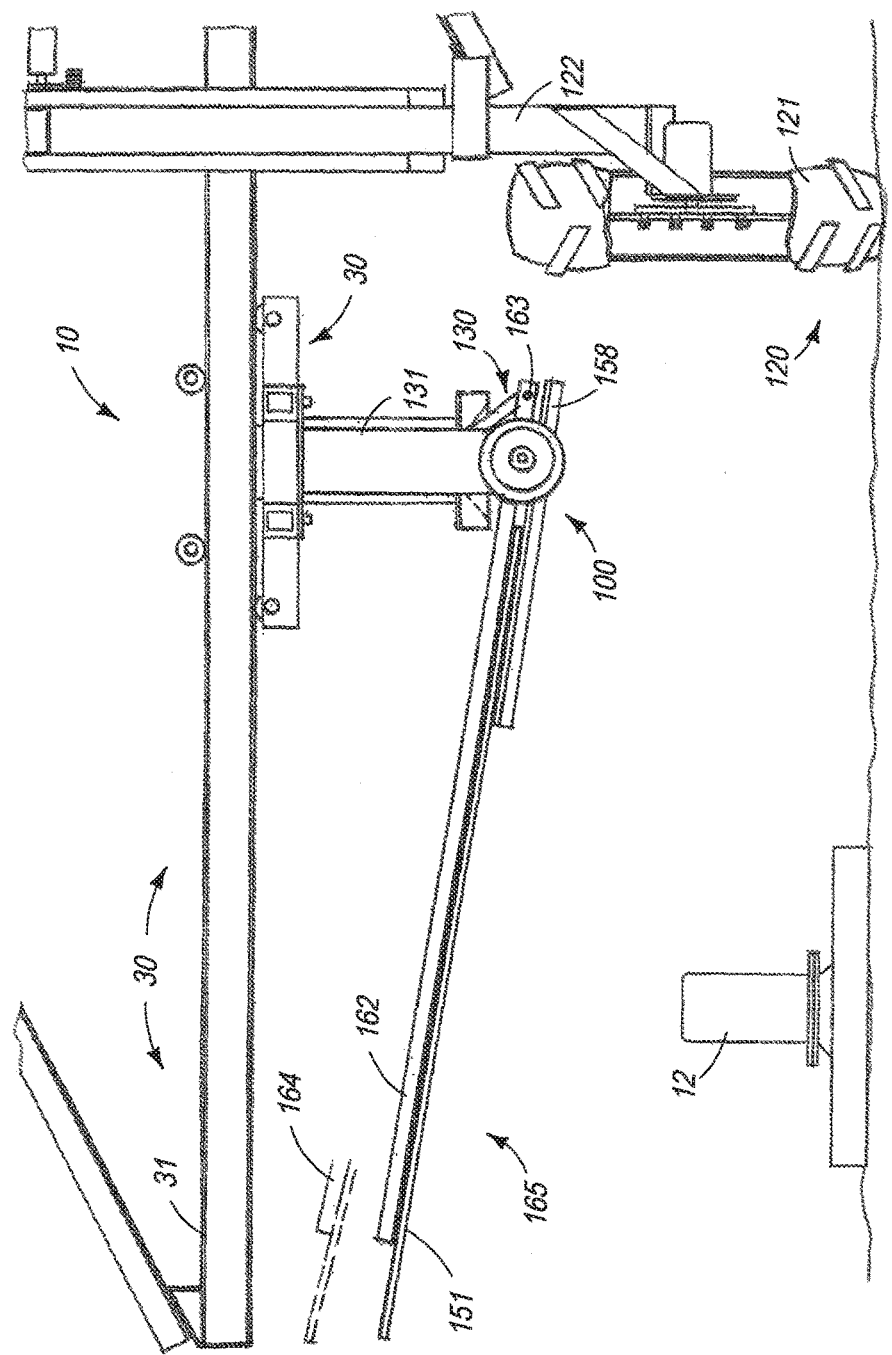
FIG. 15 is a side elevation enlarged view of an upwardly slanted pivoting plank attached to the valve coupler illustrated in FIG. 2 in place of the parallel raise and lower plank.

Automated connector 115, single coupler automated connector 112 and independent vertical coupler connector 110 can each be enhanced by employment of an upward slanted pivoting plank 165. Upward slanted pivoting plank 165 functions employ and upwardly slanted pivoting plank to detect a valve. An example of upward slanted pivoting plank 165 is illustrated in FIG. 15. The exemplary plank 165 facilitates clearance above crop and/or valve. The exemplary plank 165 includes the prior described detector plank 151, two of a plank channel 162 attached to the top side of plank 151 extending essentially parallel to each other along the length of the plank and a pivot 163 pivotably attached to the inward end (inward is toward assembly 15) of channel 162.

An example of operation of upwardly slanted pivoting plank 165 will now be given. Coupler body 131 is lowered to the point where detector plank 151 mates against access valve 12. Continued lowering of coupler body 131 forces plank 151 upward causing channels 162 and plank 151 to rotate upward until reaching the position of the end of plank upon conclusion to upward travel illustrated in dashed lines 164. A detected limit switch halts the lowering of body 131 and, thus, halts the upward movement of plank 151. Body 151 is then raised until the limit switch turns off. Trolley 32 is then operated to travel outward (away from pipe assembly 15). Said outward travel results in valve 12 again contacting plank 151 again forcing plank 151 upward until the limit switch again trips. Again body 131 is raised until turning off. This process repeats until a limit switch indicates that valve 12 has contacted V-shaped catcher 158. Subsequently, body 131 is lowered onto valve 12.

Figure 18:
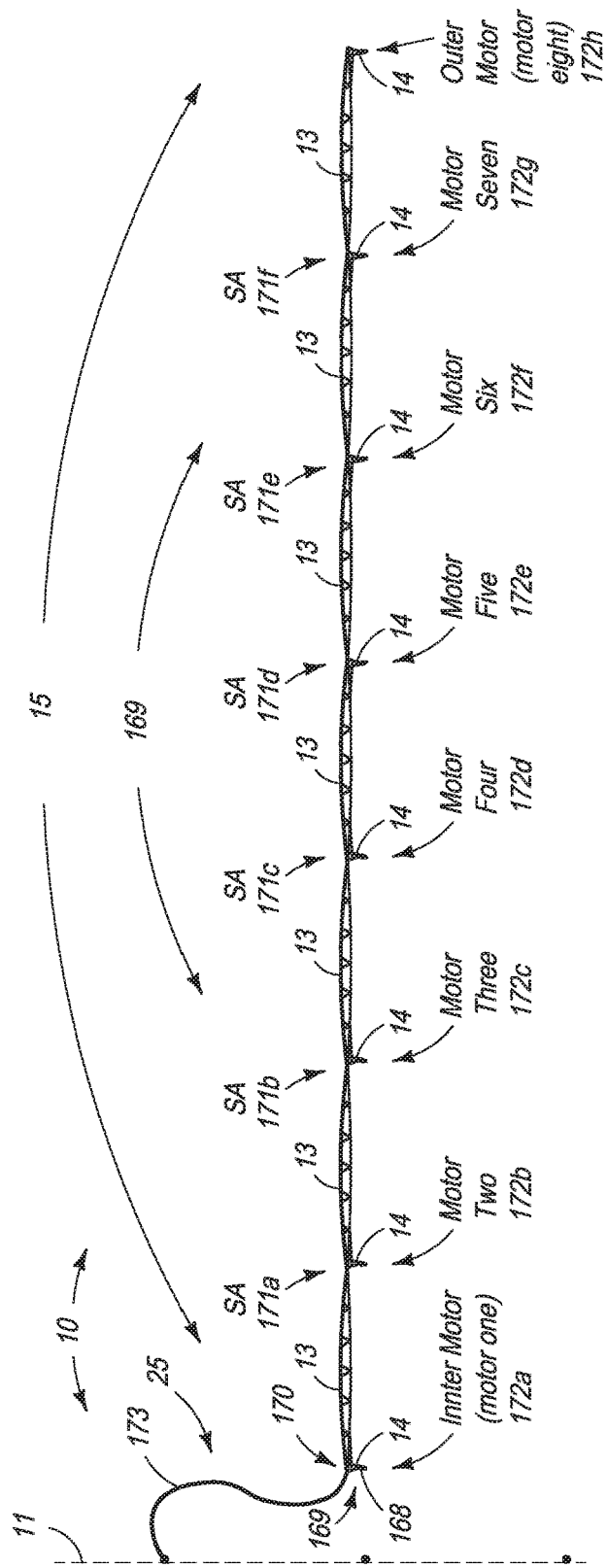
FIG. 18 illustrates an example of a linear-move water delivery pipe assembly including seven lengths of trussed delivery pipe 13.

A second embodiment of linear-move irrigation system 10 is illustrated in FIG. 18. This second embodiment comprises one or the other of linear-move water delivery pipe assembly 15 (described prior) and a pivotable linear-move delivery pipe assembly 169 and further comprises connector 25 (described prior). For this second embodiment, linear-move water delivery pipe assembly 15 and pivotable linear-move delivery pipe assembly 169 each comprise a staggered drive motors 170.

FIG. 18 illustrates an example of linear-move water delivery pipe assembly 15 comprising seven lengths of trussed delivery pipe 13. Each pipe 13 is ground supported at each end by a movable cart 14. A drive motor 172 is mounted to each cart 14. Assembly 15 comprises inner motor 172a (motor 1), motor two 172b, motor three 172c, motor four 172d, motor five 172e, motor six 172f, motor seven 172g and outer drive motor 172h (motor 8). When powered, each motor 172 functions to propel the mounted-to cart 14 along the ground and, thus, to propel the cart-supported end of two of the pipes 13. (The two pipes 13 are pivotably coupled together essentially at cart 14 with cart 14 ground supporting both pipes with the exception that the inner and outer carts 14 support only one end of a pipe 13.) The exemplary assembly 15 includes six of a span alignment 171 (shown as SA 171a through SA 171f) with each span alignment 171 typically located at or near said coupling between said two delivery pipes 13. Each span alignment 171 functions to maintain the two delivery pipes 13 longitudinally aligned with respect to each other. When the two delivery pipes 13 are out of alignment, the misalignment trips a limit switch of the respective alignment 171 (alignment 171 illustrated in FIGS. 20 and 21). The tripped limit switch causes the drive motor 172 mounted to the cart 14 located below said alignment 171 to operate in the appropriate direction to propel the cart 14 until the out-of-alignment pipes 13 have returned to alignment. For example, if the limit switch of span alignment 171b trips, the tripped switch directs power to motor three 172c causing the drive on the mounted thereto cart 14 to propel travel until the limit switch is no longer tripped. (Pipes 13, carts 14, drive motors 172, span alignments 171 and maintaining pipes 13 longitudinally aligned is common in the industry. Drive 18, described prior (FIG. 16), provides to maintain linear alignment of the water delivery pipes 13 while powering each cart 14 to travel in a direction perpendicular to the lengths of water delivery pipe 13 and is common in the industry and commonly employs drive motors 172 and span alignments 171. The illustrated seven lengths of trussed delivery pipe 13 is a configuration common in the industry employing an overall length of approximately 1320 feet to irrigate a quarter-mile wide section of land. For this example, drive motors 172 are 460-volt three-phase irrigation duty motors as is common to the industry and motors two through eight are three-quarter horsepower. Also, motors two through seven can be configured to operate at 1800 rpm and inner motor 172a (motor 1) and outer motor 172h (motor 8) can be configured to operate at less than said 1800 rpm as is common in the industry.)

The exemplary assembly 15 of FIG. 18 comprises a guidance 175 (FIGS. 19, 22, 23 and 24). Guidance 175 functions to guide pipe assembly 15 so as to maintain an orientation in the field. For this exemplary assembly 15, guidance 175 provides to legislate the operation of inner motor 172a and outer motor 172h. When guidance 175 determines that an alteration to the travel direction of pipe assembly 15 is necessary to keep assembly 15 properly oriented, guidance 175 acts by halting the operation of either of motor 172a or 172h serving to turn assembly 15 slightly. The operation of motor 172a and/or motor 172h, whether to maintain alignment or to forward the delivery pipe, will generate a misalignment detected at alignment 171a and/or 171f (respectively). In other words, the triggering of the operation of motors 172b, 172c, 172d, 172e, 172f and 172g by their respective span alignments 171 is in reaction to the operation of inner motor 172a and outer motor 172h a. (Guidance 175 is common in the industry.)

The exemplary assembly 15 of FIG. 18 further comprises a percentage timer 176 (FIGS. 19, 22, 23 and 24). Percentage timer 176 functions to regulate the percent of time pipe assembly 15 travels. For this exemplary assembly 15, timer 176 enables a farmer to set the amount of water applied by pipe assembly 15 by indicating the correlating percent of time assembly 15 is to travel to achieve said amount of water applied. As one example, timer 176 can include an adjusting dial, said dial located on the face of timer 176. The dial enables the farmer to rotate the dial to an indicated percent setting. For example, at a setting of 100%, assembly 15 is operated to travel 100% of the time, 60% equates to travel 60% of the time, etc. Timer 176 implements said setting by providing a signal for a given length of time (commonly one of 30 or 60 seconds) and then by discontinuing the signal for a length of time dictated by said setting. In response to the signal, inner motor 172a and outer motor 172h are operated with the intermediate motors two through seven operated via their respective span alignments responsive to said operation of motors 172a and 172h. In this way assembly 15 is propelled to travel. (Percentage timer 176 is common in the industry.)

System 10 can include a pivotable linear-move delivery pipe assembly 169. This second embodiment can include pivotable linear-move delivery pipe assembly 169. Assembly 169 functions to provide a delivery pipe assembly that can operate as a linear-move irrigator, for example assembly 15, and that can also operate as a pivoting delivery pipe assembly (said pivoting delivery pipe assembly essentially comprising a center-pivot irrigator. Drive components of assembly 15, assembly 169 and a center-pivot irrigator 231 are illustrated is FIGS. 19, 22, 23 and 24. (A pivoting delivery pipe assembly is common to the industry and is commonly referred to as a center-pivot irrigator. Center-pivot irrigator 231 is pivot only, thus not configured for linear-move travel. Center-pivot irrigators are well known in the industry and typically comprise substantially identical hardware as that of linear-move delivery pipe assembly 15 with the exception that the drive motors of the pivot irrigator are controlled to cause the irrigator to rotate about a fixed center-pivot point instead of controlled to cause the irrigator to travel linearly as with linear-move pipe assembly 15.)

An example of pipe assembly 169 is shown in FIG. 18. The exemplary pipe assembly 169 comprises linear-move delivery pipe assembly 15 and pivoting hardware with controls 168, hardware with controls 168 shown located at the cart 14 powered by inner motor 172a. Pivoting hardware with controls 168 provides to enable pipe assembly 15 to be rotated (thus pipe assembly 15 then operates/travels essentially as would a center-pivot irrigator for example center-pivot irrigator 231). (Pivotable linear-move delivery pipe assembly 169, in addition to operating as assembly 15, can be rotated to apply water and/or can be dry-roll rotated to re-located the assembly to another parcel of land to subsequently operate as assembly 15. In other words, assembly 169 can operate as assembly 15 and can operate as center-pivot irrigator 231. Inclusion of a pivoting hardware with controls 168 enabling pipe assembly 15 to be rotated is common in the industry, said hardware with controls 168 typically located at or in the vicinity of the cart 14 of inner motor 172a as shown.)

Pivotable linear-move delivery pipe assembly 169 can include a pivot/linear switch 178. An example of linear/pivot switch 178 is illustrated in FIGS. 19, 22, 23 and 24. The exemplary switch 178 comprises a two position manually set switch, the two positions being "Linear" and "Pivot" (preferably located in a control panel). When in the "linear" position, switch 178 is electrically connected to components of assembly 169 to instruct pivotable linear-move delivery pipe assembly 169 to travel/operate as a linear-move irrigator (assembly 15). As an example of operation, a farmer visits system 10 after assembly 169 has been traveling linearly while applying water. The farmer desires that assembly 169 now operate as center-pivot irrigator 231 (for example, to irrigate an irregular section) and so the farmer flips switch 178 from the "Linear" position to the "Pivot" position. When in the "Pivot" position, switch 178 is electrically connected to components of pivotable linear-move delivery pipe assembly 169 to instruct assembly 169 to travel/operate as a center-pivot irrigator.

Connector 25 is shown in FIG. 18 comprising a hose pull connector 173. Connector 173 can comprise a hose pulled by a two-wheel pull cart, can comprise a hose pulled by a four-wheel pull cart or can comprise other. Hose-pull connector 173 comprising two-wheel pull cart or four-wheel pull cart is common to the industry. For this second embodiment, connector 25 can comprise automated connector 115 (FIG. 1). Automated connector 115 can comprise single coupler automated connector 112 (connector 112 shown in FIGS. 1, 16 and 17). Single coupler automated connector 112 can comprise independent vertical coupler connector 110 (FIGS. 1 through 12). (As described prior: linear-move delivery pipe assembly 15 functions to deliver irrigation water to cropland; connector 25 functions to hydraulically connect a linear-move water delivery pipe to a water supply; automated connector 115 functions to automatically supply water to a linear-move irrigator; single coupler automated connector 112 functions to forward a coupler along a water main to deliver water from the main to a traveling linear-move irrigator and independent vertical coupler connector 110 functions to forward a coupler along a water main employing independent vertical coupler travel.)

Staggered drive motors 170 functions to provide staggered drive motor operation. An example of staggered drive motors 170 is shown generally in FIG. 18 located at the cart 14 of inner motor 172a (for example located in a control panel at said cart 14). Examples of staggered drive motors 170 are illustrated schematically in each of FIGS. 19 and 22 through 24. The exemplary staggered drive motors 170 provide to stagger operation of selected ones of the drive motors. In the schematics of FIGS. 19 and 22 through 24 the exemplary staggered drive motors 170 provide to stagger operation of selected ones of the drive motors 172a through 172h wherein when one or more of the selected ones are operated and/or are operational one or more other of the selected ones are not operated and/or are not operational.

Figure 19:
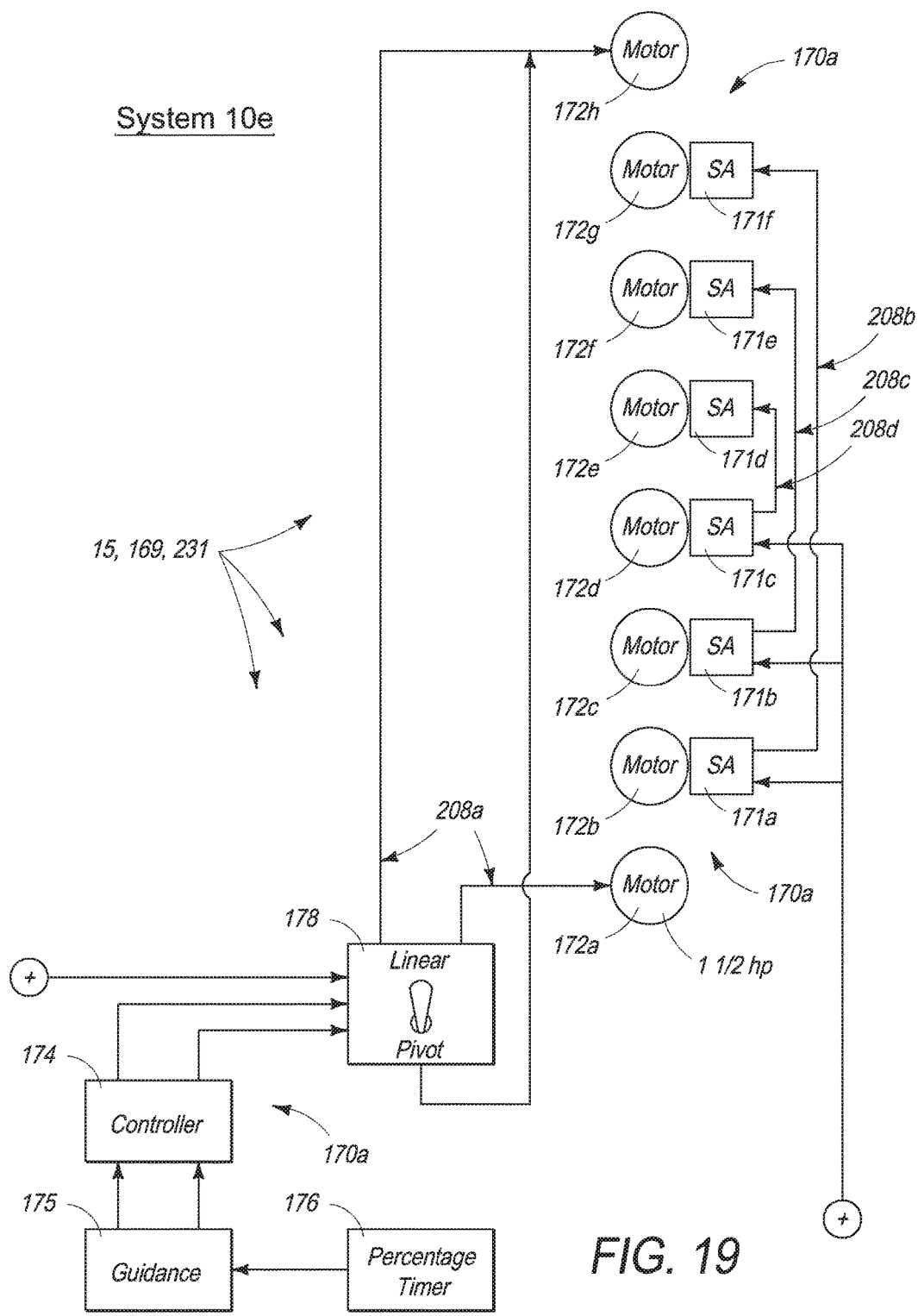
FIG. 19 is a schematic of a staggered drive motors where the water delivery pipe is configured to operate selected ones of the drive motors in staggered sets.
Figure 22:
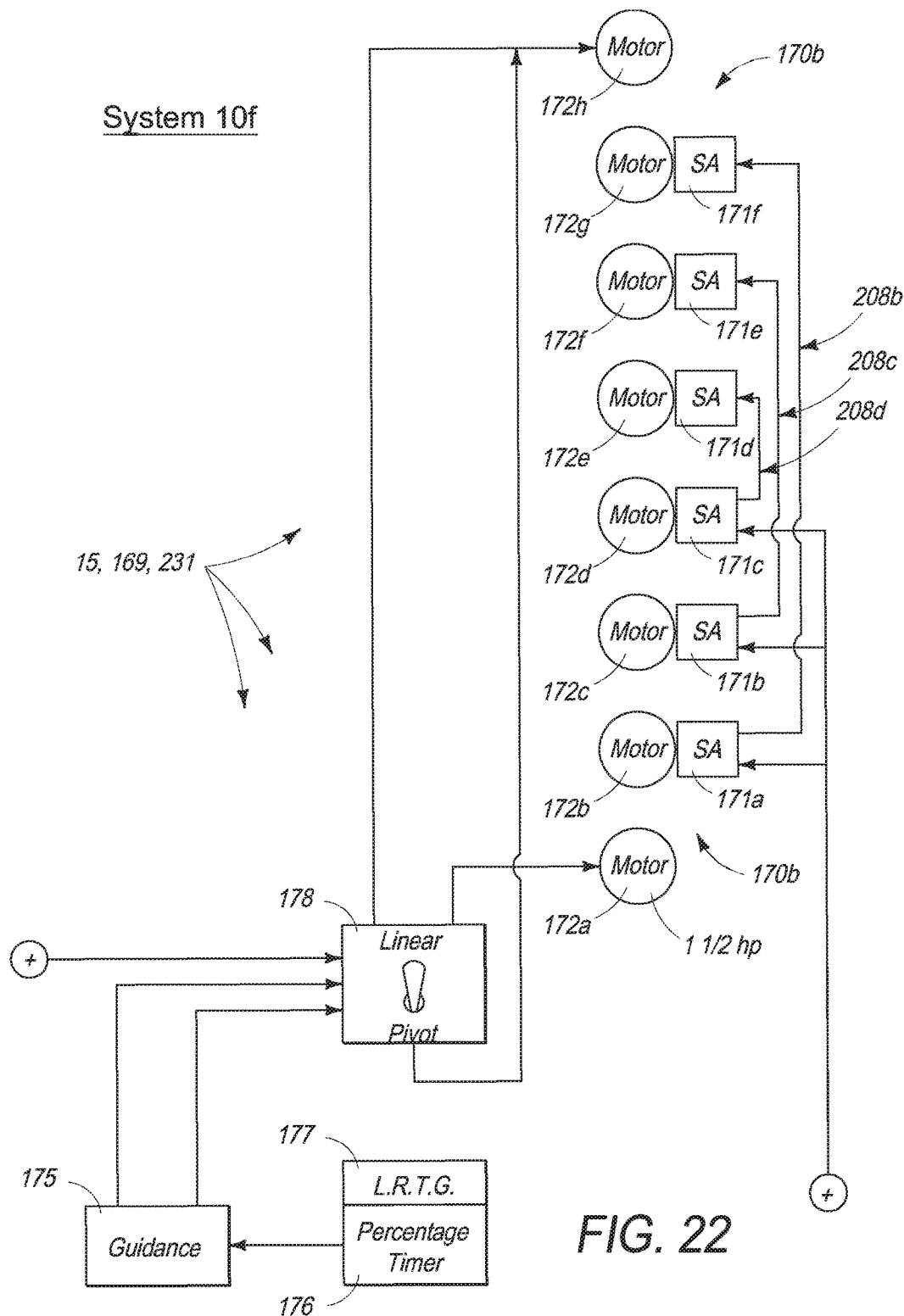
FIG. 22 is a schematic of a staggered drive motors employed in conjunction with a hose-pull linear-move irrigator where an inner drive motor and an outer drive motor are powered as a group and the remaining drive motors are configured as staggered sets.
Figure 23:
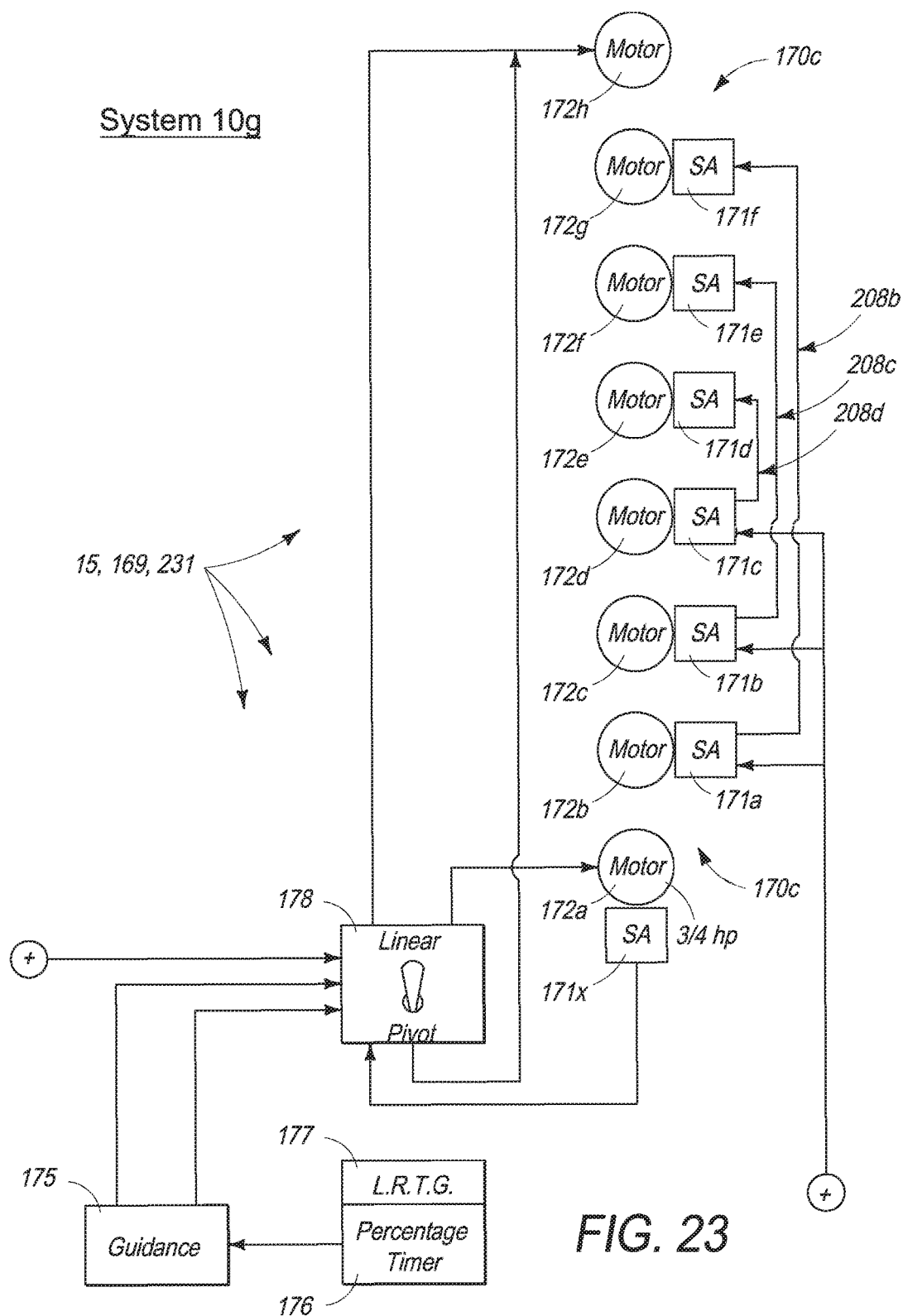
FIG. 23 is a schematic of a staggered drive motors employed in conjunction with a single coupler automated connector where an inner drive motor and an outer drive motor are powered as a group and the remaining drive motors are configured as staggered sets.
Figure 24:
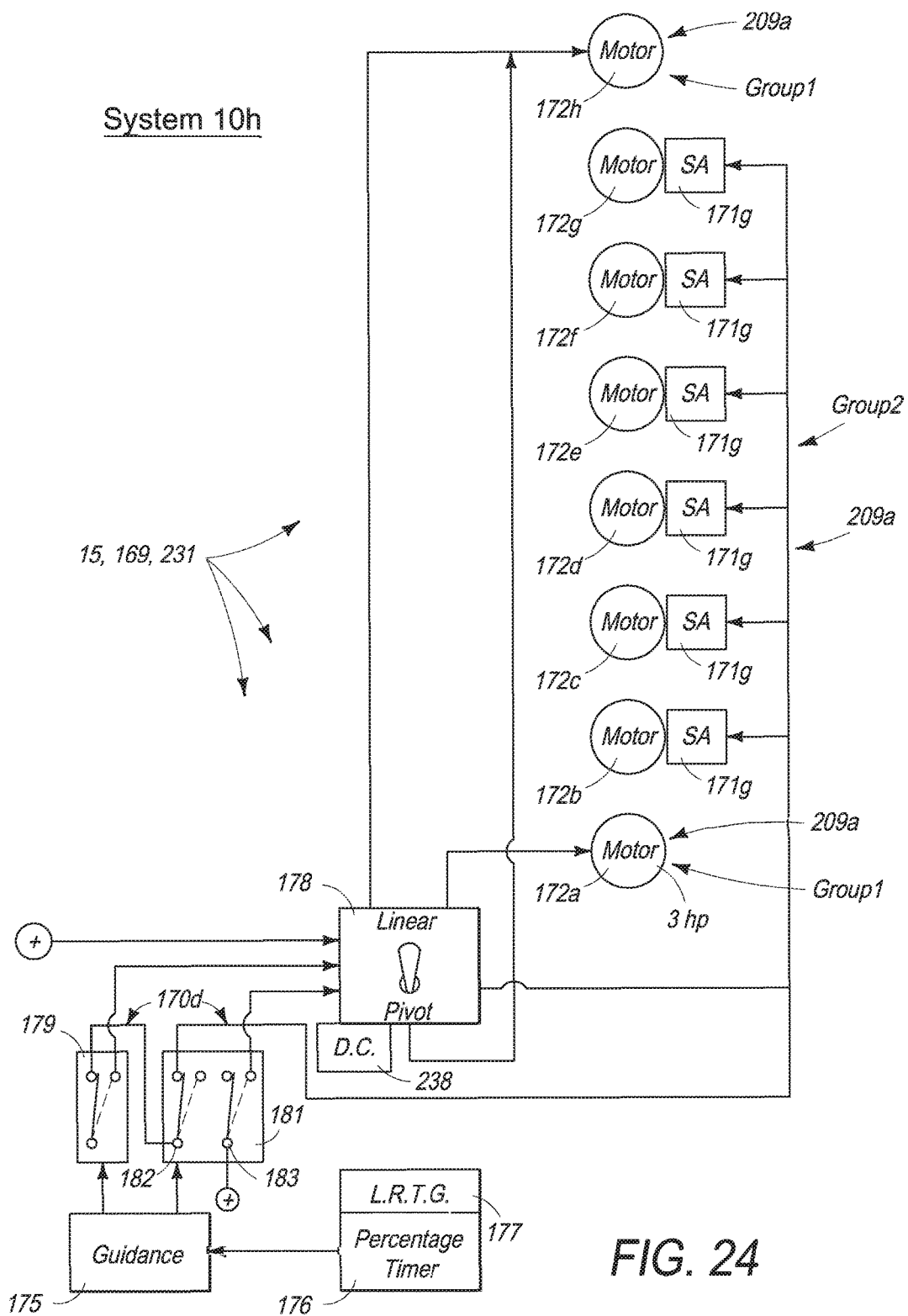
FIG. 24 is a schematic of a staggered drive motors where an inner drive motor and an outer drive motor are powered as a group and the remaining motors are powered as a group when the inner and outer group is not powered.

Staggered drive motors 170 can comprise one or more of a staggered motor set 208 (FIGS. 19, 22 and 23, described below). Staggered drive motors 170 can comprise a staggered groups of motors 209 (FIG. 24, described below). (Staggered drive motors 170 can comprise one or more of staggered motor set 208 in combination with staggered groups of motors 209. Staggered drive motors 170 can comprise a plurality of staggered groups of motors 209. Staggered drive motors 170 can comprise a staggered groups of motors 209 configured for operation staggered relative to the operation of another staggered groups of motors 209. Staggered drive motors 170 can comprise a group of drive motors and the operation of said group is staggered relative to the operation of one or more of staggered motor set 208. Staggered drive motors 170 can comprise other orientations and/or configurations of drive motors that serve to stagger drive motor operation.)

Staggered drive motors 170 can provide staggered drive motor operation for the linear travel of linear-move irrigators, for example, for the linear travel of linear-move water delivery pipe assembly 15. Staggered drive motors 170 can provide staggered drive motor operation for the linear travel of pivotable linear-move delivery pipe assembly 169. Staggered drive motors 170 can provide staggered drive motor operation for center-pivot travel of pivotable linear-move delivery pipe assembly 169. Staggered drive motors 170 can provide staggered drive motor operation for the travel of center-pivot irrigator 231.

(The staggered operation of staggered drive motors 170 enables a much smaller power plant to be employed operating at or near peak performance meaning reduction of the carbon footprint. In other words, staggered drive motors 170 enables both a reduction of the power plant footprint and a reduction of the carbon footprint whether that power supply be a diesel generator or a water motor driven generator or an inverted battery power supply or a fuel cell or other.)

Staggered drive motors 170 can comprise one or more of a staggered motor set 208 (FIGS. 19, 22 and 23). Staggered motor set 208 provides that a set of two or more drive motors are configured and/or controlled where when one of the motors in the set is in operation (or is operational) the other motor or motors in the set is not in operation (or is not operational). In other words, staggered motor set 208 provides to operate two or more drive motors one at a time. Staggered motor set 208 can comprise two drive motors configured and/or controlled relative to each other, can comprise three two drive motors configured and/or controlled relative to each other, can comprise four drive motors configured and/or controlled relative to each other, etc.

Staggered drive motors 170 can comprise a staggered groups of motors 209 (FIG. 24). Staggered groups of motors 209 provides that two or more groups of drive motors are configured and/or controlled relative to each other so that when one of the groups of motors is in operation (or is operational) the other group or groups is not in operation (or is not operational). A group of motors can comprise any number of drive motors. A group of motors can comprise just one drive motor. In other words, for example, staggered groups of motors 209 can be two or more groups of motors with one or more of the groups comprising two or more motors, said groups configured and/or controlled relative to each other so that when one of the groups of motors is in operation (or is operational) the other group or groups is not in operation (or is not operational). (A group can comprise two or more of staggered motor set 208, said two or more sets operational at the same time. Also, staggered groups of motors 209 can comprise the staggered operation of two or more groups of the two or more of staggered motor set 208 operational at the same time.)

The exemplary staggered drive motors 170 can include a linear run-time governor 177. Linear run-time governor 177 functions to govern the percent of time one or more drive motors operate. An example of governor 177 is illustrated in FIG. 24, shown as L.R.T.G. 177. The exemplary governor can comprise a mechanical stop attached to the face of the exemplary percentage timer 176. The mechanical stop provides to stop an adjusting dial located on said face from travelling beyond a certain setting (for example beyond a setting of 50%). In this way, the farmer is not allowed to set the timer at a setting (for example greater than 50%) that will operate drive motors 172a and 172h at such a pace that the drive motors 172b through 172g are unable to keep up eventuating in misalignment of pipe assembly 15 (causing drive motor operation to be shut down). (Governor 177 can comprise governing via electrical controls or via electronic control or via some other governing. Alternately, the farmer can be left to act as governor 177 by understanding not to set the percentage timer where staggered operation precludes one or more of the drive motors from keeping up.)

A first example of this second embodiment of linear-move irrigation system 10, System 10e, is illustrated schematically in FIG. 19. This first example comprises one or the other of linear-move delivery pipe assembly 15 and pivotable linear-move delivery pipe assembly 169, connector 25 (shown in FIG. 18) and staggered drive motors 170a and wherein connector 25 comprises hose-pull connector 173 and staggered drive motors 170a comprises four of staggered motor set 208.

For this first example, connector 25 comprises hose-pull connector 173 and connector 173 comprises a two-wheel pull cart. The cart comprises the cart 14 propelled by inner motor 172a. For this example, motor 172a is one and one-half horsepower. (For this first example, connector 25 can comprise other than connector 173, for example connector 25 can comprise the prior-described automated connector 115 and, for example, connector 115 can comprise connector 112 and, for example, connector 112 can comprise connector 110.)

For this first example, when operating as linear-move delivery pipe assembly 15 or as pivotable linear-move delivery pipe assembly 169 operating as a linear-move irrigator (assembly 15), staggered drive motors 170*a* comprises four of staggered motor set 208 with each set 208 made up of two drive motors. As described prior, each set 208 is configured and/or controlled so that when one of the motors in the set is in operation (or is operational) the other motor in the set is not in operation (or is not operational). For this example, one staggered motor set 208*a* comprises motor 172*a* and motor 172*h*. For this first example, staggered motor set 208*a* includes a controller 174. Controller 174 controls operation of motor 172*a* and 172*h*. Controller 174 provides that motors 172*a* and 172*h* do not operate at the same time. An example of controller 174 is illustrated in FIG. 19. The exemplary controller 174 is electrically connected to inner motor 172*a* and to outer motor 172*h* (connected via linear/pivot switch 178). Controller 174 is electrically connected to guidance 175. Controller 174 responds to input from guidance 175. Guidance 175 can provide a first signal to controller 174, the signal indicating to operate motor 172*a*. Guidance 175 can provide a second signal to controller 174, the signal indicating to operate motor 172*h*. When the pipe assembly is correctly positioned in the field (and percentage timer 176 dictates to move the pipe assembly forward) guidance 175 provides both first and second signals to controller 174, thus instructing to operate both motors 172*a* and 172*h*. Controller 174 responds to both signals by first operating one of the motors 172*a* and 172*h*, for example by operating motor 172*a*. When guidance 175 discontinues providing both signals, controller 174 responds by operating the other of the motors 172*a* and 172*h*, for this example motor 172*h* for the same length of time that both signals were sent from guidance 175. (Thus both motors 172*a* and 172*h* are operated the same length of time.) When the linear-move pipe assembly is out of position in the field (and timer 176 dictates to move the assembly forward) guidance 175 provides whichever is appropriate of the first and second signals to controller 174 instructing to operate the respective one of the motors 172*a* and 172*h*. When guidance 172 discontinues the signal, controller 174 responds by halting operation of the motor 172. (Controller 174 can be a conventional programmable component having a timer. Controller 174 can be, or can comprise, the combination of a relay, a stop watch timer and a run time timer or controller 174 can comprise other.)

Figure 21:
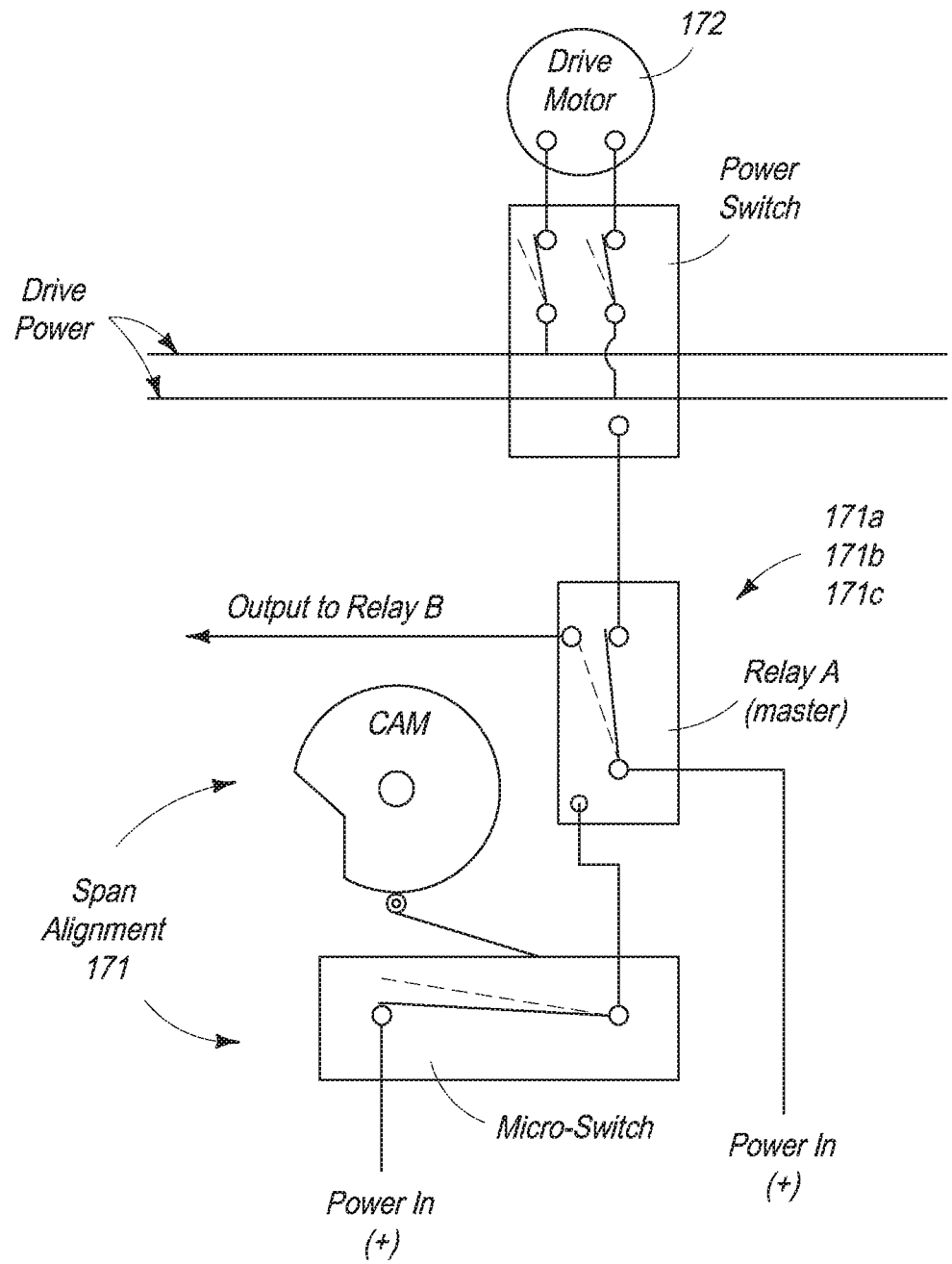
FIG. 21 is a schematic illustrating components employed with a staggered drive motors including a cam actuated micro-switch, a two-pole relay, a power switch and a drive motor.

As described above, staggered motor set 208*a* of staggered drive motors 170*a* provides that one or the other of motors 172*a* and 172*h* operates at one time. For this first example, staggered drive motors 170*a* also employs staggered motor set 208*b*, staggered motor set 208*c* and staggered motor set 208*d*. The employment of these three sets (208*b*, 208*c* and 208*d*) provides that as many as three of the remaining six drive motors 172 can operate at any given time, for example as follows:

Each of span alignments 171*a*, 171*b* and 171*c* comprises the span alignment 171 illustrated in FIG. 21. Each of alignments 171*a*, 171*b* and 171*c* also comprise a Relay A as shown. Relay A has two positions. When assembly 169 (or assembly 15) is in operation, Relay A is supplied with power (+) (as is the micro-switch). The micro-switch is electrically connected to Relay A as shown. When the micro-switch is not tripped, Relay A remains in a first position where the supplied power (+) is directed to an Output (the Output electrically connected to a Relay B described below). When the micro-switch is tripped (as shown, tripped by the cam shown), the power from the micro-switch energizes Relay A causing Relay A to switch to the second position (shown in said second position). In the second position, the supplied power is directed to energize the Power Switch shown. When energized, the Power Switch switches to the position shown where the Drive Power is connected to the corresponding Drive Motor 172. In other words, if the micro-switch in 171*b* is tripped, the tripped micro-switch energizes the corresponding Relay A causing the Relay A to switch to the second position where Relay A supplies power to the Power Switch resulting in the Drive Power being supplied to Drive Motor 172*c*. Said Output of Relay A in span alignment 171*b* is electrically connected to a Relay B associated alignment 171*e* FIGS. 19, 22 and 23). Accordingly, with Relay A in the second position, no power is being supplied to the Output and, thus, no power is being supplied to the Relay B in alignment 171*e*, i.e. no power is available to the Relay B to operate the Power Switch for Drive Motor 172*f*. Conversely, with relay A in the first position, power is being supplied to the Output and, thus, power is being supplied to Relay B in alignment 171*e* and so power is available to operate the Power Switch for Drive Motor 172*f* and Drive Motor 172*f* will be powered to operate when the cam in span alignment 171*e* trips the micro-switch in alignment 171*e*. (The Output of the Relay A in span alignment 171*a* is electrically connected to the Relay B in alignment 171*f*. The Output of the Relay A in span alignment 171*c* is electrically connected to the Relay B in alignment 171*d*.) Consequently, only as many as three of these six drive motors (172*b* through 172*g*) are operational at any one time and, thus, only as many as three of these six drive motors can be in operation at the same time.

Figure 20:
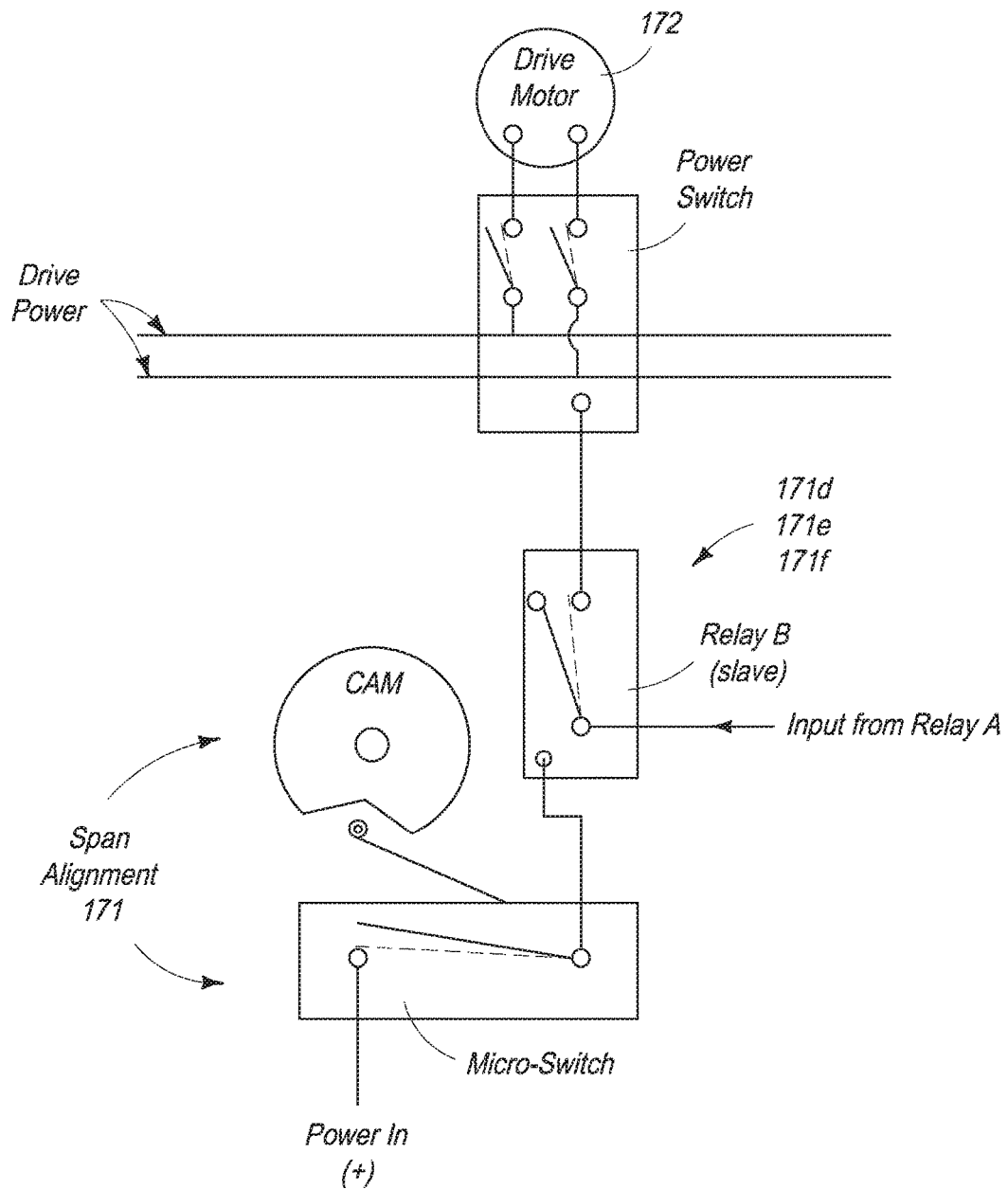
FIG. 20 is a schematic illustrating components employed with a staggered drive motors including a cam actuated micro-switch, a power switch and a drive motor.

Each of span alignments 171*d*, 171*e* and 171*f* comprises the span alignment 171 illustrated in FIG. 20. Each of span alignments 171*d*, 171*e* and 171*f* also comprise a Relay B as shown. Relay B has two positions. When the micro-switch is not tripped (tripped by the cam, shown not tripped), Relay B remains in a first position where the power supplied from Relay A is directed to a pole with nothing connected there-to. When the micro-switch is tripped, the power from the micro-switch energizes Relay B causing Relay B to switch to the second position. In the second position, the power supplied from Relay A (if power is being supplied) is connected to energize the Power Switch shown, the energized Power Switch connecting the Drive Power shown to the corresponding Drive Motor 172. (If power is not being supplied from Relay A, and the micro-switch is tripped, no power is available thus no power to the Power Switch and no power to the Drive Motor. Power is provide to the Relay B of alignments 171*d*, 171*e* and 171*f* from the Output of Relay A of alignments 171*c*, 171*b* and 171*a* respectively (FIG. 21). In other words, alignments 171*d*, 171*e* and 171*f* could be considered as "slaves" and alignments 171*c*, 171*b* and 171*a* could be considered as "masters".)

(The staggering of the operation of motors in a staggered motor set 208 can be accomplished otherwise than the "master" and "slave" arrangement. For example, the above-described motor set 208*a* employs controller 174 to stagger drive motor operation. As another example, Relay A (FIG. 21) can be replaced with a two position timer relay whereby, for example, every 60 seconds the timer relay switches positions. In other words, for 60 seconds the relay is connected to the Power Switch and then the timer relay switches to the second position where the relay is Output to Relay B (FIG. 20). After another 60 seconds the timer relay switches position back to then be connected to the Power Switch. In other words, though the master and slave arrangement can be a convenient approach toward retrofitting a conventional delivery pipe assembly, assembly 15 or 169 or center-pivot irrigator 231, to operate drive motors as one or more of a staggered motor set 208, other approaches toward accomplishing said can be employed with equal effectiveness.)

A first example of operation for this first example of this second embodiment will now be given. For this first example, System 10e comprises pivotable linear-move delivery pipe assembly 169 operating as a linear-move irrigator. Percentage timer 176 provides to dictate drive motor operation causing assembly 169 to travel linearly across the field. When timer 176 signals guidance 175, guidance 175 responds by sending two signals to controller 174. Controller 174 controls the operation of inner motor 172a and the operation of outer motor 172h such that the two motors do not operate at the same time, motors 172a and 172h configured as staggered motor set 208a. Controller 174 responds to both signals by first operating one of the motors, for example by operating motor 172a. When guidance 175 discontinues providing both signals (responding to timer 176 discontinuing the signal), controller 174 responds by operating the other of the motors 172a and 172h, for this example motor 172h for the same length of time that both signals were sent from guidance 175. (When pipe assembly is out of position in the field, and timer 176 dictates to move assembly 15 forward, guidance 175 provides whichever is appropriate of the first and second signals to controller 174 to turn the pipe assembly slightly and controller 174 responds by operating the respective one of the motors 172a and 172h. When guidance 172 discontinues the signal, controller 174 responds by halting operation of the motor 172.)

At all times during system operation, drive motors 172b, 172c, 172d, 172e, 172f and 172g are enabled to operate as dictated by their respective span alignments 171a through 171f with motors 172b and 172g configured as a staggered motor set 208b, motors 172c and 172f configured as a staggered motor set 208c and motors 172d and 172e configured as a staggered motor set 208d. Additionally, alignments 171a, 171b and 171c are configured in a master role and alignments 171d, 171e and 171f are configured in a slave role. Operation by controller 174 of one or the other of motors 172a and 172h causes misalignment between pipes 13 causing span alignments 171 to react by operating their associated drive motors 172. In this way pipe assembly 169 is propelled to travel linearly while maintaining longitudinal alignment. (Because motors 172a and 172h are operated one motor and then the other motor, the maximum travel speed equates to a setting on percentage timer 176 of 50%. Linear run time governor 178 (FIG. 22) can be employed. Controller 174 can be programmed to act as governor 178 should timer 176 be set beyond, for example, 50%.Also, for this first example of operation, resultant of the staggered drive motor operation, the maximum combined horsepower of drive motors operating at any one time adds up to three and three-quarter horsepower—the one and one-half horse motor of motor 172a plus the three three-quarter horse motors that can be operating at the same time.)

A second example of operation for this first example of this second embodiment will now be given. For this second example, System 10e comprises pivotable linear-move delivery pipe assembly 169. For this example of operation, staggered drive motors 170a provides to operate selected drive motors as a staggered motor set 208 for both the linear travel of assembly 169 and the pivot travel of assembly 169 (FIG. 19). Staggered drive motors 170a provides to operate the drive motors for the linear travel of assembly 169 in the manner described above in the first example of operation for this first example of this second embodiment. Staggered drive motors 170a provides to operate drive motors for the pivot travel of assembly 169 as follows:

The farmer has flipped switch 178 from the "Linear" position to the "Pivot" position. In the pivot position, assembly 169 operates essentially as would center pivot 231. For this example, with switch 178 in the "Pivot" position, controller 174, guidance 175 and timer 176 are not employed. (Assembly 169 can be configured where timer 176 is employed when assembly 169 operates as a pivot. Pivot 231 can employ this example of motors 170a and can deploy timer 176 during said employment. When in operation, timer 176 will operate drive motor 172h at whatever percentage of time timer 176 is set to.) In the "Pivot" position, switch 178 supplies a signal to energize the power switch of outer motor 172h resulting in continuous operation of motor 172h typically for dry pivoting the assembly 169. Continuous operation of motor 172h means continuous travel of the outermost cart 14. At all times during operation, drive motors 172b, 172c, 172d, 172e, 172f and 172g operate as dictated by their respective span alignments 171 and as dictated by staggered drive motors 170a as described above for the linear travel of assembly 169. In other words, with motors 172b and 172g configured as staggered motor set 208b, motors 172c and 172f configured as staggered motor set 208c and motors 172d and 172e configured as staggered motor set 208d. Additionally, for this example, alignments 171a, 171b and 171c are configured in a master role and alignments 171d, 171e and 171f are configured in a slave role. (For rotation where system 10 comprises hose-pull 173, motor 172a is typically not operated. Typically, assembly 169 is rotated about a pivoting device located in the vicinity of motor 172a with the wheels driven by motor 172a off of the ground. Also, for this second example of this first example, with staggered drive motors 170a operating the drive motors of assembly 169 during pivot travel, the maximum horsepower operating at any one time adds up to three horsepower—four three-quarter horse motors in operation at any one time).

A second example of this second embodiment of linear-move irrigation system 10, System 10f, is illustrated schematically in FIG. 22. This second example comprises one or the other of linear-move water delivery pipe assembly 15 and pivotable linear-move delivery pipe assembly 169. This second example further comprises connector 25 (shown in FIG. 18) and staggered drive motors 170b and wherein connector 25 comprises hose pull connector 173 and drive motors 170 comprises three of staggered motor set 208b.

For this second example, connector 25 comprises hose pull connector 173 and connector 173 comprises a two-wheel pull cart. The hose-pull cart comprises the cart 14 propelled by drive motor 14a. For this example, drive motor 14a is one and one-half horsepower. (For this second example, connector 25 can comprise other than connector 173, for example, can comprise the prior described automated connector 115 and, for example, connector 115 can comprise connector 112 and, for example, connector 112 can comprise connector 110.)

For this second example, both of motors 172a and 172h are operated at the same time (except when guidance 175 is correcting the travel direction of the pipe assembly (such operation is common in the industry). Guidance 175 is electrically connected (via linear/pivot switch 178) to each of motors 172a and 172h. Guidance 175 can provide a signal to energize a power switch that when energized connects power to motor 172a. Guidance 175 can provide a signal to energize a power switch that when energized connects power to operate motor 172h. When pipe assembly (whichever of 15 and 169) is correctly positioned in the field, and percentage timer 176 dictates to move the pipe assembly forward, guidance 175 provides both signals thus causing both motors to operate. When pipe assembly is out of position in the field, and percentage timer 176 dictates to move the pipe assembly forward, guidance 175 responds to said out of position by providing a signal to the appropriate power switch to correct the positioning of the pipe assembly. The energized power switch causes the corresponding one of the motors 172a and 172h to be connected to power and thus to operate. Said operation then affects to slightly adjust the travel direction of pipe assembly (whichever of 15 and 169).

Further for this example, staggered drive motors 170b provides that as many as three of the six drive motors, motors 172b, 172c, 172d, 172e, 172f and 172g, can operate at the same time. For this example, drive motors 170b provides that as many as three of the six drive motors can operate at the same time in the manner as described above in the first example of this second embodiment, i.e. drive motors 172 b through 172g are enabled to operate as dictated by their respective span alignments 171 with motors 172b and 172g configured as staggered motor set 208b, motors 172c and 172f configured as staggered motor set 208c and motors 172d and 172e configured as staggered motor set 208d. Additionally, for this example, alignments 171a, 171b and 171c are shown configured in a master role and alignments 171d, 171e and 171f are shown configured in a slave role. (The master and slave arrangement is merely a retrofit convenience and not a requirement of set 208.)

A first example of operation for this second embodiment will now be given. For this first example, System 10f comprises linear-move water delivery pipe assembly 15 and thus is controlled to travel/irrigate as a linear-move irrigator. (Comprising solely a linear-move irrigator, Linear/Pivot switch 178 is not needed.) Guidance 175 is electrically connected to drive motors 172a and 172h. Percentage timer 176 provides to dictate the operation of drive motors 172a and 172h (with motors 172a and 172h enabled to operate at the same time) to cause assembly 15 to travel linearly across the field. Guidance 175 maintains an orientation in said field by restricting operation of one or the other of motors 172a and 172h. At all times during system operation, drive motors 172b, 172c, 172d, 172e, 172f and 172g operate as dictated by their respective span alignments 171 with motors 172b and 172g configured as a staggered motor set 208b, motors 172c and 172f configured as a staggered motor set 208c and motors 172d and 172e configured as a staggered motor set 208d.

Operation of motors 172a and 172h causes misalignment between pipes 13 causing span alignments 171 to react by operating their associated drive motors 172. Thus pipe assembly 15 is directed to travel linearly while maintaining longitudinal alignment. For this second example, both of motors 172a and 172h are operated at the same time and thus could be considered to operate as a "group". In other words, for this first example of operation, staggered drive motors 170 for this example could be described as a group of motors in operation simultaneous with three of staggered motor set 208. As one alternate configuration, motors 172a and 172h could be operated at the same time and said operation could be staggered relative to the operation of the three of set 208. In other words, When 172a and 172h are in operation, 172b through 172g are not in operation. (For this first example, with motors 170b operating assembly 15 to travel linearly, the maximum horsepower operating at any one time adds up to four and one-half horsepower—the one and one-half horse motor of motor 172a plus the four three-quarter horse of motor 172h and the three motors of the three of staggered motor set 208.)

A second example of operation for this second example of this second embodiment will now be given. For this second example, System 10f comprises assembly 169. For this example of operation, staggered drive motors 170b provides to operate selected drive motors wherein two motors are configured together to operate as staggered motor set 208 for both the linear travel and the pivot travel of assembly 169 (FIG. 22). Staggered drive motors 170b provides to operate drive motors for the linear travel of assembly 169 in the manner described above for pipe assembly 15 in the first example of operation for this second example. Staggered drive motors 170b provides to operate drive motors for the pivot travel of assembly 169 as follows:

For this example, assembly 169 includes switch 168. A farmer has flipped switch 178 from the "Linear" position to the "Pivot" position. Switch 178 in the "Pivot" position instructs assembly 169 to operate essentially as a cent-pivot irrigator. (For example to operate essentially as center-pivot irrigator 231. In other words, irrigator 231 can comprise staggered drive motors 170b.) Switch 178 in the "Pivot" position disconnects guidance 175 and timer 176. Switch 178 in the "Pivot" position supplies a signal to energize the power switch of outer motor 172h. Thus motor 172h operates continuously. (Alternately, assembly 169 can be configured to employ timer 176 for irrigation during pivoting, i.e. motor 172h is then operated for whatever percentage of time set on timer 176. Also, for hose-pull rotation, motor 172a is not operated. Typically, assembly 169 is rotated about a device located in the vicinity of motor 172a.)

Continuous operation of motor 172h means continuous travel of the outermost cart 14. At all times during operation, drive motors 172b, 172c, 172d, 172e, 172f and 172g operate as dictated by their respective span alignments 171 and as dictated by staggered drive motors 170b as described above for the linear travel of assembly 169. In other words, motors 172b and 172g are configured as a staggered motor set 208b, motors 172c and 172f are configured as a staggered motor set 208c and motors 172d and 172e are configured as a staggered motor set 208d. (For this second example of this second example, with staggered drive motors 170b operating the drive motors of assembly 169 during pivot travel, the maximum combined horsepower operating at any one time adds up to three horsepower—four three-quarter horse motors in operation at any one time.)

A third example of this second embodiment of linear-move irrigation system 10, System 10g, is illustrated in FIG. 23. This third example comprises one or the other of linear-move water delivery pipe assembly 15 and pivotable linear-move delivery pipe assembly 169. This third example further comprises connector 25 and staggered drive motors 170c and wherein connector 25 comprises single coupler automated connector 112.

For this third example, connector 25 comprises single coupler automated connector 112 (connector 112 shown in FIGS. 1 and 16). For this example, drive motor 14a is ¾ horsepower. (However, connector 25 can comprise other than connector 112, for example connector 25 can comprise the prior described automated connector 115, can comprise connector 110, can comprise hose-pull connector 173 or can comprise other.)

For this third example, both of motors 172a and 172h are operated at the same time (except when guidance 175 is correcting the travel direction of the pipe assembly (such operation is common in the industry). Guidance 175 is electrically connected (via linear/pivot switch 178) to each of motors 172a and 172h. Guidance 175 can provide a signal to energize a power switch that when energized connects power to motor 172a. Guidance 175 can provide a signal to energize a power switch that when energized connects power to operate motor 172h. When pipe assembly (whichever of 15 and 169) is correctly positioned in the field, and percentage timer 176 dictates to move the pipe assembly forward, guidance 175 provides both signals thus causing both motors to operate. When the pipe assembly is out of position in the field, and percentage timer 176 dictates to move the pipe assembly forward, guidance 175 responds to said out of position by providing a signal to the appropriate power switch to correct the positioning of the pipe assembly. The energized power switch causes the corresponding one of the motors 172a and 172h to be connected to power and thus to operate. Said operation then affects to slightly adjust the travel direction of pipe assembly (whichever of 15 and 169).

Further for this example, staggered drive motors 170c provides that as many as three of the six drive motors, motors 172b, 172c, 172d, 172e, 172f and 172g, can operate at the same time. For this example, staggered drive motors 170c provides that as many as three of the six drive motors can operate at the same time in the manner as described above in the first example of this second embodiment, i.e. drive motors 172b through 172g are enabled to operate as dictated by their respective span alignments 171 with motors 172b and 172g configured as staggered motor set 208b, motors 172c and 172f configured as staggered motor set 208c and motors 172d and 172e configured as staggered motor set 208d. Alignments 171a, 171b and 171c are shown configured in a master role and alignments 171d, 171e and 171f are shown configured in a slave role though the master and slave arrangement is merely a retrofit convenience and not a requirement of staggered motor set 208.

For this example, assembly 169 includes a span alignment 171x. Alignment 171x provides to maintain longitudinal alignment between the delivery pipe 13 attached to the cart 14 propelled by motor 172a and connector 112 (FIG. 1), for example between pipe 13 and swing arm 16 of connector 112. Alignment 171x is electrically connected to the power switch associated with motor 172a. When a micro-switch in alignment 171x trips (indicating misalignment), a signal is sent to said switch connected to motor 172a. The energized power switch connects drive power to the motor 172a. (Span alignment 171x can be a conventional span alignment.)

A first example of operation for this third example of this second embodiment will now be given. For this first example, System 10g comprises linear-move water delivery pipe assembly 15 and thus travels/irrigates as a linear-move irrigator. Guidance 175 is electrically connected to drive motors 172a and 172h. Percentage timer 176 provides to dictate the operation of drive motors 172a and 172h (with motors 172a and 172h enabled to operate at the same time) to cause assembly 15 to travel linearly across the field. Guidance 175 maintains an orientation in said field by restricting operation of one or the other of motors 172a and 172h. Operation of motors 172a and 172h causes misalignment between pipes 13 causing span alignments 171 to react by operating their associated drive motors 172. Thus pipe assembly 15 is directed to travel linearly while maintaining longitudinal alignment. At all times during system operation, drive motors 172b, 172c, 172d, 172e, 172f and 172g operate as dictated by their respective span alignments 171 and as dictated by staggered drive motors 170c. Motors 172b and 172g are configured as staggered motor set 208b, motors 172c and 172f are configured as staggered motor set 208c and motors 172d and 172e are configured as staggered motor set 208d. For this first example, with staggered drive motors 170c operating the motors of assembly 15, the maximum horsepower operating at any one time adds up to three and three-quarter horsepower (five three-quarter horse motors).

A second example of operation for this third example of this second embodiment will now be given. For this second example, System 10f comprises assembly 169. For this example of operation, staggered drive motors 170b provides to operate selected drive motors wherein two motors are configured together to operate as staggered motor set 208 for both the linear travel and the pivot travel of assembly 169 (FIG. 22). Staggered drive motors 170b provides to operate drive motors for the linear travel of assembly 169 in the manner described above for pipe assembly 15 in the first example of operation for this third example. Staggered drive motors 170b provides to operate drive motors for the pivot travel of assembly 169 as follows:

For this example, assembly 169 includes switch 168. A farmer has flipped switch 178 from the "Linear" position to the "Pivot" position. Switch 178 in the "Pivot" position instructs assembly 169 to operate essentially as a cent-pivot irrigator. (For example to operate essentially as center-pivot irrigator 231. In other words, irrigator 231 can comprise staggered drive motors 170c.) Switch 178 in the "Pivot" position disconnects guidance 175 and timer 176. (Alternately, assembly 169 can be configured to employ timer 176 for irrigation during pivoting, i.e. motor 172h is then operated for whatever percentage of time set on timer 176.) Switch 178 in the "Pivot" position supplies a signal to energize the power switch of outer motor 172h. Thus motor 172h operates continuously. Switch 178 in the "Pivot" position supplies power to span alignment 171x.

With the power switch energized, outer motor 172h operates continuously and thus outer cart 14 travels continuously. At all times during center-pivot operation, drive motors 172b, 172c, 172d, 172e, 172f and 172g operate as dictated by their respective span alignments 171 and as dictated by staggered drive motors 170c. In other words, motors 172b and 172g are configured as staggered motor set 208b, motors 172c and 172f are configured as staggered motor set 208c and motors 172d and 172e are configured as staggered motor set 208d. At all times during center-pivot operation, drive motor 172a operates as dictated by span alignment 171x.

Operation of motor 172h causes misalignment between pipes 13 (firstly misalignment between the outer pipe 13 and the adjacent pipe 13) causing span alignments 171 to react by operating their associated drive motors 172. Thus pipe assembly 169 is directed to pivot travel while maintaining longitudinal alignment. (For this second example of this third example, with staggered drive motors 170c operating motors 172 of assembly 169 during pivot travel, the maximum horsepower operating at any one time adds up to three and three-quarter horsepower—five three-quarter horse motors. Also, for this center-pivot travel, motor 172a and motor 172h can be paired as a staggered motor set 208 which can but need not include a master and slave configuration. For example, span alignment 171x can be configured as shown in FIG. 21 with alignment 171x operating as a master and operation of motor 172h being the slave there-to.)

A fourth example of this second embodiment of linear-move irrigation system 10, System 10h, is illustrated schematically in FIG. 24. This fourth example comprises one or the other of linear-move water delivery pipe assembly 15 and pivotable linear-move delivery pipe assembly 169. This fourth example further comprises connector 25 and staggered drive motors 170d and wherein connector 25 comprises hose pull connector 173 and staggered drive motors 170d comprises staggered groups of motors 209.

For this fourth example, connector 25 comprises hose pull connector 173 (shown in FIG. 18) and connector 173 comprises a four-wheel pull cart. The four-wheel hose-pull cart comprises the cart 14 propelled by drive motor 14a. For this example, drive motor 14a comprises two one and one-half horsepower motors, i.e. a total of three horsepower. (However, for this fourth example, connector 25 can comprise other than connector 173, for example connector 25 can comprise the prior described automated connector 115 and, for example, connector 115 can comprise connector 112 and, for example, connector 112 can comprise connector 110.)

For this fourth example, both of motors 172a and 172h are operated at the same time (except when guidance 175 is correcting the travel direction of the pipe assembly (such operation is common in the industry). Guidance 175 is electrically connected (via linear/pivot switch 178) to each of motors 172a and 172h. Guidance 175 can provide a signal to energize a power switch that when energized connects power to motor 172a. Guidance 175 can provide a signal to energize a power switch that when energized connects power to operate motor 172h. When the pipe assembly (whichever of 15 and 169) is correctly positioned in the field, and percentage timer 176 dictates to move the pipe assembly forward, guidance 175 provides both signals thus causing both motors to operate. When pipe assembly is out of position in the field, and percentage timer 176 dictates to move the pipe assembly forward, guidance 175 responds to said out of position by providing a signal to the appropriate power switch to correct the positioning of the pipe assembly. The energized power switch causes the corresponding one of the motors 172a and 172h to be connected to power and thus to operate. Said operation then affects to slightly adjust the travel direction of pipe assembly (whichever of 15 and 169).

For this fourth example, staggered drive motors 170d comprises staggered groups of motors 209a. Staggered groups of motors 209a provides that two or more groups of drive motors are configured and/or controlled relative to each other so that when one of the groups of motors is in operation (or is operational) the other group or groups is not in operation (or is not operational).

For this fourth example, motors 172a and 172h operated (or operational) at the same time constitutes a first group of motors shown as Group 1. For this fourth example, motors 172b, 172c, 172d, 172e, 172f and 172g are operated (or operational) at the same time and thus constitute a second group of motors shown as Group 2. Staggered groups of motors 209a provides that when Group 1 (motors 172a and 172h) is operated (or is operational), Group 2 (motors 172b, 172c, 172d, 172e, 172f and 172g) is not operated (or is not operational). Conversely, staggered groups of motors 209a provides that while Group 2 is operated (or is operational), Group 1 is not operated (or is not operational).

The exemplary staggered groups of motors 209a includes a relay 179 and a relay 181 Relay 179 is a single pole double throw switch. Relay 181 is a double pole double throw switch having a first pole 182 and a second pole 183. (Linear/pivot switch 178 is in the "linear" position.) One line from guidance 175 is connected to relay 179 (relay 179 shown not energized) and one line from guidance 175 is connected to relay 181 (relay 181 shown not energized). A signal from guidance 175 to relay 179 energizes the relay enabling the power (+) to flow through relay 179 to motor 172h (via switch 178). A signal from guidance 175 to relay 181 energizes relay 181 enabling the power (+) connected to second pole 183 of relay 181 to flow through relay 181 to motor 172a (via switch 178). When not energized, the power to relay 179 flows through relay 179 to first pole 182 of relay 181 and through pole 182 to the six span alignments each shown as 171g. This configuration of relays 179 and 181 provides that during liner-move operation power is supplied to the span alignments 171g controlling the group of motors 172b, 172c, 172d, 172e, 172f and 172g while power is not supplied to the group of motors 172a and 172h. Conversely, this configuration of relays 179 and 181 provides that during linear-move operation power is supplied to the group of motors 172a and 172h while power is not supplied to the to the span alignments 171g controlling the group of motors 172b, 172c, 172d, 172e, 172f and 172g. In other words, when the group of motors 172a and 172h is in operation the group of motors 172b, 172c, 172d, 172e, 172f and 172g is not in operation and visa versa. (In operation means is operated or is operational.)

For this exemplary staggered groups of motors 209a, each of the six drive motors (motors 172b, 172c, 172d, 172e, 172f and 172g) receives power to operate from a separate power switch electrically connected to each motor. Each switch when energized connects power to the associated drive motor 172. A respective span alignment 171g is electrically connected to the power switch associated with each of the six drive motors. When a cam causes a micro-switch in a span alignment 171g to trip indicating misalignment (the cam and micro-switch can be as shown in FIGS. 20 and 21), a signal is sent to the respective power switch which energizes the switch (the power switch can be as shown in FIGS. 20 and 21, no Relay A or Relay B is employed), the energized switch connects drive power to the respective drive motor.

A first example of operation for this fourth example of this second embodiment will now be given. For this first example, System 10h comprises linear-move water delivery pipe assembly 15 and thus operates as a linear-move irrigator. (Accordingly, for this example of operation, staggered groups of motors 209a of staggered drive motors 170d provides to operate drive motors in groups for the linear travel of linear-move water delivery pipe 15. Also, no Linear/Pivot switch 178 need be employed.) Guidance 175 is electrically connected to drive motors 172a and 172h via relays 179 and 181 (as described above). Percentage timer 176 provides to dictate the percentage of time the group of motors 172a and 172h operate (operating simultaneously) and said operation causes linear-move water delivery pipe assembly 15 to travel linearly across the field. Upon receiving a signal from timer 176 (said signal indicating to power travel) guidance 175 maintains an orientation in said field by restricting operation of one or the other of motors 172a and 172h when assembly 15 is out of position in the field. The configuration of relays 179 and 181 provides that only when group of motors 172a and 172h are not in operation the respective alignments 171g of the group of motors 172b, 172c, 172d, 172e, 172f and 172g are powered and thus the group of motors 172b, 172c, 172d, 172e, 172f and 172g is operational. Operation of group of motors 172a and 172h causes misalignment between pipes 13. When timer 176 is no longer providing a signal, and thus span alignments 171g are then powered, the misalignment is detected via one or more of the alignments 171g causing their associated drive motor(s) 172 to be operated. Thus pipe assembly 15 is directed to travel linearly while maintaining longitudinal alignment. (For this first example of operation, with staggered groups of motors 209a implemented during linear travel of delivery pipe assembly 15, the maximum horsepower operating at any one time adds up to four and one-half horsepower—six three-quarter horse motors.)

A second example of operation for this fourth example of this second embodiment will now be given. For this second example, System 10h comprises pivotable linear-move delivery pipe assembly 169. For this example of operation, staggered groups of motors 209a provides to operate drive motors in groups for both the linear travel and the pivot travel of assembly 169 (FIG. 24). Staggered groups of motors 209a provides to operate drive motors for the linear travel of assembly 169 in the manner as described above in the first example of operation for this fourth example of this second embodiment. Staggered drive motors 170d provides to operate drive motors for the pivot travel of assembly 169 as follows:

For this example, assembly 169 includes switch 168. A farmer has flipped switch 178 from the "Linear" position to the "Pivot" position. Switch 178 in the "Pivot" position instructs assembly 169 to operate essentially as a cent-pivot irrigator. (For example to operate essentially as center-pivot irrigator 231. In other words, irrigator 231 can comprise staggered groups of motors 209a.) Switch 178 in the "Pivot" position disconnects relay 179 and relay 181, guidance 175 and timer 176. Thus, relays 179 and 181, guidance 175 and timer 176 are no longer being employed. Switch 178 in the "Pivot" position supplies power to energize the power switch of outer motor 172h and supplies power to energize the span alignments 171g for the group of motors 172b, 172c, 172d, 172e, 172f and 172g. Motor 172h thus now operates continuously. (For hose-pull rotation, motor 172a is not operated. Typically, assembly 169 is rotated about a device located in the vicinity of motor 172a.) Continuously operation of motor 172h means continuous travel of outer cart 14. At all times during operation, drive motors 172b, 172c, 172d, 172e, 172f and 172g operate as dictated by their respective span alignments 171. Operation of motor 172h causes misalignment between pipes 13 (firstly misalignment at the span alignment 171g controlling motor 172g) causing span alignments 171 to react by operating their associated drive motors 172. Thus pipe assembly 15 is directed to pivot travel while maintaining longitudinal alignment. (Alternately, assembly 169 can be configured to employ timer 176 for irrigation during pivoting. Motor 172h is then operated for whatever percentage of time set on timer 176. Also, for this second example, with staggered drive motors 170d operating motors 172 of assembly 169 during pivot travel, the maximum horsepower operating at any one time adds up to five and one-quarter horsepower—seven three-quarter horse motors.)

Pivotable delivery pipe assembly 169 can comprise a dual configuration 238, shown D.C. 238 attached to pivot/linear switch 178 in FIG. 24. Dual configuration 238 functions to provide a staggered drive motor configuration for linear-move travel and to provide a staggered drive motor configuration for center-pivot travel. Center-pivot irrigator 231 can comprise staggered drive motors 170, for example, staggered drive motors 170b configured as described above in the second example of operation for this second example of this second embodiment (FIG. 22). The configuration of staggered motor sets 208b, 208c and 208d provides that outer drive motor 172h is enabled to operate continuously (100% setting on timer 176) meaning that center-pivot irrigator 231 (and assembly 169 as well when pivoted) can apply the lightest of water applications and can be dry rotated/pivoted without interruption. For a given system flow rate, center pivot irrigators apply the same amount of water at 100% setting on timer 176 as linear-move irrigators apply at a 50% setting on timer 176. In other words, the linear-move irrigator can better accommodate configurations of staggered drive motors 170 that do not permit the delivery pipe assembly to operate at the 100% setting (for example, the configuration of staggered groups of motors 209a of staggered drive motors 170d of the fourth example of this second embodiment). As an example of dual configuration 238 (FIG. 24), configuration 238 can provide to operate staggered drive motors 170 as staggered groups of motors 209a when switch 178 resides in the "linear" position as described for the first example of operation of this fourth example. Dual configuration 238 can then provide to operate staggered drive motors 170 as a plurality of staggered motor set 208 when switch 178 resides in the "pivot" position as described above for the second example of operation of the second example.

As another example of staggered drive motors 170, which can be employed by assembly 15 or by assembly 169 for linear-move travel, staggered drive motors 170 can comprise staggered groups of motors 209 wherein motors 209 comprise motors 172a and 172h configured to operate (or be operational) as a group, motors 172b, 172c and 172d configured to operate (or be operational) as a group and motors 172e, 172f and 172g configured to operate (or be operational) as a group. (As another example, staggered groups of motors 209 can comprise, for example, motors 172a and 172h configured to operate (or be operational) as a group, motors 172b, and 172c configured to operate (or be operational) as a group, motors 172d and 172e configured to operate (or be operational) as a group and motors 172f and 172g configured to operate (or be operational) as a group. As another example, staggered groups of motors 209 can comprise, for example, motors 172a, 172b, 172c and 172d configured to operate (or be operational) as a group and motors 172e, 172f, 172g and 172 h configured to operate (or be operational) as a group.)

As another example of staggered drive motors 170, which can be employed by assembly 15 or by assembly 169, for example, for linear-move travel, drive motors 172a and 172h can be configured as a staggered motor set, (as described for the first example of operation of the first example of this second embodiment (FIG. 19), and the operation of said set can be staggered relative to the operation of the Group 2 (motors 172b through 172—FIG. 24). As another example of staggered drive motors 170, which can be employed by assembly 15 or by assembly 169 for linear-move travel, motors 172a and 172h can be configured to operate or be operational simultaneous with motors 172b, 172c and 172d as a group with operation staggered relative to motors 172e, 172f and 172g as a group.

As another example of staggered drive motors 170, which can be employed by assembly 169 for center-pivot travel or by center-pivot irrigator 231, staggered drive motors 170 can comprise staggered groups of motors 209 wherein motors 209 comprise motors 172b, 172c and 172d configured to operate (or be operational) as a group staggered relative to motors 172e, 172f and 172g configured to operate (or be operational) as a group. As another example, motors 209 comprise motors 172b, 172c and 172d configured to operate (or be operational) as a group staggered relative to motors 172e, 172f, 172g and 172h configured to operate (or be operational) as a group.

Embodiments of linear-move irrigation system 10 employ an access valve assembly 180. Assembly 180 functions to enable selective access to water supplied by a water main. An example of access valve assembly 180 is illustrated in FIG. 25. The exemplary assembly 180 comprises an access valve 12, a riser 185 and can comprise the prior-discussed ground support pad 101.

Access valve 12 functions to enable selective coupling and uncoupling to access water in a water main. One example of an access valve 12 is illustrated in FIG. 25. (Valve 12 can be configured substantially as the access valve 12 disclosed in U.S. Pat. No. 6,431,475 and can operate substantially as described therein.) The exemplary valve 12 comprises a valve pipe 191, a valve stem 192, a faceplate 203, a spring 187, a spring keeper 193, a linear bearing 189, a flange 198 and a gasket 199. Flange 198 is welded to a bottom side of pipe 191, flange 198 bolted to the flange 201 of riser 185 described below. Linear bearing 189 comprises a piece of stainless steel pipe having an inside diameter just slightly larger than the diameter of valve stem 192 such that stem 192 is enabled to freely slide longitudinally inside bearing 189. Bearing 189 has three fins welded to the stainless pipe each fin positioned 120 degrees relative to the others, the fins welded to the inside wall of pipe 191 just above flange 198. Valve stem 192 is welded to a top side of faceplate 203. Spring 187 is mounted slightly compressed between a top side of bearing 189 and keeper 193. Keeper 193 is bolted toward an upper end of stem 192. Faceplate 203 mates against a bottom side of gasket 199 and is held against the gasket by the compression force from spring 187 (held against the gasket when valve 12 has not been actuated).

Riser 185 functions to hydraulically connect an access valve with a water main. An example of riser 185 is illustrated in FIG. 25. The exemplary riser 185 comprises a length of pipe 166, a reducer cone 167, a flange 201, and two of a union 202. The exemplary length of pipe 166 is 12¾ inch diameter 12 gauge spouting about two feet in length. The exemplary reducer cone 167 is 12 gauge steel, has a larger diameter end measuring 12¾ inches, a smaller diameter end measuring 8½ inches and a length of say 5 inches. The exemplary flange 201 is ½ inch thick, has an outside diameter of 12 inches and an inside diameter of 8½ inches and is configured to bolted to the flange 198 of access valve 12 discussed above. Each exemplary union 202 comprises a gasketed housing (female) for being mated with a male end of a 10-inch diameter pvc pipe of mainline 11. (Each of the two of union 202 can alternately be male or one union can be male and the other union female. In FIG. 25, only one union 202 is in view, the other located behind the union 202 shown and facing in the opposite direction.) As shown in the illustration of riser 185, the larger diameter end of reducer cone 167 is welded to a top end of length of pipe 166 and unions 202 are welded toward a bottom end of pipe 166. The smaller diameter end of cone 167 is welded to flange 201. Flange 201 is configured to bolt to flange 198 of access valve 12. As shown, riser 185 is configured to flow water from main 11 to access valve 12.

Ground support pad 101 (discussed prior) functions to provide pivotable ground support for an automated connector. An example of support pad 101 is illustrated in FIG. 25 (also illustrated in FIGS. 2 and 3). The exemplary pad 101 comprises a poured concrete disc about four inches thick and about 50 inches in diameter. Pad 101 has a top surface 206 and has a bottom surface 207.

Figure 31:
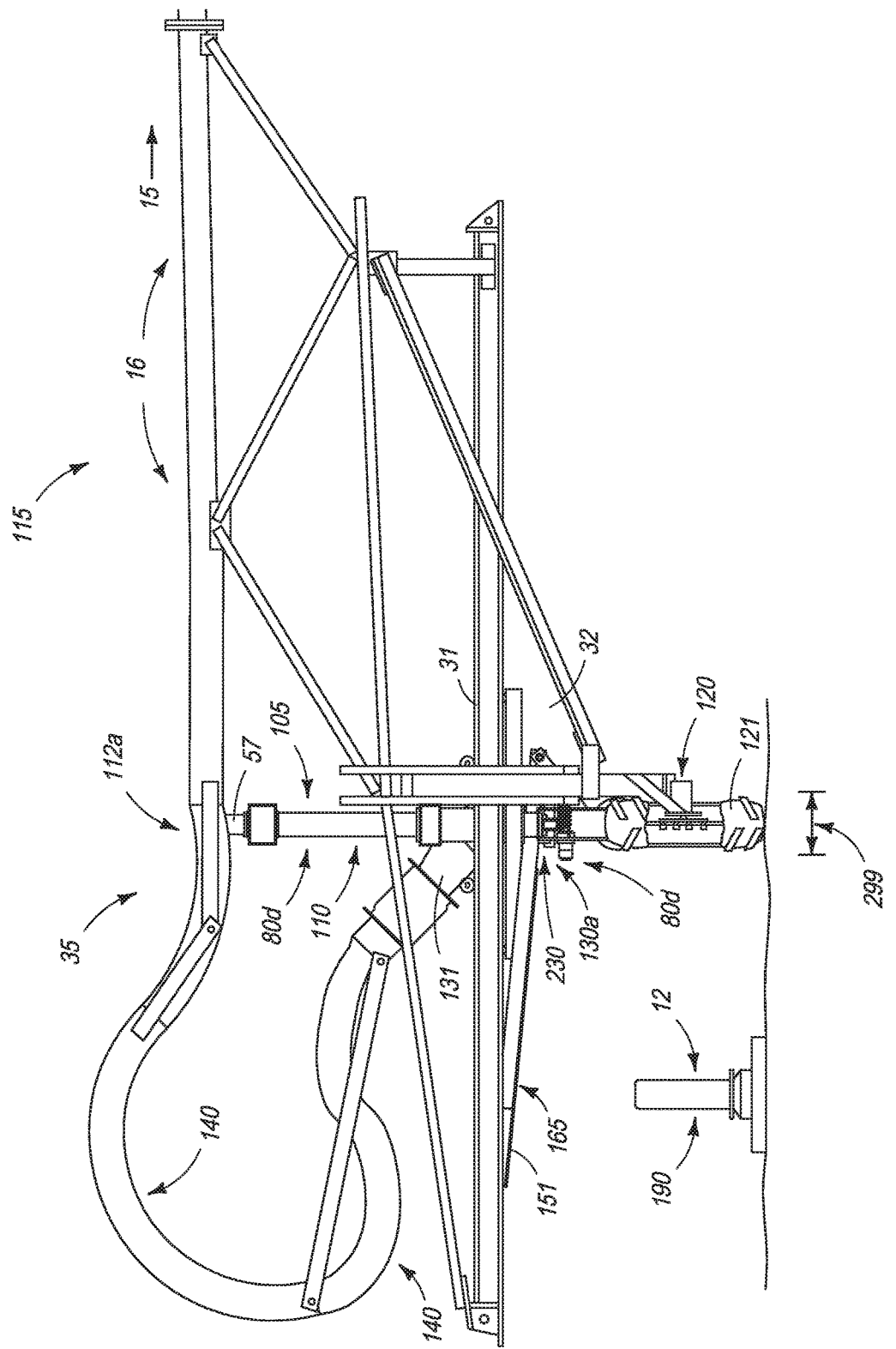
FIG. 31 is a side elevation view of the apparatus illustrated in FIG. 30.

Access valve assembly 180 can comprise a specialized valve assembly 190. Specialized valve assembly 190 functions to maximize crop clearance. An example of specialized valve assembly 190 is illustrated in FIG. 25. The exemplary specialized assembly 190 is configured for mating with a heightened coupler 210, coupler 210 discussed later on. The exemplary assembly 190 comprises a specialized riser 195 and comprises one or the other of access valve 12 and a specialized access valve 200. The exemplary assembly 190 improves crop clearance for detector plank 151 by enabling plank 151 to be positioned elevationally higher during the process of plank 151 detecting the top of an access valve 12 valve, plank 151 oriented above assembly 190 is illustrated in FIG. 31. The exemplary assembly 190 also improves crop clearance for plank 151 when coupler 130 has coupled to a valve 12. Support wheels 27 then reside on pad 101 and plank 151 then resides protruding out beyond the circumference of pad 101 s illustrated in FIG. 34.

An example of specialized riser 195 is illustrated in FIG. 25. The exemplary riser 195 is configured as described for the above riser 185 with the exception that riser 195 is configured with flange 201 located above top surface 206 of pad 101 as illustrated. The exemplary riser 195 is further configured with reducer cone 167 located above top surface 206 of support pad 101 as illustrated. The exemplary riser 195 is further configured with length of pipe 166 extending above top surface 206 of support pad 101 as illustrated. (Riser 195 can be configured as illustrated in FIGS. 2 and 3 where flange 201 is located above top surface 206, a portion of reducer cone 167 resides above top surface 206 and pipe 166 does not extend above top surface 206 of pad 101. Riser 195 can be configured where flange 201 is located above top surface 206 of pad 101 and reducer cone 167 and pipe 166 do not resides above top surface 206. A short length of pipe is then added to extend between cone 167 and flange 201.) Riser 195 can include four of a tie-in 204 (three shown). Each exemplary tie-in 204 is a three-inch length of four-inch wide channel iron. Each tie-in 204 is welded at 90 degrees along the circumference of pipe 166 as shown. The concrete employed in pad 101 is poured around the tie-ins 204. Consequently, each tie-in serves to prevent riser 195 from traveling downward relative to pad 101 when weight is placed on the top of the access valve 12 mounted atop riser 195. Each tie-in 204 also serves to prevent pad 101 from traveling downward relative to riser 195 when weight is placed on the top of pad 101 as when ground wheels 27 have landed on top of pad 101. (Tie-ins 204 can be employed with riser 185.)

An example of specialized access valve 200 is illustrated in FIG. 25. For the exemplary valve 200, valve pipe 191 comprises an elongated pipe 196, valve stem 192 comprises an elongated stem 197 and bearing 189 can comprise an elongated bearing 194. Employing both elongated pipe 196 and elongated stem 197 contributes to the above-stated maximizing crop clearance by specialized valve assembly 190. The exemplary elongated pipe 196 is elongated relative to the valve pipe of access valve 12 disclosed in U.S. Pat. No. 6,431,475 and relative to the valve pipe of access valve 12 shown herein in FIGS. 2 and 3. The exemplary elongated valve stem 192 is elongated relative to the valve stem of access valve 12 disclosed in U.S. Pat. No. 6,431,475 and relative to the valve pipe of access valve 12 shown herein in FIGS. 2 and 3. For this example, pipe 196 and stem 197 are each say 23 inches in length. (In an alternative form, specialized valve 200 comprises elongated pipe 196 and can comprise elongated stem 197 and elongated bearing 194.)

Exemplary valve 200 also comprises a deflector cone 205. The example of deflector cone 205 illustrated in FIG. 25 is 14 gauge sheet metal shaped into a cone 205, cone 205 measuring say four inches peak to base with the base diameter measuring substantially the diameter of faceplate 203. Cone 205 is welded to the bottom of faceplate 203. Cone 205 as configured serves to deflect oncoming flow to the outer edge of, and thus around, faceplate 203. In other words, flow is re-directed rather than crashing into plate 203.

Automated connector 115, single coupler automated connector 112 and independent vertical coupler connector 110 can each be enhanced by employing one or more of: a heightened coupler 210, a coupler-body-to-ground-support horizontal aligner 220 and a tucked catcher 230. As one example, the prior described independent vertical coupler travel 105 of valve coupler 130 of independent vertical coupler connector 110 can employ one or more of: heightened coupler 210, coupler-body-to-ground-support horizontal aligner 220 and tucked catcher 230. As another example, the prior described vertical coupler and rails travel 40 of independent vertical coupler travel 105 of valve coupler 130 (FIGS. 1 through 10) can employ one or more of: heightened coupler 210, coupler-body-to-ground-support horizontal aligner 220 and tucked catcher 230. As another example, the prior described vertical coupler travel 80 of independent vertical coupler travel 105 of valve coupler 130 (FIGS. 11 and 12) can employ one or more of: heightened coupler 210, coupler-body-to-ground-support horizontal aligner 220 and tucked catcher 230. (Conveyance 125 can be any means herein described.)

Figure 26:
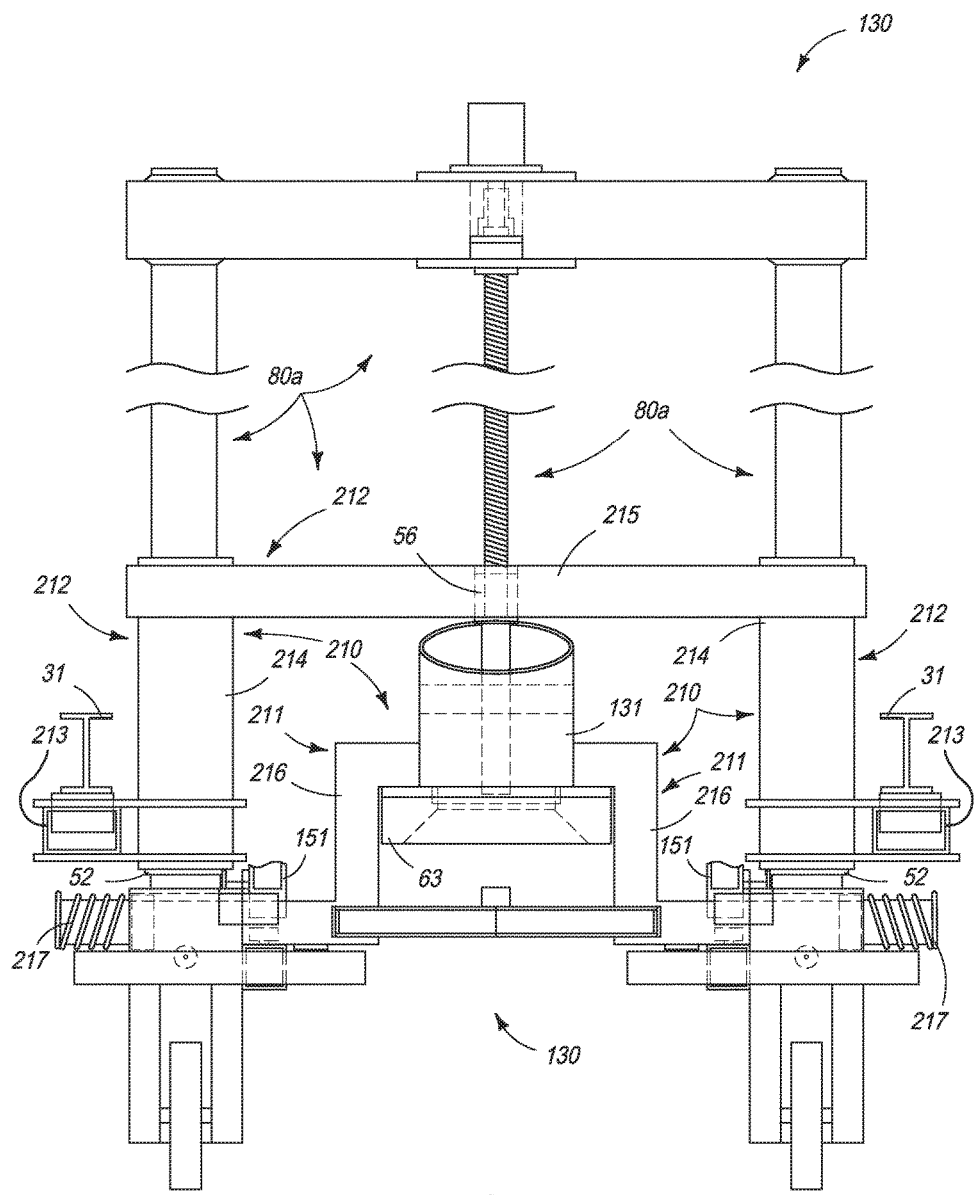
FIG. 26 is an end elevation view of a heightened coupler.

Heightened coupler 210 functions to facilitate valve coupler clearance. An example of heightened coupler 210 employed in the prior described vertical coupler travel 80 is illustrated in FIG. 26, travel 80 now shown as vertical coupler travel 80a. The exemplary heightened coupler 210 provides improved clearance for valve coupler 130 above crop during transport of coupler 130 from one access valve 12 to a next access valve 12 and can also function to provide improved clearance for valve coupler 130 above an access valve 12. The exemplary heightened coupler 210 enables components of valve coupler 130, for example coupler body 131, tucked catcher 230 (described below) and detector plank 151, to enjoy improved clearance above the ground/crop than prior described embodiments. As one example, for the fourth example of the first embodiment of system 10 (FIGS. 11 and 12), when coupler body 131 of valve coupler 130 resides in a fully raised position, body 131 is located substantially below the bottom edge of linear bearing 52. In contrast, heightened coupler 210 enables coupler body 131 as well as alignment cone 63 to both residing above the bottom edge of linear bearing 52 (FIG. 26). As another example, for the fourth example of the first embodiment of system 10 (FIGS. 11 and 12), when coupler body 131 resides in a fully raised position the top of motor 57 resides a substantial distance below the bottom of pipe 36. In contrast, heightened coupler 210 enables the top of motor 57 to reside only slightly below the bottom of supply pipe 36 (FIG. 30) thus said substantial distance has been utilized.

Exemplary heightened coupler 210 comprises an upwardly recessed coupler body mount 211 and an upwardly recessed top beam 212. The exemplary recessed coupler body mount 211 comprises two of a fabricated rectangular tube member 216. Each member 216 is welded to coupler body 131 and extends horizontally about six inches from body 131 in the opposite direction of the other member 216 as shown. Each tube 216 is further configured to extend downward from the end of said six inch extension about 12 inches and from there to extend horizontally about two feet. The outer end of each of said two-foot extensions is shown as tube outer end 217. Each tube outer end 217 is supported by bearings held inside a respective bearing mount of the described-below coupler-body-to-ground-support horizontal aligner 220.

Exemplary upwardly recessed top beam 212 includes a rectangular tube 215 having the prior discussed acme screw nut 56 mounted at its center. Tube 215 is four inches tall and eight inches wide and about four feet in length. Beam 212 includes two of a pipe 214. Pipe 214 is six inch schedule 40 pipe about two feet long. The top end of each pipe 214 is welded to a respective end of the rectangular tube 215. The outer side of the bottom end of each pipe 214 is attached to a respective roller assembly 213. Each pipe 214 is about two feet in length. (Each of the two roller assemblies 213 provides to enable a respective rail 31 to translate across the assembly thus enabling swing arm outer end 35 to travel relative to coupler body 131. In other words, assemblies 213 can perform substantially as disclosed for the prior-discussed roller assemblies 33 of trolley 32 shown in FIGS. 11 and 12 and substantially as disclosed in U.S. Pat. No. 6,431,475. However, each assembly 213 is fixed to the respective pipe 214 of beam recessed top beam 212. Conversely, each assembly 33 in said patent movably mounts two tubes with the assembly configured to allow travel of the tubes relative to the assembly 33, said travel transverse to said translation direction of the rails 31.)

Figure 27:
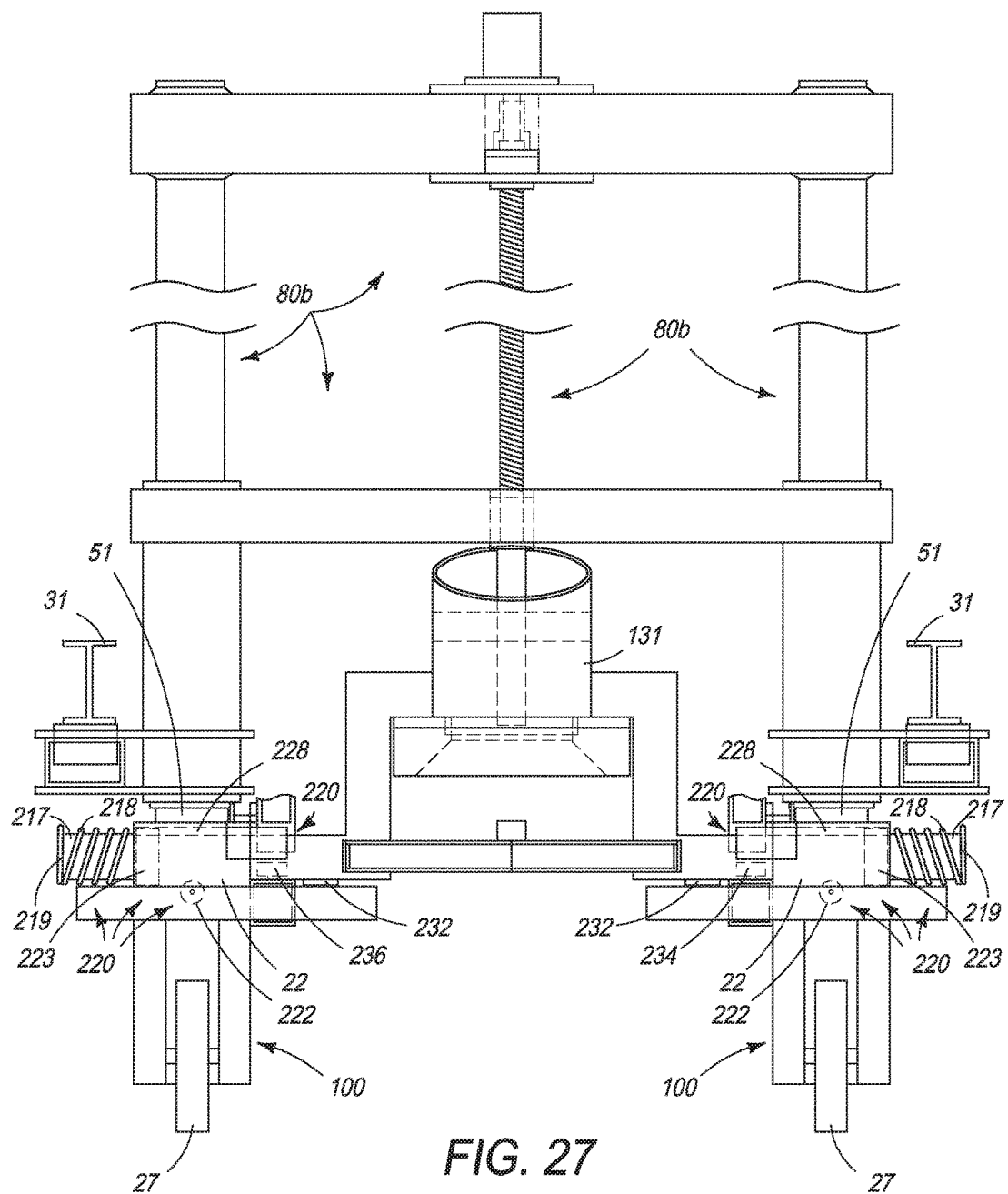
FIG. 27 is an end elevation view of a coupler-body-to-ground-support horizontal aligner.

Coupler-body-to-ground-support horizontal aligner 220 functions to provide substantially horizontal travel of a coupler body relative to ground support. An example of coupler-body-to-ground-support horizontal aligner 220 employed in the prior described vertical coupler travel 80 is illustrated in FIG. 27, travel 80 now shown as vertical coupler travel 80b. The exemplary aligner 220 enables coupler body 131 to travel relative to ground support structure associated with pivoting ground support 100 (support 100 described prior). Said travel facilitates alignment of coupler body 131 to an access valve 12, said alignment in a substantially horizontal direction substantially transverse to the longitudinal axis of rails 31. Herein prior-described embodiments facilitate alignment of coupler body 131 to an access valve 12 by locating alignment travel of coupler body 131 between structure attached to body 131 and the prior-discussed roller assemblies 33. Horizontal aligner 220 provides alignment travel oriented in close proximity to coupler body 131 (to align with an access valve 12) compared to the more distantly located alignment travel of said prior-described embodiments.

The exemplary coupler-body-to-ground-support horizontal aligner 220 facilitates the travel of coupler body 131 via movable support of the two prior described tube outer ends 217. Aligner 220 comprises two of a spring 218, two of a spring keeper 219, two of a bearing housing 221, two of a horizontal nylon roller 222, two sets of two of a vertical nylon roller 223. Only one roller of each set is shown, the other directly behind the one shown, two of a nylon bar 228, two of an aligner detection strip 232, a right-hand proximity switch 234 and a left-hand proximity switch 236. Each bearing housing 221 is a six inch by six inch square tube about eight inches long. Each housing is mounted between a respective bottom end of one of two stabilizer pipes 51 and a respective top of a support structure. Each bearing housing 221 has one of the two of horizontal roller 222 and one of the sets of two of vertical roller 223 mounted inside the tube.

Each horizontal roller 222 extends substantially horizontally and is mounted toward the bottom of and essentially centered in the respective housing 221. Each roller 222 provides to movably support the bottom side of the respective one of the two of tube outer end 217. Each roller 223 of each of the set of two extends substantially vertically and is mounted toward the outside end of the respective housing 221 on an opposite side wall of tube outer end 217 as the other of the two of roller 223. Each roller 223 provides movable support to the respective side wall of the respective tube outer end 217. Each of the two of nylon bar 228 is mounted to the underneath side of the top wall of the respective housing 221 to movably support the top side of the respective tube outer end 217. Each of the two of spring 218 is mounted with the respective tube outer end 217 located inside and one end of each spring 218 mounts against the outside end of the respective housing 221. Each of the two of keeper 219 is anchored at the extreme end of the respective outer end 217 and mounts against the other end of the respective spring 218. The length along outer end 217 between said outside end of housing 217 and said keeper 219 is slightly less than the uncompressed length of spring 218 thus spring 218 resides slightly compressed between said keeper 219 and said outside end of the respective housing 221. Each of the two of the slightly compressed spring 218 serve to center the two of tube outer end 217 and thus to maintain coupler body 131 essentially centered between support wheels 27, said alignment employed for example prior to alignment of body 131 with an access valve 12. Horizontal travel to the right or to the left (substantially transverse to the length of rails 31) of the two of tube outer end 217, each traversing the respective bearing housing 221, is employed to facilitate alignment of body 131 to an access valve 12. Each one of the two of aligner detection strip 232 is attached to a respective one of the two of tube outer end 217 such that the strip 232 travels in the same direction when the end 217 there-attached travels. Horizontal travel to the right is detected by right-hand proximity switch 234 when travel of the respective end 217 results in the there-attached strip 232 traveling underneath switch 234 (strip 232 and switch 234 shown in FIG. 28b). Horizontal travel to the left is detected by left-hand proximity switch 236 when travel of the respective end 217 results in the there-attached strip 232 traveling underneath switch 236.

Figure 28A:
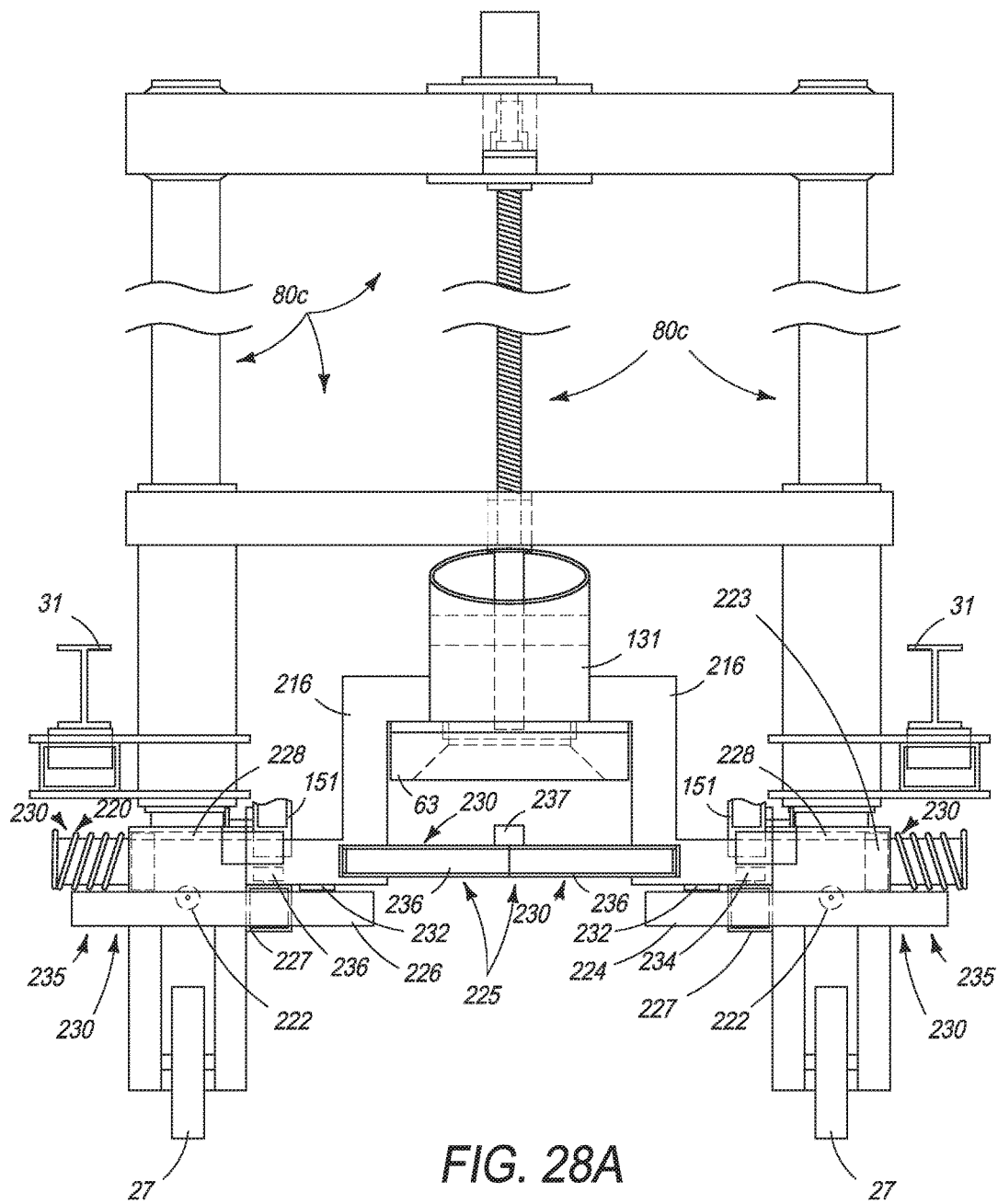
FIG. 28a is an end elevation view of a tucked catcher.
Figure 28B:
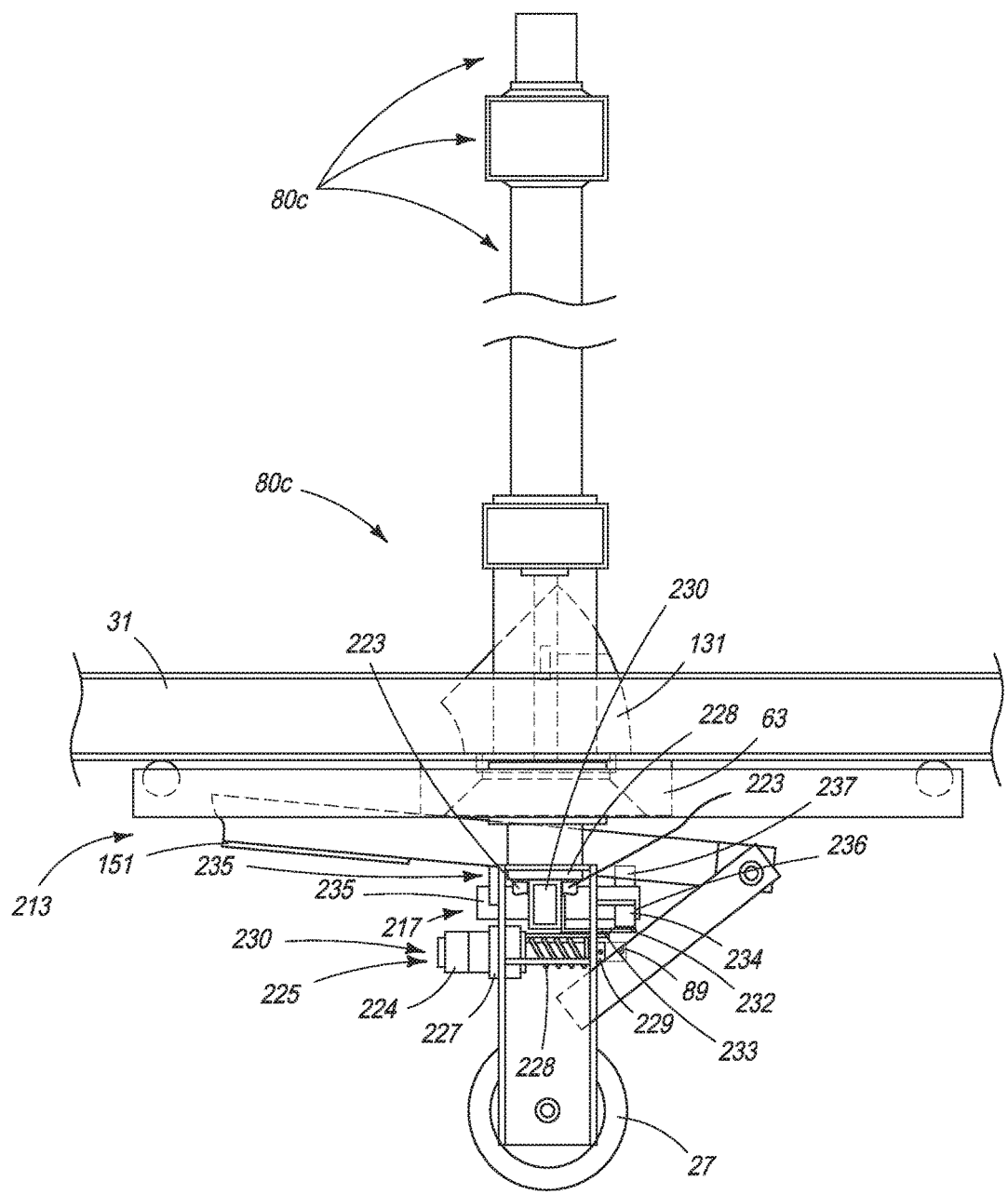

Tucked catcher 230 functions to position a coupler body above an access valve. An example of tucked catcher 230 when configured into the prior described vertical coupler travel 80 is illustrated in FIGS. 28a and 28b, travel 80 now shown as vertical coupler travel 80c. The exemplary tucked catcher 230 comprises hardware to position a coupler body above an access valve with said hardware configured to reside substantially within a trample. A trample zone 299 is shown in FIG. 31 as an area represented by a double arrow line extending between two boundary lines. Trample zone 299 comprises an area where crop gets disrupted by transport wheels and their support structure traversing over said crop during transport from one access valve to the next access valve. The exemplary tucked catcher 230, residing within trample zone 299, provides that catcher 230 does not disrupt any additional crop beyond that already trampled by said wheels and support structure. The compact presence of tucked catcher 230 also enables plank 151 to be positioned closer to valve body 131. There positioned, plank 151 protrudes less into the crop when support wheels 27 are resting on pad 101 (FIG. 34), for example during irrigation. The exemplary tucked catcher 230 comprises a first detector 235 and a V-catcher 225. The exemplary tucked catcher 230 employs two phases of operation to position a coupler body above an access valve, detector 235 accomplishes the first phase and V-catcher 225 accomplishes the second phase.

Exemplary first detector 235 accomplishes said first phase of operation of tucked catcher 230. The exemplary first detector 235 can function by detecting the horizontal position of a valve relative to the length of a swing arm. In other words, detector 235 detects where a valve is positioned along the length of rails 31. First detector 235 of tucked catcher 230 comprises a right-hand detector bar 224, a left-hand detector bar 226, two of a linear bearing 227, two of a spring 228, two of a keeper 229 and two of a detector bar detection strip 233.

First detector 235 (FIGS. 28a and 28b) also employs the prior-described right-hand proximity switch 234 and left-hand proximity switch 236 of aligner 220. (Switches 234 and 236 employed by both detector 235 and V-catcher 225 as well as by aligner 220 during alignment via cone 63 acting against the top of a valve 12.) Each linear bearing 227 is a three-inch by three-inch square tube about three inches long welded to the inner side of the inward of the respective of the two leg supports of prior described ground support wheel 27 as shown. Each of right-hand detector bar 224 and left-hand detector bar 226 comprise a 2½ inch high by 1½ inch thick rectangular tube about two feet long. Welded to the back side of said tube and extending at a right angle is a 2½ inch by 2½ inch rectangular tube about six inches long. Welded to the back end of said six-inch long tube via a mounting plate is a ½ inch diameter round rod about six inches in length. Welded to the respective inward leg support of support wheel 27 and horizontally aligned with the respective detector bar is a back-side flange. Each flange has a 9/16-inch hole. The six inch long tube component of each of right-hand detector bar 224 and left-hand detector bar 226 is positioned inside the respective linear bearing 227 thus enabling the respective detector bar to travel substantially horizontally and in the longitudinal direction of rails 31. The round rod component of each of right-hand detector bar 224 and left-hand detector bar 226 mounts inside the hole of the respective back-side flange. Thus when the detector bar travels horizontally, the rod correspondingly slides horizontally with the hole acting as a linear bearing. Each of the two of spring 228 mounts between a respective one of the mounting plates supporting the respective round rod and the respective back-side flange. Thus when detector bar 224 or detector bar 226 is forced against an access valve 12, the respective detector bar travels horizontally and the rod correspondingly slides horizontally through the hole of the respective flange and the spring 228 (mounted between flange and bar) is compressed. Each one of the two of keeper 229 bolts to the extreme end of one of the rods acting to keep the respective detector bar from falling out of its position inside the respective bearing 227. When force is no longer being placed against the respective detector bar, the compression in the respective spring 228 forces the bar back to its at-rest position.

Each of the two of detector bar detection strip 233 is attached to the respective round rod mounting plate to extend horizontally just above the respective spring 228 as shown. When detector bar 224 or detector bar 226 is forced against a valve 12 and the respective detector bar thus travels horizontally, the respective strip 233 travels horizontally to then reside underneath the respective right-hand proximity switch 234 or a left-hand proximity switch 236. The respective proximity switch then detects the strip (travel of right-hand detector bar 224 is detected by right-hand proximity switch 234, travel of left-hand detector bar 226 is detected by left-hand proximity switch 236). In response to said detection, operation of the drive motors of transporter 120 (transporter 120 in FIG. 30) is implemented. For example, in response to right-hand proximity switch 234 having been tripped, the drive motors are operated in the direction that causes transport wheels 121 to rotate clockwise (wheels 121 in FIG. 30). Said clockwise rotation of wheels 121 effects to slide bar 224 along valve 12 until the inner-side end of bar 224 slides off of valve 12. No longer pushed against valve 12, the spring loaded bar 224 returns to it's at-rest position thus the corresponding strip 223 retreats and is no longer positioned underneath switch 234. Thus switch 234 is no longer tripped and so said drive motor operation is halted meaning clockwise rotation of wheels 121 halts.

The exemplary V-catcher 225 (of tucked catcher 230, FIGS. 28*a* and 28*b*) accomplishes said second phase of operation of tucked catcher 230. The exemplary V-catcher 225 functions to horizontally align an access valve with a valve coupler. The exemplary V-catcher 225 incorporates coupler-body-to-ground-support horizontal aligner 220 to realign body 131 above a valve 12 for subsequent coupling thereto. Accordingly, V-catcher 225 employs the two of the prior-discussed aligner detection strip 232 as well as the prior-discussed right-hand proximity switch 234 and left-hand proximity switch 236 of aligner 220. V-catcher 225 comprises a catcher 226 and an access valve proximity switch 237. Catcher 226 comprises two arms, a right-hand arm and a left-hand arm, each arm about 16 inches long and each extending substantially horizontally. The arms are attached to each other at one end forming a 90-degree V-shape. The open end or mouth of the V-shape faces away from assembly 15 (FIG. 31). Catcher 226 is attached toward the bottom end of the leg of the prior described two foot long downward component of each of the prior described two of rectangular tube member 216 (of heightened coupler 210). Each of the two of the prior-discussed aligner detection strip 232 is attached to a prior-described two-foot horizontal extension of the respective one of the two of tube 216. Each strip 232 extends horizontally in the longitudinal direction of said two-foot horizontal extension component. When an arm of catcher 226 is pushed against a valve 12 said push causes horizontal travel in the direction perpendicular to the longitudinal axis of rails 31 said travel facilitated by aligner 220. For example, if the right-hand arm is pushed against valve 12 said horizontal travel is perpendicular to the longitudinal axis of rails 31 to the right (FIG. 28). Catcher 226 when pushed against a valve 12 likewise causes each strip 232 to travel horizontally and if said pushing causes enough travel, said travel results in one strip 232 being pushed sufficiently underneath the respective right-hand proximity switch 234 or left-hand proximity switch 236 to trip the switch. In other words, if the right-hand arm of catcher 226 is pushed against valve 12, catcher 226 will be pushed to the right and thus the strip 232 on the right-hand side will be pushed underneath right-hand proximity switch 234. Conversely, if the left-hand arm of catcher 226 is pushed against valve 12, catcher 226 will be pushed to the left (FIG. 28) and thus the detection strip 232 on the left-hand side will be pushed underneath left-hand proximity switch 236.

Figure 30:
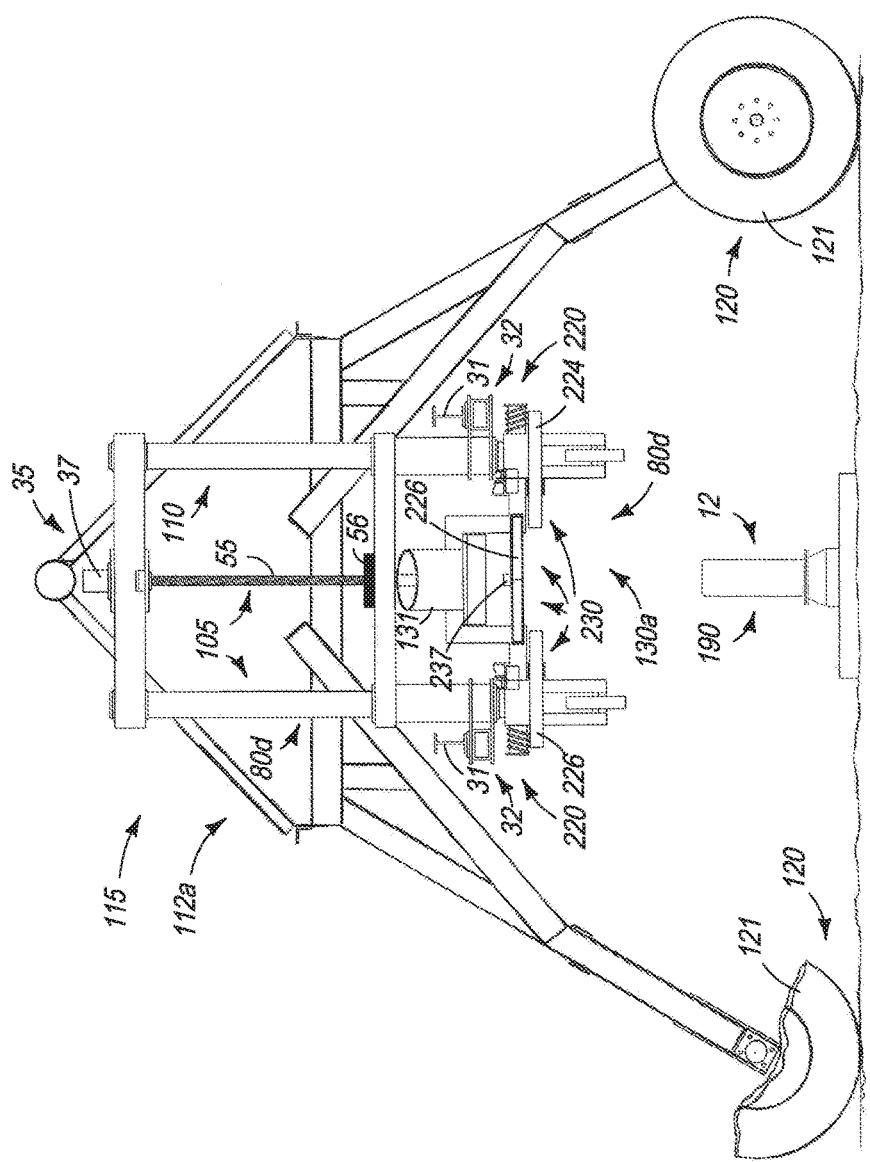
FIG. 30 is an end elevation view of a single coupler automated connector including a swing arm sporting a transporter, a valve coupler, a swing arm length adjuster and a water conveyance, the valve coupler includes the enhanced vertical coupler travel illustrated in FIG. 29 and resides in an uppermost orientation and further includes the upward slanted pivoting plank illustrated in FIG. 15.

If, for example, vertical coupler travel 80*c* is employed by the example of single coupler automated connector 112 shown in FIG. 30, in response to a respective one of the proximity switches being tripped, the drive motors of the transport wheels 121 of transporter 120 can be operated in the appropriate direction to cause coupler body 131 to be moved to its centered (at-rest) position. For example, if right-hand switch 234 is tripped, wheels 121 can be operated to cause outer end 35 of swing arm 16 to travel to the right thus sliding coupler body 131 to the left via aligner 220 until switch 234 is no longer tripped thus acting to center body 131. Continued pushing of coupler body 131 toward valve 12 with body 131 in a substantially centered position orients body 131 where valve 12 is detected by access valve proximity switch 237. In the centered position and with valve 12 detected by switch 237, coupler body 131 resides substantially aligned above valve 12 and alignment cone 63 is then employed to final align body 131 to valve 12. (During lowering of cone 63 onto a valve 12 to final align body 131 with valve 12, the horizontal travel of aligner 220 is further employed to accommodate said final align. During the lowering of cone 63 onto valve 12, operation of right-hand proximity switch 234 and left-hand proximity switch 236 can be employed to initiate operation of transporter 120 as described prior for aligner 220. Also, aligner 220, first detector 235 and V-catcher 225 employing aligner 220 each employ right-hand proximity switch 234 and left-hand proximity switch 236 in their operation. Alternately, one set of switches can be employed during the operation of aligner 220 and V-catcher 225 employing aligner 220 with a separate set employed by first detector 235. Also, FIG. 9 in U.S. Pat. No. 6,431,475 illustrates a bottom view of a configuring between a V-catcher and an alignment cone. The herein-described V-catcher 225 and cone 63 can be configured similarly.)

Figure 29:
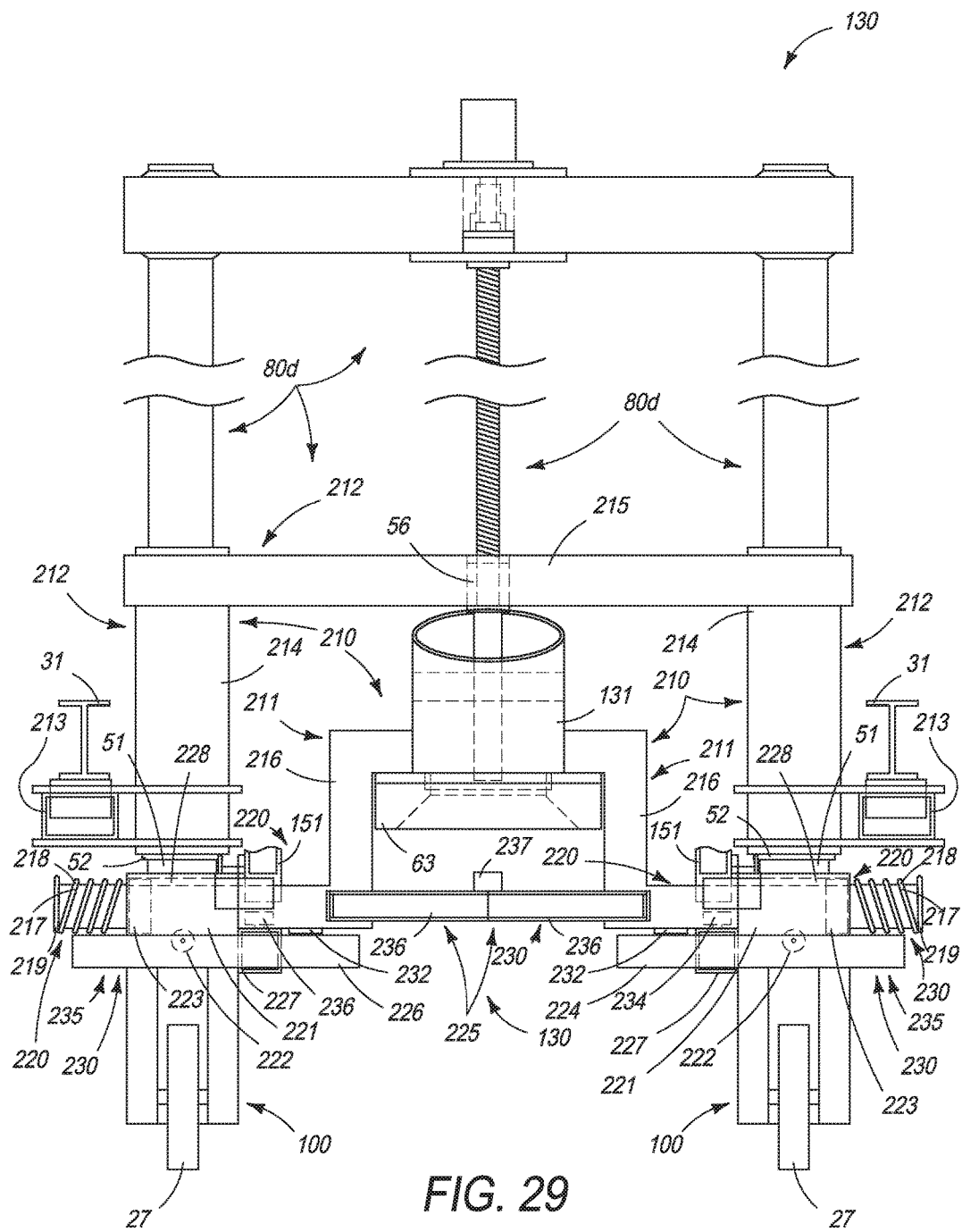
FIG. 29 is an end elevation view of a vertical coupler travel apparatus enhanced with the heightened coupler illustrated in FIG. 26, the coupler-body-to-ground-support horizontal aligner illustrated in FIG. 27 and the tucked catcher illustrated in FIG. 28.

FIG. 29 illustrates an example of and enhanced vertical coupler travel 80 (of valve coupler 130*a*) shown as vertical coupler travel 80*d*. The exemplary travel 80*d* comprises the above-described heightened coupler 210 illustrated in FIG. 26, the above-described coupler-body-to-ground-support horizontal aligner 220 illustrated in FIG. 27 and the above-described tucked catcher 230 illustrated in FIGS. 28*a* and 28*b*.

FIGS. 30 and 31 illustrate an example of a single coupler automated connector 112*a*. The exemplary connector 112*a* comprises a swing arm 16 sporting a transporter 120, a valve coupler 130, a swing arm length adjuster 30 and a water conveyance 125 with valve coupler 130*a* comprising the enhanced vertical coupler travel 80*d* illustrated in FIG. 29 and with vertical coupler travel 80*d* residing in an uppermost orientation. FIGS. 30 and 31 further illustrate valve coupler 130 comprising the upwardly slanted pivoting plank 165 illustrated in FIG. 15, plank 165 shown oriented above the specialized valve assembly 180 illustrated in FIG. 25. (Water conveyance 125 is shown on FIG. 31. Conveyance 125 is shown comprising the prior-described flexible conduit with pivoting conduit 140 (conveyance 125 cut away in FIG. 30). However, conveyance 125 of connector 112*a* can comprise any means to operably flow water between body 131 and arm 16.)

Operation of the exemplary single coupler automated connector 112*a* comprising vertical coupler travel 80*d*, including operation of the above-described exemplary tucked catcher 230 in conjunction with the above-described exemplary coupler-body-to-ground-support horizontal aligner 220, will now be described (said operation relative to irrigation about to a given access valve 12).

Delivery pipe assembly 15 is situated somewhere between ends of a field. Assembly 15 has previously been applying water while traveling forward along water main 11 with coupler body 131 of valve coupler 130*a* connected to an access valve 12. Body 131 has then been raised off of (disconnected from) the access valve 12 by vertical coupler travel 80*d*. Coupler travel 80*d* is oriented in an uppermost position. Trolley 32 has been operated to move coupler 130*a* toward delivery pipe assembly 15 along rails 31 until reaching the position shown in FIG. 31 where tucked catcher 230 of coupler 130*a* resides within trample zone 299.

FIGS. 30 and 31 illustrate the above-described orientation where coupler travel 80*d* is oriented in an uppermost position and tucked catcher 230 of coupler 130*a* resides within trample zone 299 (FIG. 31). Said position has been assumed in anticipation of transporter 120 transporting valve coupler 130*a* from the previously connected to valve 12 to the next valve 12. Upon assuming said uppermost position, transporter 120 is now operated propelling wheels 121 causing travel of outer end 35 of swing arm 16 and thus transport of coupler 130*a* to a next forward valve 12. Said travel of end 35 is measured (see U.S. Pat. No. 6,431,475) with operation of transporter 120 halted when said measuring indicates that detector plank 151 (of pivoting plank 165) is horizontally aligned with said next forward valve 12 (also the position shown in FIGS. 30 and 31).

Figure 32:
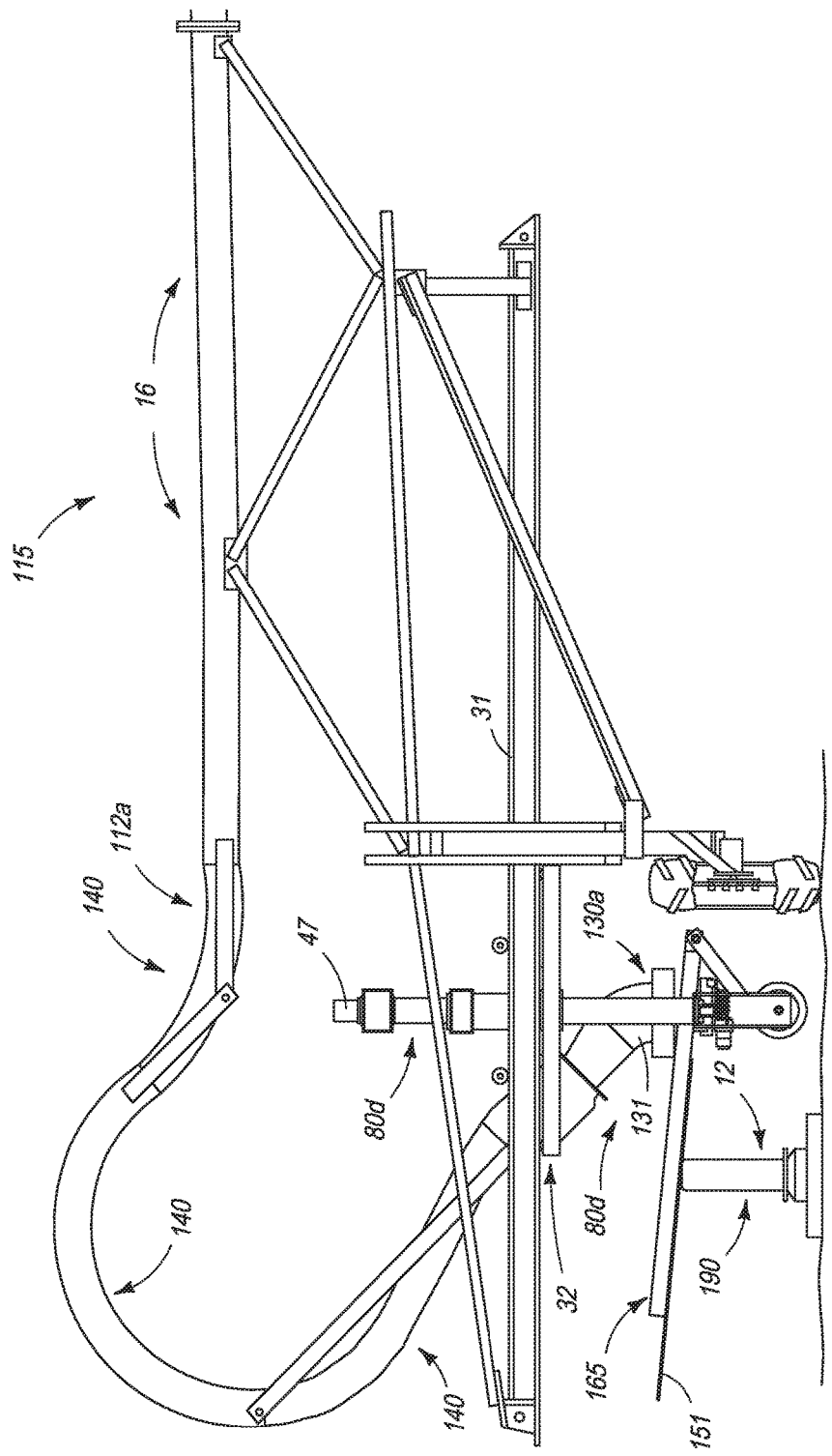
FIG. 32 is the apparatus of FIG. 31 with the exception that the valve coupler has been moved outward slightly and the vertical coupler travel resides in a lowered position where the specialized valve assembly has been contacted.

Trolley 32 is now operated to move coupler 130*a* away from delivery pipe assembly 15 along rails 31 until reaching the position along rails 31 shown in FIG. 32. In said position, with plank 151 positioned above valve 12 (specialized valve assembly 180), motor 57 (of coupler travel 80*d*) is operated to rotate lead screw 55 in the appropriate direction that causes nut 56 and the structure there-attached to lower. Said lowering lowers plank 151 (and coupler body 31). Lowering continues until plank 151 *a* position where plank 151 has be pivoted upward as caused by contact with the top of said next forward access valve 12 where a proximity switch trips.

FIG. 32 illustrates the above-described plank 151 having been pivoted upward as caused by contact with the top of said next forward access valve 12. The tripped proximity switch implements operation of motor 57 to rotate lead screw 55 in the opposite direction causing screw nut 56 (screw 55 and nut 56 shown best in FIG. 30) and the structure there-attached to raise plank 151. Plank 151 is raised until said tripped proximity switch is no longer tripped. The tripped proximity switch simultaneously also implemented operation of the drive motor for trolley 32 (trolley described in U.S. Pat. No. 6,431,475). Said operation propels trolley 32 along rails 31 toward valve 12. (Because of the upward slant of plank 151, said travel of trolley 32 causes plank 151 to again and again engage valve 12, each engagement forcing plank 151 to pivot upward until the proximity switch trips with motor 57 then again until the proximity switch is again no longer tripped.) Travel of trolley 32 toward valve 12 continues until right-hand detector bar 224 or left-hand detector bar 226 or catcher 226 is subsequently pushed against valve 12 (bar 224, bar 226 and catcher 226 shown best in FIG. 30). For this example of operation, right-hand detector bar 224 is pushed against valve 12.

Figure 33:
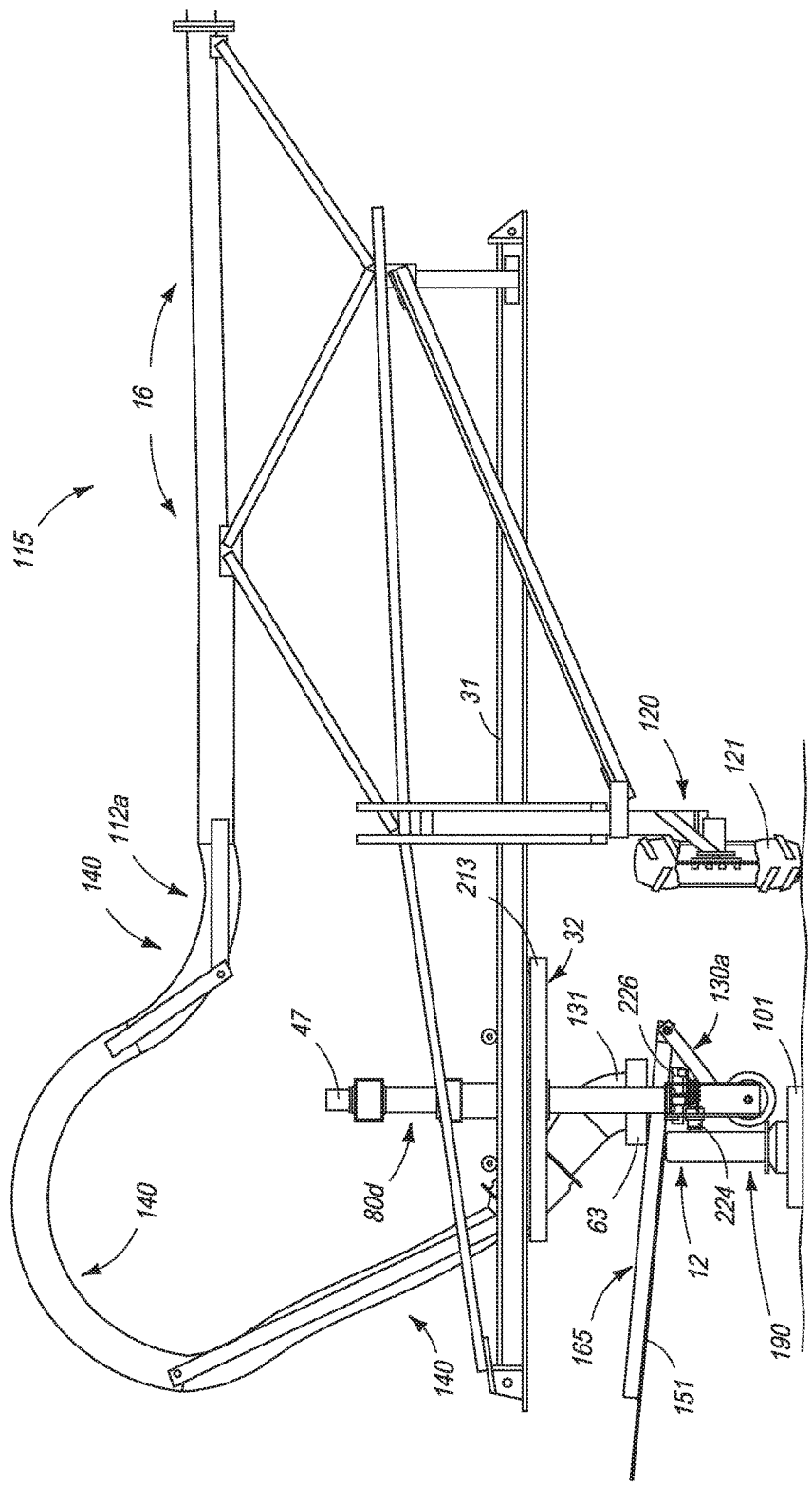
FIG. 33 is the apparatus of FIG. 32 with the exception that the valve coupler has been moved outward to where a detector bar has contacted the specialized valve assembly.

FIG. 33 illustrates the above-described right-hand detector bar 224 pushed against valve 12 (see also FIG. 30). Pushing right-hand detector bar 224 against valve 12 pushes the spring loaded bar 224 horizontally in the direction of transport wheels 121 until detector bar detection strip 233 (FIG. 28*b*, attached to bar 224) has subsequently been pushed underneath right-hand proximity switch 234 where strip 233 is detected by switch 334. Operation of the drive motors of transporter 120 is implemented in response to said detection of strip 233 by switch 334. In response to right-hand proximity switch 234 having been tripped, the drive motors are operated in the direction that causes transport wheels 121 to rotate clockwise (wheels 121 shown best in FIG. 30). Said clockwise rotation of wheels 121 effects to slide bar 224 along valve 12 until the inner-side end (the end inside the mouth of catcher 226) of bar 224 slides off of valve 12. Absent contact with valve 12, the spring loaded bar 224 returns to it's at-rest position thus the corresponding strip 233 retreats and is thus no longer positioned underneath switch 234. Consequently, switch 234 is no longer tripped resulting in the transporter 120 drive motor operation being halted. Thus clockwise rotation of wheels 121 halts. However, the drive motor of trolley 32 is still being powered. The still-being-propelled trolley 32 moves V-catcher 225 further along rails 31 toward valve 12 until catcher 226 of V-catcher 225 engages valve 12. Engagement of catcher 226 to valve 12 by the still-being-propelled trolley 32 forces catcher 226 against the valve 12 causing catcher 226 to travel via coupler-body-to-ground-support horizontal aligner 220 which allows coupler body 131 to continue to be moved by trolley 32 toward overhead alignment with valve 12. If trolley 32 forcing catcher 226 against valve 12 causes catcher 226 to travel a sufficient distance (said travel horizontally and transverse to the length of rails 31 via coupler-body-to-ground-support horizontal aligner 220 shown best in FIG. 30), the presence of the respective detection strip 232 underneath either right-hand proximity switch 234 or left-hand proximity switch 236 of aligner 220 will cause the switch to trip (the particular switch tripped depending upon the direction of the misalignment). Responsive to the tripped switch, transport wheels 121 are rotated affecting to return aligner 220 to a more centered orientation where the switch is no longer tripped. The still-being-propelled trolley 32 continues to move in the direction of valve 12 until valve 12 is detected by access valve proximity switch 237. In response to said detection, trolley travel is halted and motor 47 of vertical coupler travel 80*d* is operated in the direction to lower alignment cone 63. The lowering cone 63 subsequently contacts the top edge of valve 12. Further lowering of cone 63 affects to final align coupler body 131 with valve 12, said alignment facilitated by coupler-body-to-ground-support horizontal aligner 220 (said lowering may cause right-hand proximity switch 234 or left-hand proximity switch 236 of aligner 220 to trip causing transporter 120 to be operated). Further lowering couples body 131 to valve 12. Further lowering places support wheels 27 onto concrete pad 101. Further lowering lifts support wheels 121 approximately 12 inches off of the ground. Here valve coupler travel 180*d* has assumed a fully lowered position and operation of motor 47 is halted.

Figure 34:
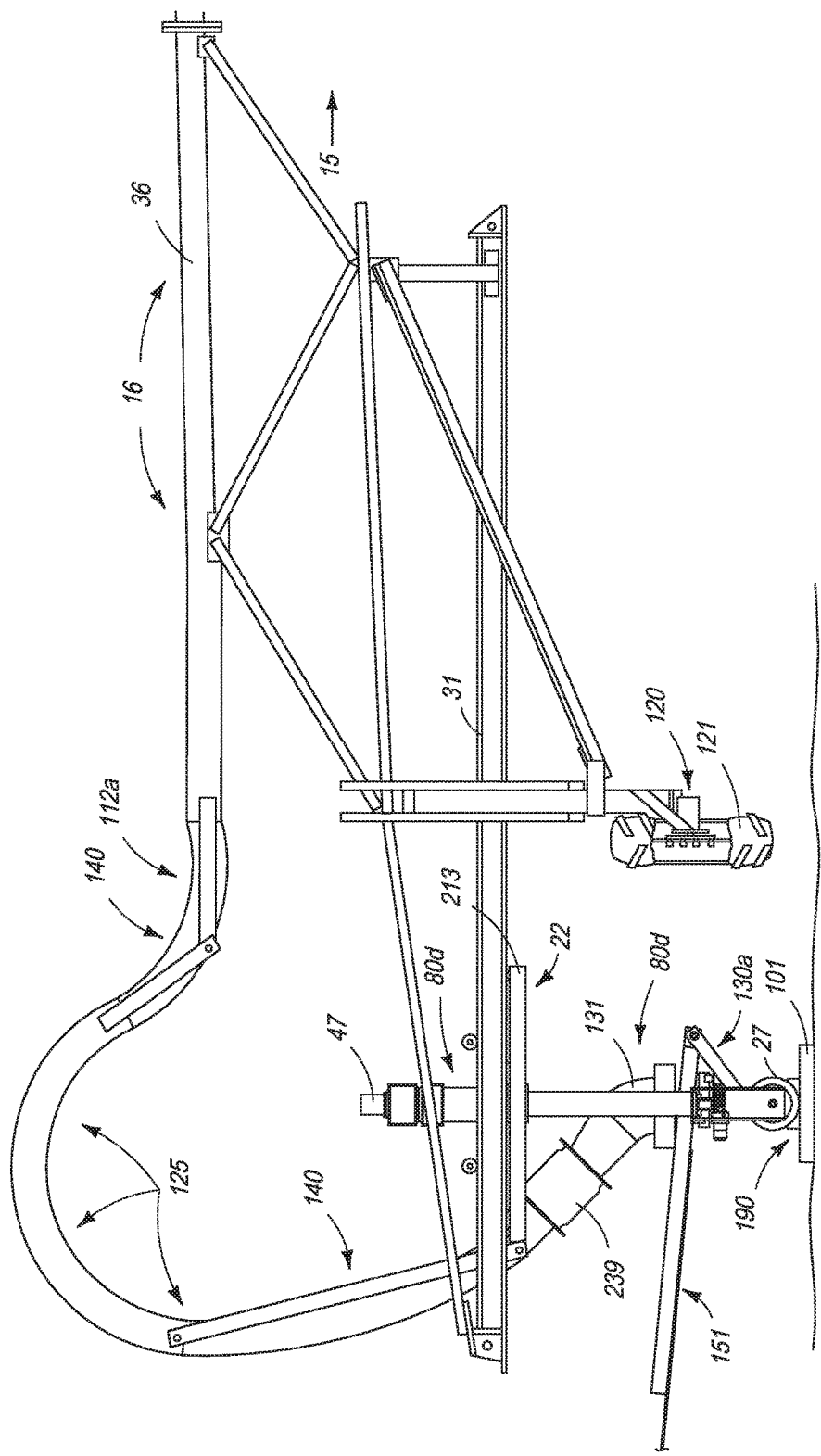
FIG. 34 is the apparatus of FIG. 33 with the exception that the transporter has been operated to slide the detector bar beyond the valve coupler and with the further exception that the vertical coupler travel has been operated to reside in a lowermost orientation where a coupler body is coupled to the access valve, the apparatus is supported on a concrete pad and the transporter has been lifted off of the ground.

FIG. 34 illustrates the above-described vertical coupler travel 80*d* residing in said fully lowered position. Here, bladder valve 239 is then electrically actuated and thus opened (valve 12 is already open). With valve 239 open, the pressurized water in water main 11 is enabled to flow through valve 12 and valve 239 and, thus, through water conveyance 125, through supply pipe 36 and into delivery pipe assembly 15 where irrigation water is applied to cropland. Detection of the pressurized water in assembly 15 initiates operation of the drive motors of assembly 15 commencing delivery pipe travel across the field while applying the irrigation water. Said travel causes each rail 31 to translate across the associated roller assembly 213. Said translation moves body 131 along rails 31 toward assembly 15 until approaching the inner end of rails 31 where swing arm 16 and assembly 15 are substantially aligned. Continued travel of assembly 15 then affects to cause each rail 31 to translate across the associated roller assembly 213 in the opposite direction. In other words, body 131 then moves along rails 31 away from assembly 15. Said away-from travel continues until a proximity switch detects the outer end of rails 31. In response to said detection, travel of assembly 15 is halted, water valve 239 is closed and motor 47 of vertical coupler travel 80*d* is operated. Said operation of motor 47 rotates lead screw 45 is the appropriate direction to cause nut 46 to travel upward thus lowering wheels 21 back onto the ground. Operation of motor 47 is continued affecting to lift body 131 off of the valve 12 (thus closing the valve 12) and subsequently to raise body 131 as well as upwardly slanted pivoting plank 165 until an uppermost orientation of travel 80*d* is achieved where operation of motor 47 is halted. The drive of trolley 22 is then operated to move valve coupler 130*a* along the rails 31 away from said outer end of rails 31 until operation of the trolley drive is halted upon again reaching the orientation illustrated in FIG. 31. One cycle of operation relative to communion with a given valve 12 has been completed. Coupling to a next valve 12 comprises a mere repetition of the just described cycle. (See U.S. Pat. No. 6,431,475 including FIGS. 16a through 16d and 17a through 17d.)

Figure 35:
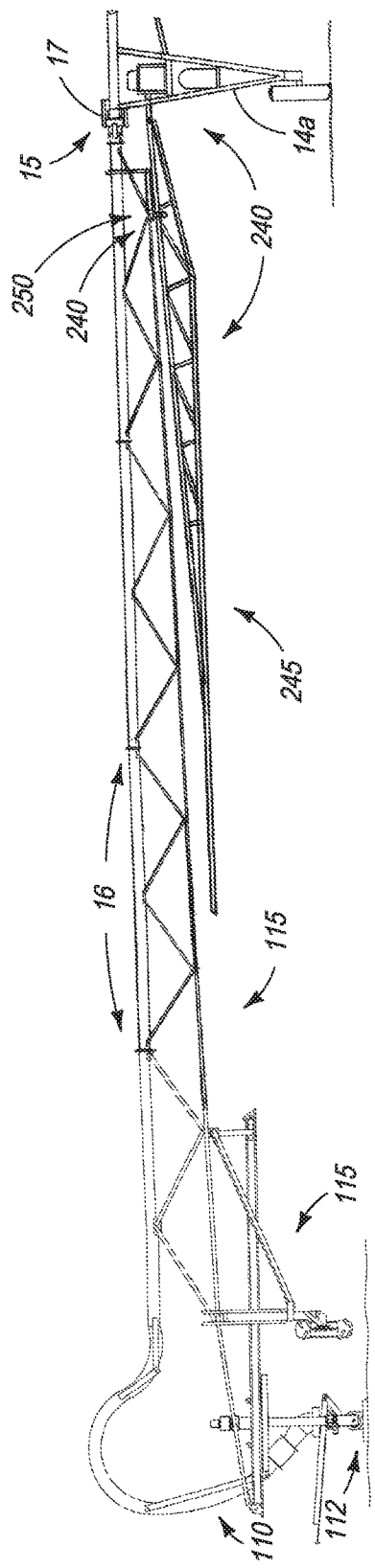
FIG. 35 is a side elevation view of a direct translation under-boom of the present invention.
Figure 36:
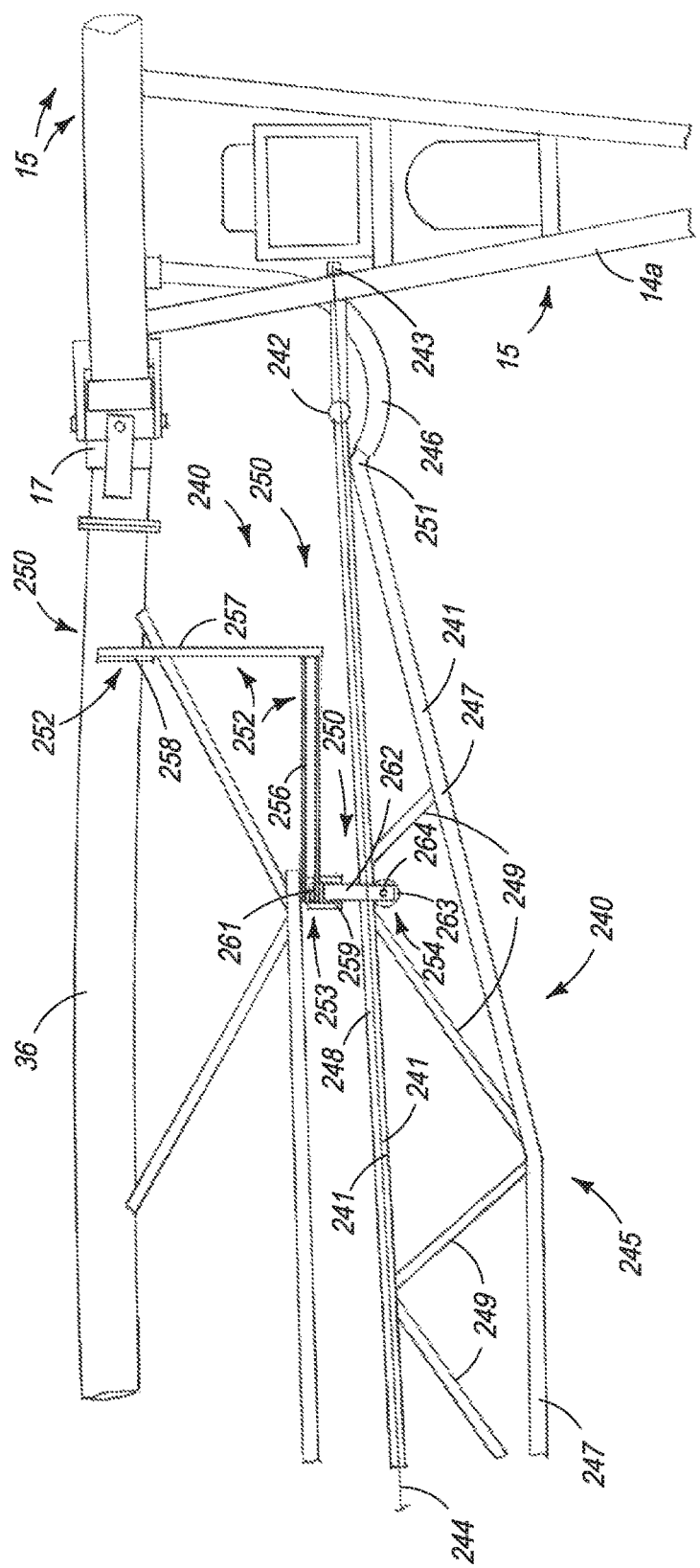
FIG. 36 is a side elevation enlarged view illustrating a sprinkler boom supportably attached to a swing arm via a track member of the direct translation under-boom illustrated in FIG. 35.
Figure 37:
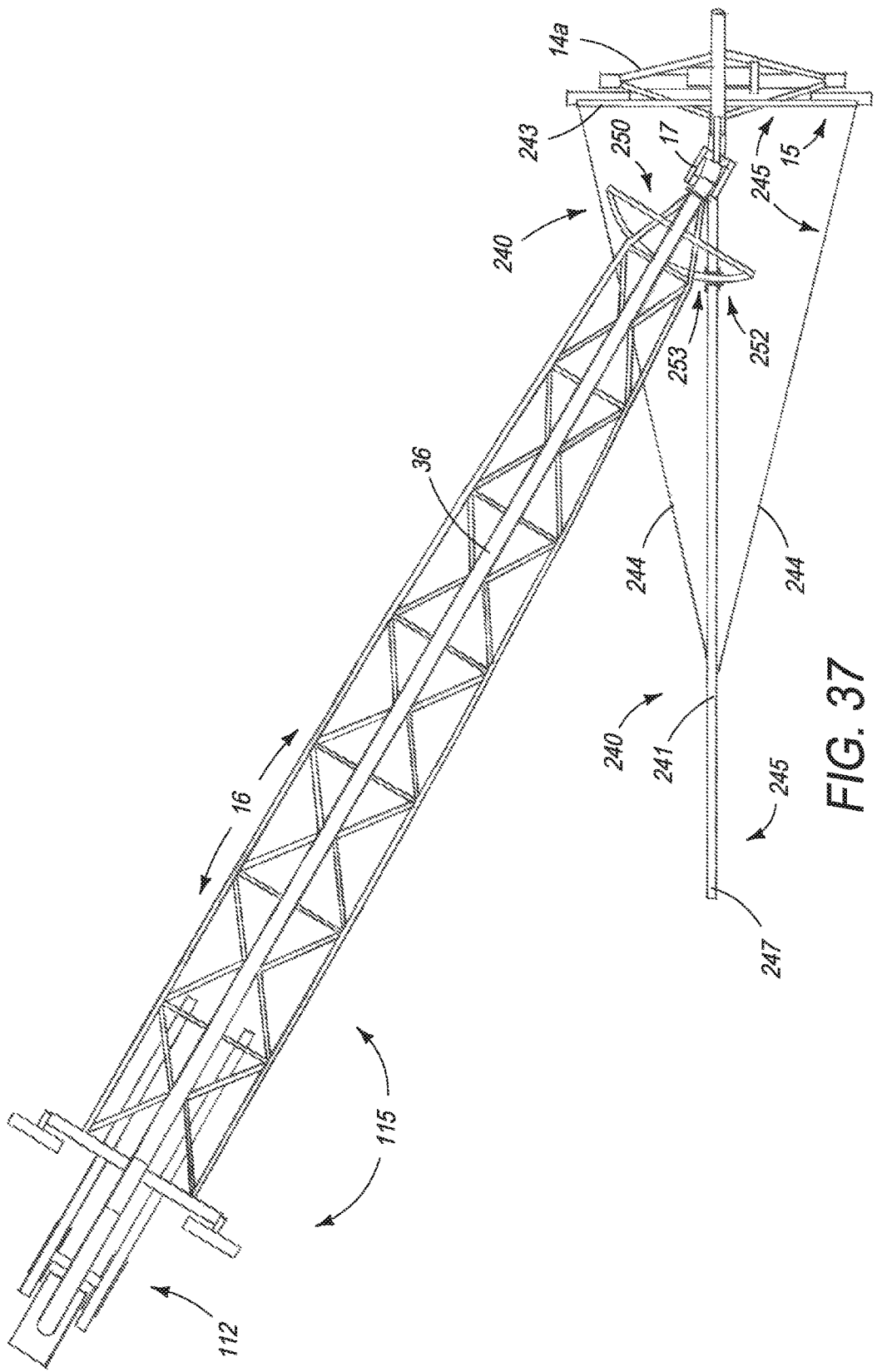
FIG. 37 is a top view of the direct translation under-boom illustrated in FIG. 35.

Embodiments of the present invention can be enhanced through employment of a direct translation under-boom 240. Direct translation under-boom 240 functions to directly translate an elevation. An example of direct translation under-boom 240 is illustrated in FIGS. 35, 36 and 37. The exemplary under-boom 240 is employed in conjunction with an above structure, under-boom 240 and the above structure both attached to delivery pipe assembly 15. The exemplary under-boom can be employed in conjunction with any of the prior described automated connector 115, single coupler automated connector 112 and independent vertical coupler connector 110. For this example, the above structure comprises the prior-described swing arm 16 of single coupler automated connector 112. The exemplary direct translation under-boom 240 provides to maintain a sprinkler boom in close proximity to the bottom side of swing arm 16 to achieve maximum clearance above crop. Under-boom 240 maintains said close proximity by supporting sprinkler boom 245 underneath swing arm 16 via a direct suspension 250. Travel at swing arm outer end 35 (via transporter 120) and travel at cart 14*a* (of delivery pipe assembly 15) cause alteration to the elevation of swing arm 16 (and to the elevation of a sprinkler boom if fixed to cart 14*a*). Under-boom 240 maintains said close proximity during said alteration to elevation. Exemplary direct translation under-boom 240 comprises a sprinkler boom 245 and a direct suspension 250.

The exemplary direct translation under-boom 240 comprises a sprinkler boom 245. Boom 245 functions to apply irrigation water. The example of sprinkler boom 245 illustrated in FIGS. 35, 36 and 37 includes a vertically trussed boom 241, a guy wire support member 243, two of a guy wire 244, a hose 246 and can include a boom pivot 242.

Vertically trussed boom 241 (shown best in FIG. 36) includes a water conduit 247, a tension support tube 248, nine of a vertical support 249 and a hose nipple 251. Vertically trussed boom 241 has one end mounted to cart 14*a* (cart 14*a* located at the inner end, i.e. end closest to mainline 11, of water delivery pipe assembly 15) and extends about 60 feet therefrom toward water main 11 to a free-hanging end. Water conduit 247 extends along the bottom of boom 241. (Thus conduit 247 also extends about 60 feet toward water main 11). Water conduit 247 is a two-inch wide by three-inch high 12 gauge rectangular tube. Sprinklers for applying irrigation water onto crop are mounted spaced along the bottom side of conduit 247. Tension support tube 248 extends along the top of boom 241. Tension support tube 248 is two-inch wide by three-inch high 12 gauge rectangular tube. Tube 248 extends from cart 14*a* (where boom 241 is mounted) to about 15 feet from said free-hanging end of boom 241. At said 15 feet from said free-hanging end, tube 248 is welded to the top wall of conduit 247. Each of the nine of vertical support 249 is a two-inch wide by three-inch high 12 gauge rectangular tube. Each of the nine of vertical support 249 is spaced along boom 241 welded between tube 248 and conduit 247 as shown in FIG. 35. Hose nipple 251 is welded to the end of conduit 247 residing near said end of boom 241 mounted to cart 14*a*.

Guy wire support member 243 (shown best in FIGS. 36 and 37) is a three inch by three inch square tube about 15 feet long and having a one-quarter inch wall thickness. Member 243 is attached to cart 14*a* of pipe assembly 15 and is positioned at substantially the same height as boom pivot 242, pivot 242 also attached to said cart 14*a* (pivot 242 described below).

One end of each of the two of guy wire 244 (shown best in FIG. 37) is attached to one end of support member 243. Each wire 244 extends therefrom to the above-described vertically trussed boom 241 where the other end of said each wire is attached to boom 241 near the above-described 15 feet from said free-hanging end (where tube 243 is welded to the top wall of conduit 242). Each of the two of guy wire 244 acts to transfer any horizontal force on under-boom 241 (such as force from wind) to tube 243 and thus to cart 14*a*. (In one variation, under-boom 241, in addition to being vertically trussed, can be horizontally trussed and thus guy wires 244 and support member 243 need not be employed.)

Hose 246 (FIG. 36) is a two and one-half inch diameter water discharge hose capable of accommodating pressures up to 100 PSI. Hose 46 is attached to nipple 251 of trussed boom 241 and extends to a union with pipe assembly 15 enabling water to pass from pipe assembly 15 to water conduit 247.

Boom pivot 242 (FIG. 36) is a hinge that permits rotation in a substantially vertical plane. Pivot 242 is mounted between the end of boom 241 and cart 14*a* of water delivery pipe assembly 15. Pivot 242 enables boom 241 to be rotated up and down (i.e. rotated in said substantially vertical plane). (In one variation, sprinkler boom 245 can be configured without pivot 242. The range of said up and down rotation of boom 241 is sufficiently small where conduit 247 support tube 248 can be configured to flex to accommodate.)

The exemplary direct translation under-boom 240 comprises a direct suspension 250. Direct suspension 250 functions to translate the elevation of an above structure to the elevation of an under-boom through direct suspension of the under-boom. The example of direct suspension 250 illustrated in FIGS. 35, 36 and 37 includes a track member 252, a track trolley 253 and can include a longitudinal compensater 254.

Direct suspension 250 includes track member 252. Track member 252 includes a rolled I-beam 256, a top pipe tie-in 258 and a beam end support 257. Rolled I-beam 256 is a six-inch tall by four inch wide I-beam, said I-beam rolled on an eight-foot radius and having a length roughly 110 degrees of the eight-foot radius circle. Top pipe tie-in 258 is a roughly 12 inch wide by 10-inch tall piece of three-eighths inch thick steel plate. Said plate has been fitted and welded to swing arm top pipe 36 and resides in proximity to pivot 17 (pivot 17 also shown in FIG. 16). Beam end support 257 includes two of a three-inch by three-inch angle iron having a one-quarter inch wall thickness. Each of the two of support 257 is attached at one end to one end of the rolled I-beam 256. The other end of each of the two of support 257 is bolted to top pipe tie-in 258. Each of the two of end support 257 serve to transfer the load from weight being carried at or near said ends of I-beam 256 to swing arm top pipe 36. I-beam 256 is also supportably attached near the center of its circumference to swing arm 16, attached to each of the bottom chords of arm 16 as shown.

Direct suspension 250 includes a track trolley 253. Trolley 253 includes a roller housing 259 and four of a track roller 261 (only one of roller 261 is shown, the other three are hidden). Each of the four of track roller 261 is a wheel configured to roll on the flange of I-beam 256. Roller housing 259 is configured to mount each of the four of track roller 261 such that each roller 261 rolls on the top side of the bottom flange of I-beam 256 enabling housing 259 to travel along said bottom flange. Housing 259 includes two of a bottom flange 262. Each of the two of flange 262 extends downward with their face sides parallel to each other with a four inch space between faces and each flange 262 has a three-quarter inch hole near its bottom end. A compensator wheel 263 (below) rollably mounts between the two flanges 262. Track trolley 253 acts to transfer the weight of boom 241 to track member 252 and thus to arm 16. When swing arm 16 swings, for example when transporter 120 transports outer end 35 between valves, said swing causes trolley 253 to roll along track member 252. For example, when swing arm 16 is near the position where arm outer end 35 has just been transported to a next successive access valve or (when heading in the opposite direction) is about to be transported to a next successive access valve, swing arm 16 is oriented relative to boom 241 as shown in FIG. 37. In said orientation, boom 241 is being hung from I-beam 256 via trolley 253 with trolley 253 located near one end of I-beam 256, I-beam 256 transferring the hung weight via end support 257 and top pipe tie-in 258 to swing arm top pipe 36.

Direct suspension 250 can include a longitudinal compensater 254. Longitudinal compensater 254 provides to compensate for misalignment between an upper structure and a sprinkler boom. Compensator 254 includes a compensator wheel 263. Wheel 263 is a four-inch diameter rubber wheel about three inches thick. Wheel 263 is mounted between said faces of the two of bottom flange 262. A five-eighth inch diameter bolt 264 acts as the axle for wheel 263, said bolt 264 extending through the three-quarter inch hole of each of flange 262. (Sprinkler boom 245 can be configured without compensater 254. The range of the prior-suggested alteration to the elevation of swing arm 16, from travel at swing arm outer end 35 and from travel at cart 14a, is sufficiently small where slight rotation of housing 259 can accommodate said range. Said rotation of housing 259 can be facilitated be allowing two of the four of track rollers 261 to be raised from contact with the top side of the bottom flange of I-beam 256. The other two rollers 261 remaining in contact with I-beam 256 is sufficient to carry the weight of under-boom 240 being supported.)

(The above-described boom 245 serves to irrigate the land that underneath the above-described above structure when said structure travels across a field, said above-structure for example comprising swing arm 16. A different approach is a sprinkler boom such as boom 245, for example, attached to pipe assembly 15 and configured to be suspended toward mainline 11 (like shown in FIG. 37) with the exception that the sprinkler boom is not longitudinally aligned with assembly 15. Instead, the boom is configured at an angle to assembly 15, for example roughly at a 45-degree angle. Said configured at an angle provides that the boom resides out of the path of an above-structure, for example out of the swing path of swing arm 16. The boom can be configured having a top pipe and two bottom chords (similar to swing arm 16) with the one end attached to assembly 15 and the other end supported suspended from one or more guy wires, can be like boom 245 suspended by one or more guy wires, can be like arm 16 and require no wire suspension or can be other.)

Figure 38:
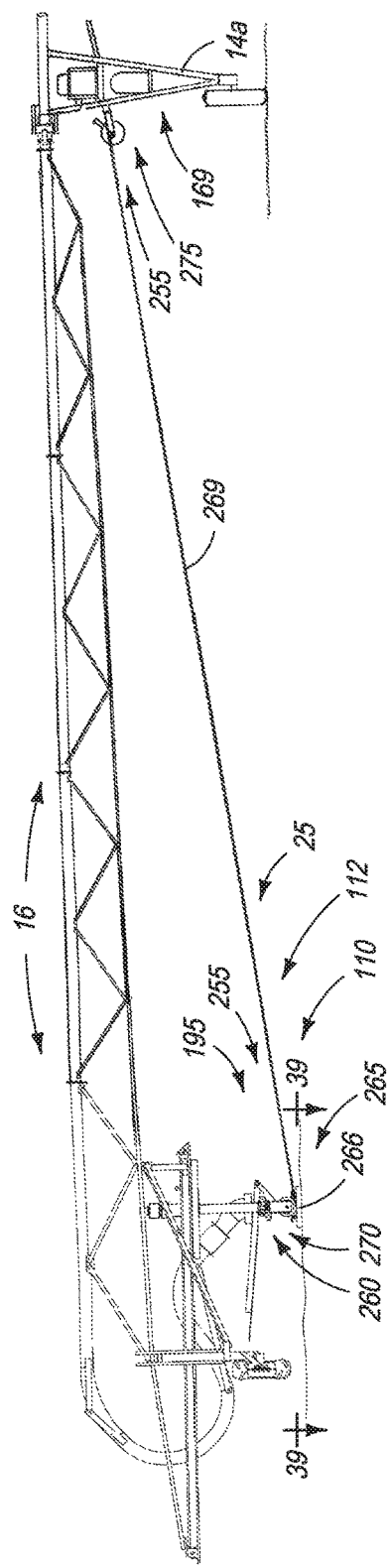
FIG. 38 is a side elevation view of a rotation positioner attached to a pivotable linear-move delivery pipe assembly.
Figure 39:
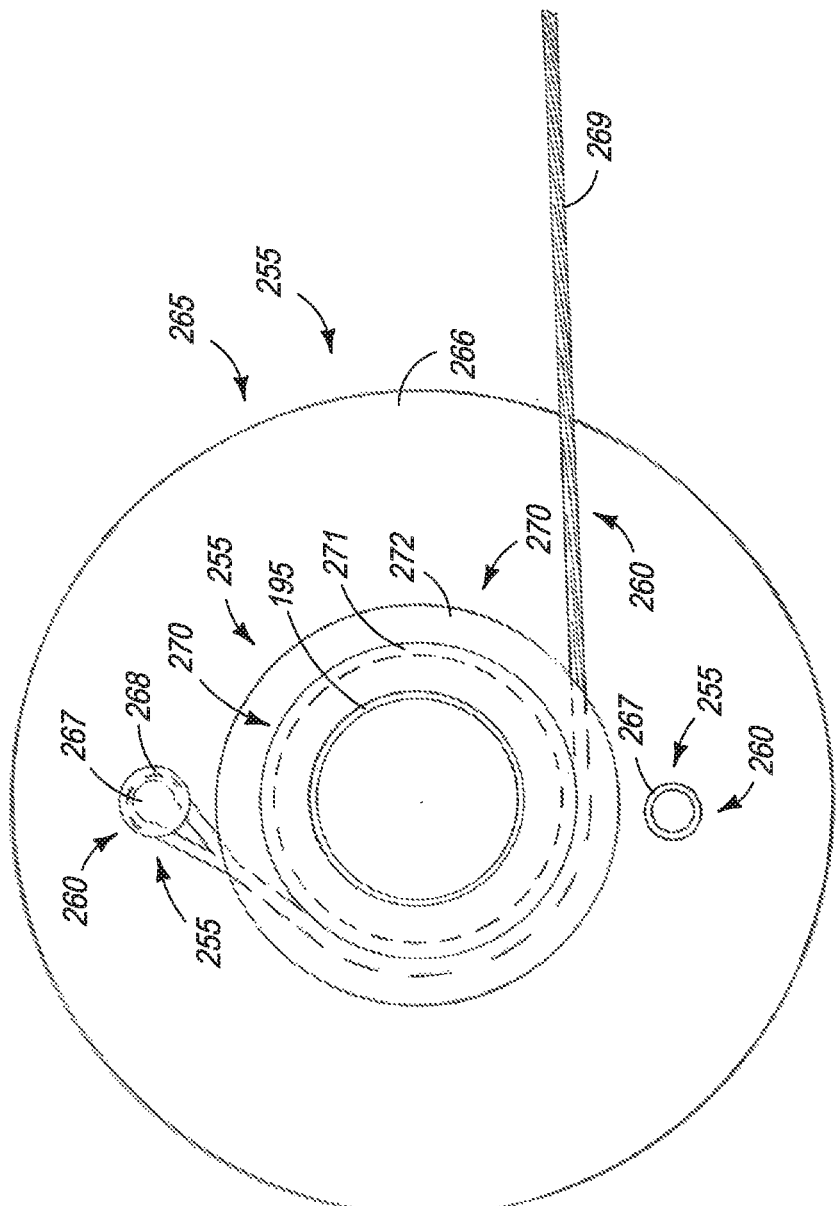
FIG. 39 is a top plan view taken on line 39-39 of FIG. 38.
Figure 40:
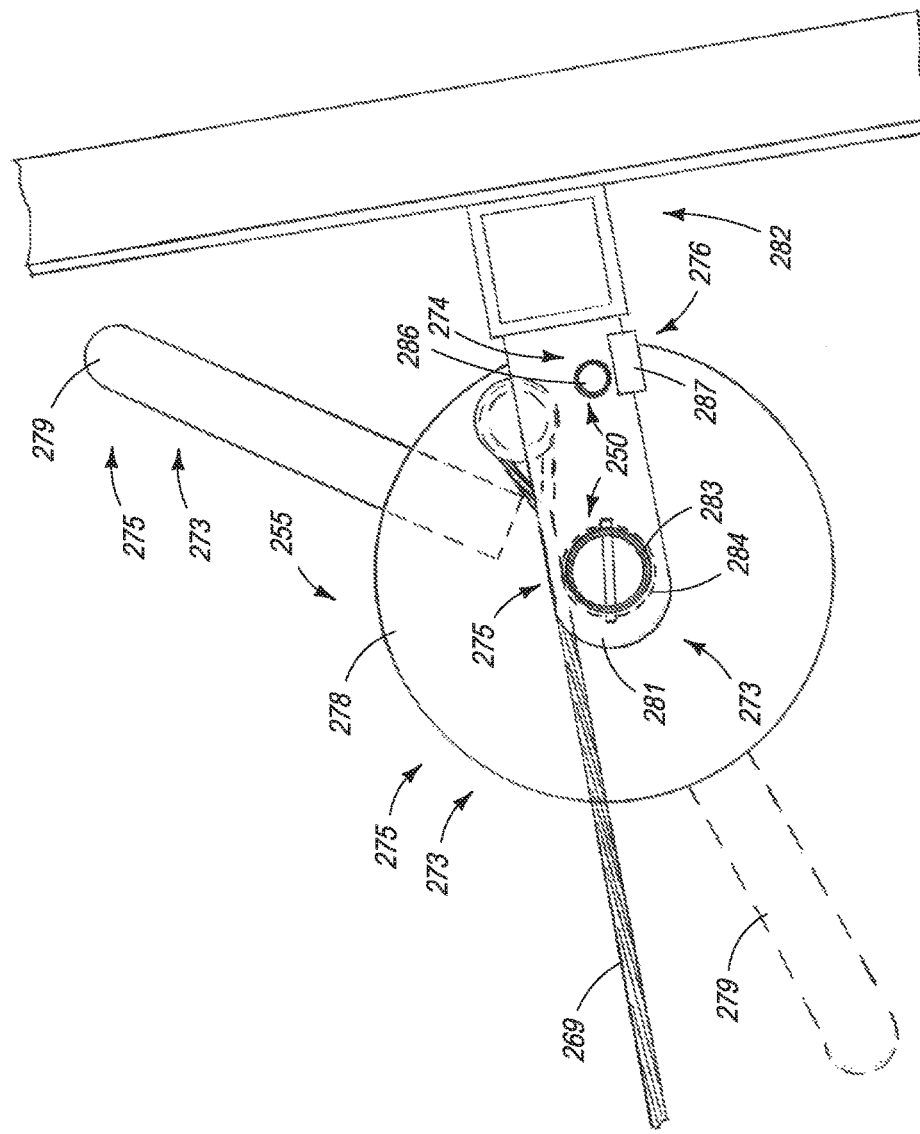
FIG. 40 is an enlarged side view illustrating a release of the rotation positioner illustrated in FIG. 38.

Embodiments of the present invention can be enhanced through employment of a rotation positioner 255. Rotation positioner 255 functions to position a delivery pipe during rotation. An example of rotation positioner 255 is illustrated in FIGS. 38 through 40. The exemplary rotation positioner 255 is attached to the prior-described pivotable linear-move delivery pipe assembly 169. The exemplary rotation positioner 255 can be employed with pivotable linear-move delivery pipe assembly 169 when operating in conjunction with the prior-described connector 25. (Connector 25 functions to hydraulically connect a linear-move water delivery pipe to a water supply.) Said connector 25 can be the prior-described double coupler connector, can be the prior-described single coupler automated connector 112, can be independent vertical coupler connector 110 or can be any other connector. Exemplary rotation positioner 255 provides to anchor the rotation of the attached assembly delivery pipe 169 and to position the assembly 169 during said rotation so that at conclusion to said rotation assembly 169 is oriented preferably for subsequent linear travel. The exemplary rotation positioner 255 comprises an anchor 265, a connect-and-disconnect 260 and a positioner 270. The exemplary rotation positioner 255 can comprise a release 275.

The exemplary rotation positioner 255 comprises an anchor 265. Anchor 265 functions to anchor the rotation of a pivotable delivery pipe assembly. An example of anchor 265 is illustrated in FIGS. 38 through 40. The exemplary anchor 265 includes a concrete rotation pad 266. Anchor 265 provides to anchor the rotation of pivotable linear-move delivery pipe assembly 169.

Concrete rotation pad 266 can be like the prior-described concrete pad 101 with the exception that pad 266 can include substantially more concrete than pad 101, said more concrete necessary to sufficiently anchor the rotation of pivotable linear-move delivery pipe assembly 169. (For example, pad 101 can be about four inches thick and about 50 inches in diameter whereas pad 169 can be 50 inches, or more, in diameter and about 18 inches thick.) The exemplary pad 266 is poured around the prior-described specialized riser 195.

The exemplary rotation positioner 255 comprises a connect-and-disconnect 260. Connect-and-disconnect 260 functions to enable connection to and disconnection from an anchor. An example of connect-and-disconnect 260 is illustrated in FIGS. 38 through 40. The exemplary connect-and-disconnect 260 provides to connect and disconnect pipe assembly 169 to and from respectively rotation pad 266 of anchor 265. The exemplary connect-and-disconnect 260 includes at least one of an anchor pin receptacle 267, an anchor pin 268 and a cable 269. (As another example, connect-and-disconnect 260 can provide to connect a connector 25 to and from respectively rotation pad 266 with the connector 25 attached to pipe assembly 169 said connection to pad 266 then serving to anchor the rotation of assembly 169. For example, the herein described swing arm 16 can be connected to (and disconnected from) pad 266 (arm 16 attached to assembly 169) said connection to pad 266 then serving to anchor the rotation of assembly 169.

Anchor pin receptacle 267 is a two-inch schedule 40 pipe about 12 inches long. Two receptacles are shown employed in FIG. 39. Each receptacle 267 is embedded into pad 166 with the top edge of receptacle 166 flush with the top surface of the pad. The receptacles 267 are embedded positioned 180 degrees apart from each other with the center of each receptacle 267 positioned fourteen inches from the center of pad 266. A line extending through the centers of each receptacle 267 is essentially aligned with the longitudinal axis running through the series of access valves 12. (The outermost receptacle 267 is employed when rotating assembly 169 inward through Fields A and B as illustrated in FIG. 17C of U.S. Pat. No. 6,431,475. The innermost receptacle is employed when rotating assembly 169 outward outside of Fields A and B.)

Anchor pin 268 is a two-inch diameter steel pin about 12 inches long having a four-inch outside diameter and two and one-half inch inside diameter washer welded to its top. The outside diameter of pin 268 can be slid inside the inside diameter of each of receptacle 267.

Cable 269 is a one-half inch diameter wire-rope cable say 80 feet long and capable of withstanding say 21,000 pounds of tension. Cable 269 has an eye fitting configured at each end. One eye is fitted to surround the above-described anchor pin 268 to be held on pin 268 by the top washer of pin 268 and the other eye is attached to pivotable linear-move delivery pipe assembly 169, attached at the end of assembly 169 closest to anchor 265.

Pin 268 surrounded by the eye of cable 269 can be inserted into receptacle 267 serving to connect assembly 169 to anchor 165. Pin 268 surrounded by the eye of cable 269 can be extracted from receptacle 267 serving to disconnect assembly 169 from anchor 165.

The exemplary positioner 255 comprises a position adjuster 270. Position adjuster 270 functions to functions to position an anchored delivery pipe during rotation. An example of position adjuster 270 illustrated in FIGS. 38 through 40. The exemplary adjuster 270 includes a take-up pipe 271 and a take-up pipe flange 272. Take-up pipe 271 is an 18-inch schedule 40 pipe 18 inches long. The length of pipe 271 is embedded about 14 inches into pad 266 with four inches protruding above the surface of pad 266. Pipe 271 is positioned centered about the above-described specialized riser 195 (pad 266 poured around riser 295). Take-up flange 272 is 24 inch outside diameter, 12¾ inch inside diameter and three-eighths inch thick. The inside diameter of flange 272 resides against the outside wall of specialized riser 195, rests on the top edge of pipe 271 and is welded to said outside wall of riser 195 and said top of pipe 271.

Cable 169 being attached to pipe assembly 169 and with pin 268 surrounded by the eye of cable 269 and inserted into receptacle 267, assembly 169 resides being anchored to anchor 165. When assembly 169 is subsequently rotated, said rotation causes cable 169 to wind around take-up pipe 271 affecting to decrease the distance between anchor 265 and pipe assembly 169 and thus to adjust the position of the anchored delivery pipe assembly during rotation.

The exemplary positioner 255 can comprises a release 275. Release 275 functions to facilitate discontinuation from anchoring. An exemplary release 275 is illustrated in FIG. 38 through 40. The exemplary release 275 provides to facilitate the release of pipe assembly 169 from anchor 265. The exemplary release 275 includes a cable length adjuster 273, a cable length lock 274 and can include a lock detector 276.

Release 275 includes cable length adjuster 273. Adjuster 273 includes an adjuster disc 278, a cable attachment 277, a handle 279, two of a disc mount 281, a cart mount 282, an axle 283 and a spacer 284. Adjuster disc 278 is a 14-inch diameter disc one-half inch thick. Disc 278 has a two and one-sixteenth inch hole drilled in its center and a one and nine-sixteenths inch hole drilled about five inches from its center. Cable attachment 277 includes a one and one-half inch diameter pin slid through the one and nine-sixteenths inch hole of disc 278 and welded to disc 278 on the backside. Cable 269, suggested prior as being attached to pipe assembly 169, is configured to include an eye at the pipe assembly end and the eye of cable 269 mounts around the pin of attachment 277. Attachment 277 includes a collar that slides over the pin and is held to the pin. The collar keeps cable 269 from falling off the pin. Handle 279 is one-half inch by two inches wide by 16 inches long and is welded to the backside of disc 278. Each of the two of disc mount 281 is three-quarter inch thick by four-inch wide by ten-inch long with a two and one-sixteenth inch hole drilled centered near one end. (Only one mount 281 is shown. The other resides behind the one shown.) The other end of each of disc mount 281 is welded to cart mount 282. The mounts 281 are positioned centered on cart mount 282 with a distance of two and one-quarter inches between the two mounts 281. Mount 282 is a four-inch by four-inch by one-quarter inch square tube about four feet long that is bolted to cart 14a. Axle 283 is two-inch diameter by five inches long having two three-eighths inch holes, one drilled near each end, each hole for mounting a cotter pin. Spacer 284 is two and one-sixteenth inch inside diameter by one and one-half inches long. Disc 278 resides between the two mounts 281 with spacer 284 positioned on the same side as cable 269. Axle 283 is slid through the two mounts 281, disc 278 and spacer 284 and cotter pinned in place.

Release 275 includes cable length lock 274. Length lock 274 includes a locking pin 286. Pin 286 is a one inch diameter round rod having a one and one-half inch diameter head welded on one end. Length lock 274 includes a one and one-sixteenth inch hole drilled in each of the two of disc mount 281 near the end welded to mount 282. Disc 278 also has the one and one-sixteenth inch hole drilled there through to line up with the holes in the mounts 281, said hole located a few inches clockwise of cable attachment 277. Locking pin 286 can be slid through the three holes and there-positioned effects to lock disc 278 in place locked to the mounts 281 as is the position shown in FIG. 40.

Release 275 can include a lock detector 276. Lock detector 276 includes a pin proximity sensor 287. Sensor 287 is positioned just below the one and one-sixteenth hole in the shown disc mount 281. When locking pin 286 is slid through said three holes, the end of pin 286 is then oriented adjacent to sensor 287 and detected by sensor 287. Said detection is employed to insure adjuster disc 278 is locked in place prior to rotation of assembly 169 and to insure that adjuster disc 278 is not locked in place prior to linear-move irrigation. (As another example of release 275, release 275 can be a conventional come-along configured to have cable 269 there-attached and to release tension in cable 269. As another example, release 275 can be a conventional chain binder type mechanism configured to have cable 269 there-attached and to release tension in cable 269.)

An example of the operation of rotation positioner 255 with positioner 255 inclusive of release 275 will now be described. Pivotable linear-move delivery pipe assembly 169 resides in the position shown in FIG. 17C in U.S. Pat. No. 6,431,475 and is about to be rotated to Field A (to be rotated in the direction opposite to the directional rotation arrow shown in FIG. 17C.) Pipe assembly 169 is to be rotated 180 degrees through Fields B and A to then be positioned for linear-move irrigation across the Field A along the series of access valves 12 (in the direction opposite to the directional arrow shown). Previously, the farmer has wrapped cable 269 around a structural member of cart 14a affecting to store the cable out of the way and out of the crop.

One eye end of cable 269 is attached to disc 278 via cable attachment 277 (as described above) and the other eye end is unattached. The farmer now unwraps cable 269 from cart 14a. The farmer checks release 275 to make sure locking pin 286 has been removed and disc 278 resides fully counter-clockwise rotated (the position where handle 279 is shown in dashed lines in FIG. 40). The farmer then stretches the cable from cart 14a to rotation pad 266. Anchor pin 268 has been stored residing in one or the other of the receptacles 267. The farmer removes pin 268, slides pin 268 through the free eye at the end of cable 269 and slides pin 268 into the receptacle 267 located outermost relative to the field. Cable 269 is thus secured to concrete pad 266 of anchor 265. The farmer walks back to cart 14a and pulls on handle 279 affecting to rotate disc 278 clockwise (thus pulling cable 269 about eight inches toward cart 14a). The farmer slides locking pin 286 through the one and one-sixteenth inch hole in the backside disc mount 281, through the one and one-sixteenth inch hole in disc 278 and through the one and one-sixteenth inch hole in the front disc mount 281 where sensor 287 is located.

Disc 278 is now locked in place and locking pin 286 is being detected by sensor 287. The farmer now provides instruction to the control panel of pipe assembly 169 to cause pipe assembly 169 to rotate. Sensor 287 provides a signal to the control panel indicating that locking pin 286 has been detected. The control panel is configured to require said signal or the control panel will not implement the rotation. Rotation commences.

Pivotable linear-move delivery pipe assembly 169 comprises a guidance that keeps assembly 169 positioned at a prescribed distance from the longitudinal axis along the series of valves 12 (for example 70 feet from the axis) while maintaining assembly 169 mostly perpendicular to the series of access valves 12 during linear-move travel/irrigation along said series of access valves. In other words, the guidance functions to maintain assembly 169 positioned a certain distance from the series of valves within a given tolerance, for this example within plus or minus 29 inches from dead center. Positioner 255 is configured where cable 269 is just long enough to enable the farmer to pin the free eye of cable 269 (by sliding pin 268 into the appropriate one of the receptacles 267) and to rotate and lock disc 278 (by pulling on handle 279 clockwise and sliding locking pin 286 through the three holes) when assembly 169 is the maximum distance (29 inches) away from dead center guidance positioning (i.e. assembly 169 resides the farthest from the series of valves that the guidance permits, said farthest being 29 inches away from/outside of dead center).

For this operational example, assembly 169 is positioned inside of said maximum distance away from dead center. Accordingly, when rotation of assembly 169 commences there is slack in cable 269. As a result of the slack, when rotation commences assembly 169 will effectively travel outward from take-up pipe 271 until said cable 269 is placed in tension from being stretched between pipe 271 (pipe 271 anchored in rotation pad 266) and cable attachment 277 of length adjuster 273 (attachment to pipe assembly 169). When in tension, the anchored cable 269 affects to cause assembly 269 to rotate about pipe 271 as assembly 169 travels. Said rotation affects to wind cable 269 around pipe 271. Rotation travel of assembly 169 continues until assembly 169 is oriented 180 degrees from its starting position with cable 269 being wrapped essentially 180 degrees around take-up pipe 271 (as shown in FIG. 39). Subsequent to the 180-degree rotation, assembly 169 is then positioned to commence linear-move travel and irrigation. (In this example, assembly 169 rotates inward through Fields B and A to then be positioned to irrigate across Field A, thus traveling backwards to the travel shown in FIG. 17C in U.S. Pat. No. 6,431,475.) The circumference of take-up pipe 271 (18-inch schedule 40 pipe) is about 59 inches. Therefore, winding cable 269 around 180 degrees of the 59-inch circumference will take-up 59/2 or 29½ inches of cable 269. In other words, when the 180-degree rotation of assembly 169 has been completed, the 29½ inches of take-up in cable 269 affects to pull assembly 169 the 29½ inches toward pipe 271 resulting in a positioning of assembly 169 essentially at said dead center of said guidance. (Technically 29½ inches minus 29 inches meaning positioned one-half inch inside dead center.) Positioned essentially at dead center, assembly 169 is perfectly positioned for commencing linear-move irrigation, including valve finding, along the series of access valves 12 (across Field A).

Upon conclusion to the 180-degree rotation, the controls of assembly 169 shut the system down. To commence linear-move irrigation, the farmer visits assembly 169 and configures for said linear-move irrigation. To so configure, the farmer pulls on handle 279 clockwise to create enough freedom from the tension in cable 269 to be able to remove locking pin 286. The farmer then removes pin 286 and pushes handle 279 in the counter-clockwise direction. Said pushing rotates disc 278 counter-clockwise to where handle 279 resides in the position illustrated with dashed lines in FIG. 40, said position creates about eight inches of slack in cable 269. Said slack enables the farmer to readily remove anchor pin 268 from the receptacle 267. With pin 268 removed, the farmer can then wind the loose cable 269 around a structural member of cart 14a to keep cable 269 out of the crop during the ensuing linear-move irrigation. The farmer then provides instruction to the controls of assembly 169 to begin linear-move irrigation. With locking pin 286 removed, pin 286 is no longer detected by proximity sensor 287. With no detection of pin 286 by sensor 287, said controls of assembly 169 will then permit commencement of the instructed linear-move irrigation.

Figure 41:
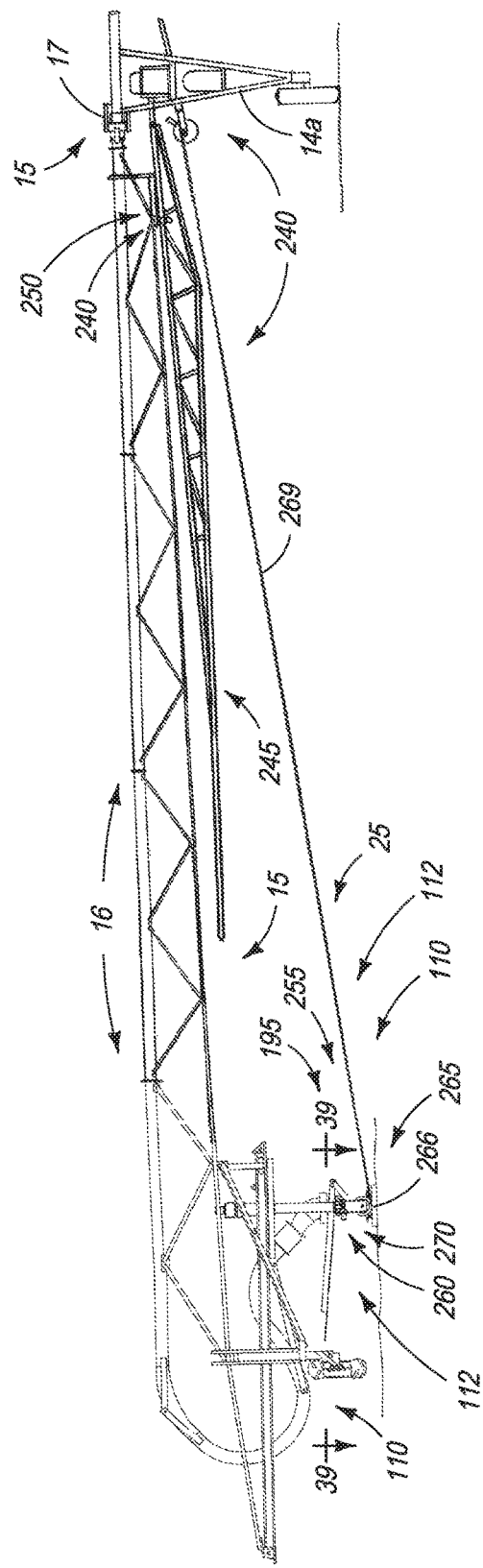
FIG. 41 is side elevation view of a direct translation under-boom and a rotation positioner both attached to a pivotable linear-move delivery pipe assembly.

FIG. 41 is an example of direct translation under-boom 240 and rotation positioner 255 both attached to pivotable linear-move delivery pipe assembly 169. The exemplary under-boom 240 can be as described prior as illustrated in FIG. 35 and can operate as described prior. For this example, positioner 255 can be as described prior as illustrated in FIG. 38 and can operate as described prior. For this example, positioner 255 is mounted to pipe assembly 169 below the mounting of under-boom 240 to assembly 169 as shown (FIG. 41).

It is understood that the above examples of the various embodiments provided for herein can be implemented using alternative means and structures to provided essentially equivalent functionality, and that the scope of the present invention is not to be limited by these examples.

I claim:
1. An irrigation system comprising:
a water delivery pipe assembly comprising a plurality of delivery pipes and a plurality of drive motors, the water delivery pipe assembly configured to maintain a longitudinal alignment of the delivery pipes with respect to each other for at least one of: center pivot irrigator travel and linear-move irrigator travel and the water delivery pipe assembly further configured wherein the plurality of drive motors comprises a plurality of sets of two of the drive motors and during the maintaining of the longitudinal alignment of the delivery pipes, for each set of two motors, when one motor in the set of two is in operation or is operational the other motor in the set of two is not in operation or is not operational; and wherein the water delivery pipe assembly is defined by a first end and a distal second end; the plurality of drive motors are distributed along the water delivery pipe assembly between the first and second ends thereof: and wherein one of the sets of two comprises a first drive motor of the plurality of drive motors located proximate to the first end and a second motor of the plurality of drive motors located proximate to the opposite second end.

2. The system of claim 1 and wherein one of the sets of two drive motors comprises a third drive motor of the plurality of drive motors located inward of the first drive motor or second drive motor-and a fourth drive motor of the plurality of drive motors located inward of the first drive motor or the second drive motor.

3. The system of claim 2 and wherein one of the sets of two drive motors comprises a fifth drive motor of the plurality of drive motors located inward of the third drive motor or the fourth drive motor and a sixth drive motor of the plurality of drive motors located inward of the third drive motor or the fourth drive motor.

4. The system of claim 3 wherein the water delivery pipe assembly is configured for linear-move irrigator travel and comprises a governor to limit the maximum percent of time one or more of the plurality of drive motors operate.

5. The system of claim 1 wherein the water delivery pipe assembly is configured for linear-move irrigator travel and comprises a governor to limit the maximum percent of time one or more of the plurality of drive motors operate.

6. A method for irrigating cropland comprising:
providing a water delivery pipe assembly comprising a plurality of delivery pipes and a plurality of drive motors;
configuring the water delivery pipe assembly to maintain a longitudinal alignment of the delivery pipes with respect to each other for at least one of: center pivot irrigator travel and linear-move irrigator travel; and
configuring the water delivery pipe assembly wherein the plurality of drive motors comprises a plurality of sets of two of the drive motors and during the maintaining of the longitudinal alignment of the delivery pipes with respect to each other, for each set of two motors, when one motor in the set of two motors is in operation or is operational the other drive motor in the set of two motors is not in operation or is not operational; and
wherein the water delivery pipe assembly is defined by a first end and a distal second end and the plurality of drive motors are distributed along the water delivery pipe assembly between the first and second ends thereof and the method further comprises locating a first drive motor proximate to the first end and locating a second motor proximate to the second end as one of the plurality of sets of two drive motors.

7. The method of claim 6 further comprising configuring each set of the plurality of sets of two drive motors wherein power is available for operation of one motor in the set only when power to the other motor in the set is mechanically shut off.

8. The method of claim 6 further comprising locating a third drive motor inward of the first drive motor or second drive motor and locating a fourth drive motor inward of the first drive motor or the second drive motor as one of the plurality of sets of two drive motors.

9. The method of claim 8 further comprising locating a fifth drive motor inward of the third drive motor or the fourth drive motor and locating a sixth drive motor inward of the third drive motor or the fourth drive motor as one of the plurality of sets of two drive motors.

10. The method of claim 9 wherein the water delivery pipe assembly has been configured for linear-move irrigator travel and the method further comprises limiting the maximum percent of time one or more of the plurality of drive motors operate.

11. The method of claim 6 wherein the water delivery pipe assembly has been configured for linear-move irrigator travel and the method further comprises limiting the maximum percent of time one or more of the plurality of drive motors operate.

12. A method for transporting a water delivery pipe across cropland, the water delivery pipe comprising a plurality of delivery pipes and a plurality of drive motors and the water delivery pipe assembly configured to maintain a longitudinal alignment of the delivery pipes with respect to each other for at least one of: center pivot irrigator travel and linear-move irrigator travel, the water delivery pipe assembly defined by a first end and a distal second end and the plurality of drive motors distributed along the water delivery pipe assembly between the first and second ends thereof, the method comprising:
configuring the plurality of drive motors to comprise a plurality of sets of two of the drive motors and, during the maintaining of the longitudinal alignment of the delivery pipes with respect to each other, for each set of two when one motor in the set of two is in operation or is operational the other motor in the set of two is not in operation or is not operational, and
locating a first drive motor proximate to the first end of the water delivery pipe assembly and locating a second motor proximate to the second end as one of the plurality of sets of two drive motors.

13. The method of claim 12 further comprising configuring each set of the plurality of sets of two drive motors wherein power is available for operation of one motor in the set only when power to the other motor in the set is mechanically shut off.

14. The method of claim 12 further comprising locating a third drive motor inward of the first drive motor or second drive motor and locating a fourth drive motor inward of the first drive motor or the second drive motor as one of the plurality of sets of two drive motors.

15. The method of claim 14 further comprising locating a fifth drive motor inward of the third drive motor or the fourth drive motor a sixth drive motor inward of the third drive motor or the fourth drive motor as one of the plurality of sets of two drive motors.

16. The method of claim 15 wherein the water delivery pipe assembly has been configured for linear-move irrigator travel and the method further comprises limiting the maximum percent of time one or more of the plurality of drive motors operate.

17. The method of claim 12 wherein the water delivery pipe assembly has been configured for linear-move irrigator travel and the method further comprises limiting the maximum percent of time one or more of the plurality of drive motors operate.

* * * * *